(12) United States Patent
Zagaynov et al.

(10) Patent No.: US 10,366,469 B2
(45) Date of Patent: Jul. 30, 2019

(54) METHOD AND SYSTEM THAT EFFICIENTLY PREPARES TEXT IMAGES FOR OPTICAL-CHARACTER RECOGNITION

(71) Applicant: ABBYY Development LLC, Moscow (RU)

(72) Inventors: Ivan Zagaynov, Moscow Region (RU); Vladimir Rybkin, Moscow (RU)

(73) Assignee: ABBYY PRODUCTION LLC, Moscow (RU)

( * ) Notice: Subject to any disclaimer, the term of this patent is extended or adjusted under 35 U.S.C. 154(b) by 0 days.

(21) Appl. No.: 15/377,077

(22) Filed: Dec. 13, 2016

(65) Prior Publication Data
US 2017/0372460 A1    Dec. 28, 2017

Related U.S. Application Data

(63) Continuation-in-part of application No. 15/195,726, filed on Jun. 28, 2016, and a continuation-in-part of application No. 15/238,350, filed on Aug. 16, 2016.

(30) Foreign Application Priority Data

Dec. 6, 2016 (RU) ................................ 2016147698

(51) Int. Cl.
G06T 3/00    (2006.01)
(52) U.S. Cl.
CPC .................................. *G06T 3/0031* (2013.01)
(58) Field of Classification Search
CPC ........... G06K 2009/363; G06K 9/3275; G06K 9/3208; G06T 2207/30176; G06T 5/006;
(Continued)

(56) References Cited

U.S. PATENT DOCUMENTS 5,825,906 A    10/1998 Obata et al.
6,138,045 A    10/2000 Kupinski et al.
(Continued)

FOREIGN PATENT DOCUMENTS

EP    1532585    12/2008

OTHER PUBLICATIONS

Singh, et al. "A novel method for straightening curved text-lines in Stylistic documents", Springer, pp. 1-8, 2014.*
(Continued)

*Primary Examiner* — Daniel G Mariam
(74) *Attorney, Agent, or Firm* — Lowenstein Sandler LLP

(57) ABSTRACT

The current document is directed to methods and systems that straighten curvature in the text lines of text-containing digital images, including text-containing digital images generated from the two pages of an open book. Initial processing of a text-containing image identifies the outline of a text-containing page. Next, contours are generated to represent each text line. The midpoints and inclination angles of the links or vectors that comprise the contour lines are determined. A model is constructed for the perspective-induced curvature within the text image. In one implementation, the model, essentially an inclination-angle map, allows for assigning local displacements to pixels within the page image which are then used to straighten the text lines in the text image. In another implementation, the model is essentially a pixel-displacement map which is used to straighten the text lines in the text image.

21 Claims, 66 Drawing Sheets

(58) Field of Classification Search
CPC ............. G06T 7/13; G06T 2207/10004; G06T 2207/20036; G06T 3/60; G06T 7/155; G06T 7/64
USPC .......................................... 382/176, 199, 200
See application file for complete search history.

(56) References Cited

U.S. PATENT DOCUMENTS

| | | | |
|---|---|---|---|
| 7,110,602 | B2 | 9/2006 | Krause |
| 7,873,216 | B2 | 1/2011 | Zandifar et al. |
| 8,107,766 | B2 | 1/2012 | Kacher et al. |
| 8,285,077 | B2 | 10/2012 | Fero et al. |
| 8,331,686 | B2 | 12/2012 | Lee et al. |
| 8,897,600 | B1 | 11/2014 | Ma et al. |
| 9,036,912 | B2 * | 5/2015 | Meyer .................. G06K 9/3283 382/181 |
| 9,208,403 | B1 | 12/2015 | Aviv |
| 9,390,342 | B2 | 7/2016 | Campbell |
| 9,495,735 | B2 * | 11/2016 | Wilson ................. G06K 9/3283 |
| 9,805,281 | B2 * | 10/2017 | Wu ....................... G06K 9/3283 |
| 2002/0048402 | A1 | 4/2002 | Braspenning et al. |
| 2002/0126893 | A1 | 9/2002 | Held et al. |
| 2003/0142884 | A1 * | 7/2003 | Cariffe ................. H04N 1/387 382/285 |
| 2004/0008890 | A1 | 1/2004 | Clark et al. |
| 2004/0037460 | A1 | 2/2004 | Luo et al. |
| 2004/0037465 | A1 | 2/2004 | Krause |
| 2004/0213460 | A1 | 10/2004 | Chen |
| 2006/0118633 | A1 | 6/2006 | He et al. |
| 2007/0127816 | A1 | 6/2007 | Balslev et al. |
| 2009/0046930 | A1 | 2/2009 | Lee et al. |
| 2009/0080738 | A1 | 3/2009 | Zur et al. |
| 2009/0190833 | A1 | 7/2009 | Alvino et al. |
| 2009/0238462 | A1 | 9/2009 | Feris et al. |
| 2009/0274349 | A1 | 11/2009 | Cascio et al. |
| 2010/0111400 | A1 | 5/2010 | Ramirez et al. |
| 2011/0050703 | A1 | 3/2011 | Artan et al. |
| 2012/0051606 | A1 | 3/2012 | Saikia |
| 2012/0243796 | A1 | 9/2012 | Saito |
| 2012/0320427 | A1 | 12/2012 | Zheng et al. |
| 2013/0064435 | A1 | 3/2013 | Taerum |
| 2013/0148883 | A1 | 6/2013 | Lee |
| 2013/0279801 | A1 | 10/2013 | Scheuermann et al. |
| 2014/0064596 | A1 | 3/2014 | He et al. |
| 2014/0164927 | A1 | 6/2014 | Salaverry et al. |
| 2014/0247470 | A1 | 9/2014 | Hunt et al. |
| 2014/0270500 | A1 | 9/2014 | Li et al. |
| 2015/0104098 | A1 | 4/2015 | Axelsson et al. |
| 2015/0104106 | A1 | 4/2015 | Elinas et al. |
| 2015/0110392 | A1 | 4/2015 | Wang |
| 2016/0014392 | A1 | 1/2016 | Liang et al. |
| 2016/0238737 | A1 | 8/2016 | Janet et al. |
| 2017/0076169 | A1 | 3/2017 | Campbell |
| 2017/0351931 | A1 * | 12/2017 | Agrawal .............. G06K 9/3283 |
| 2017/0365094 | A1 | 12/2017 | Liu et al. |
| 2018/0018774 | A1 | 1/2018 | Kacher et al. |

OTHER PUBLICATIONS

"Correcting document image warping based on regression of curved text lines", IEEE, pp. 1-6, 2003.*

Grompone, et al. "LSD: a Line Segment Detector", IPOL Journal • Image Processing on Line, Mar. 24, 2012, pp. 35-55, https://doi.org/10.5201/ipol.2012.gjmr-lsd, 21 pages.

"Grompone, et al, ""A Contrario Line Segment Detection"", SpringerBriefs in ComputerScience, DOI 10.1007/978-1-4939-0575-1, 2014, http://www.springer.com/us/book/9781493905744?wt_mc=ThirdParty.SpringerLink.3.EPR653.About_eBook#otherversion=9781493905751, 90 ppages."

Pugliese, Alessandro, et al. "A Novel Model-based Dewarping Technique for Advanced Digital Library Systems", 10th Italian Research Conference on Digital Libraries, IRCDL 2014, https://doi.org/10.1016/j.procs.2014.10.018 Procedia Computer Science, vol. 38, 2014, pp. 108-115.

Mang, Zheng, et al."Straightening Warped Text Lines Using Polynomial Regression", 2002 International Conference on Image Processing, Sep. 22-25, 2002, 4 pages.

* cited by examiner

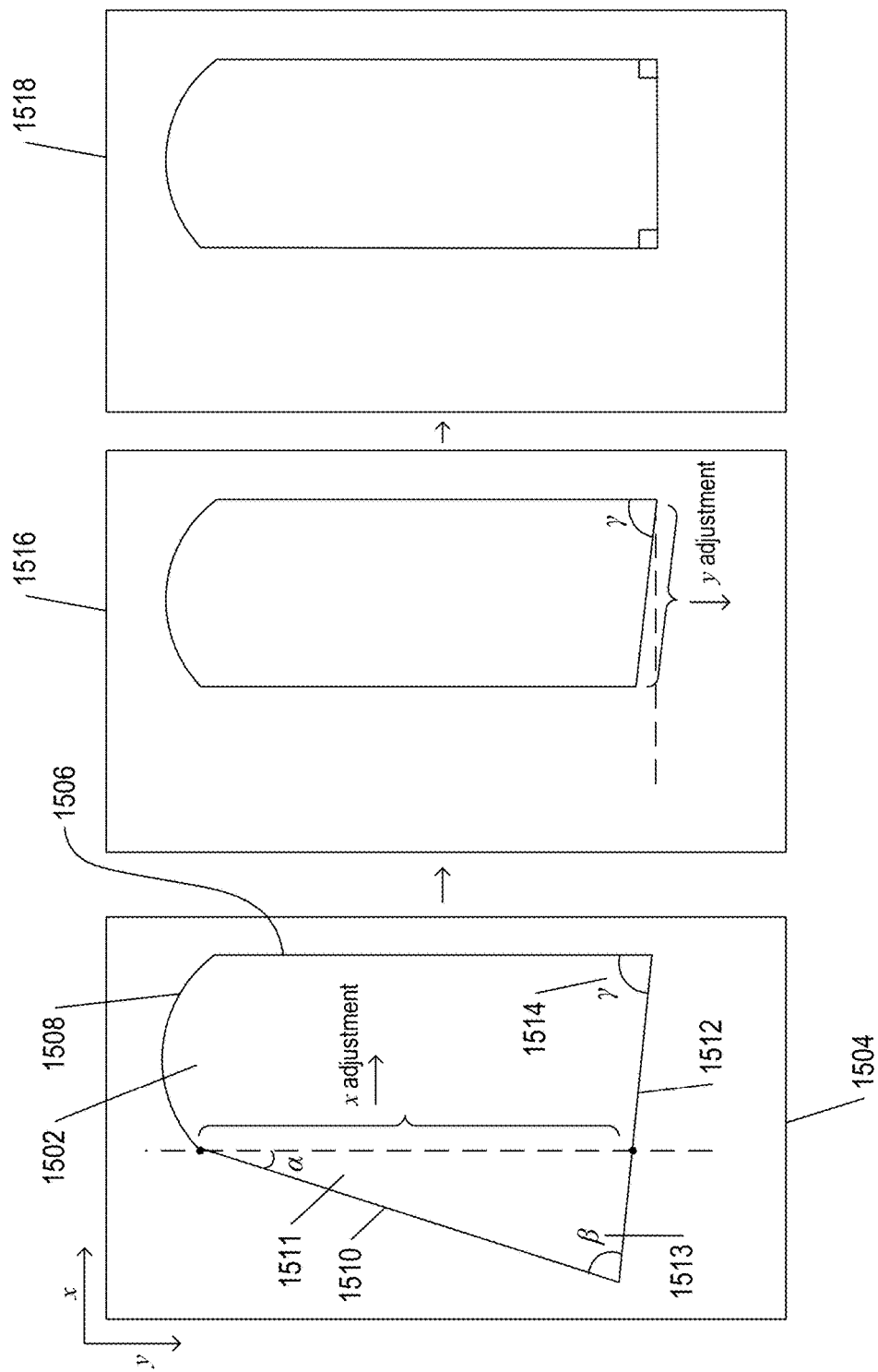

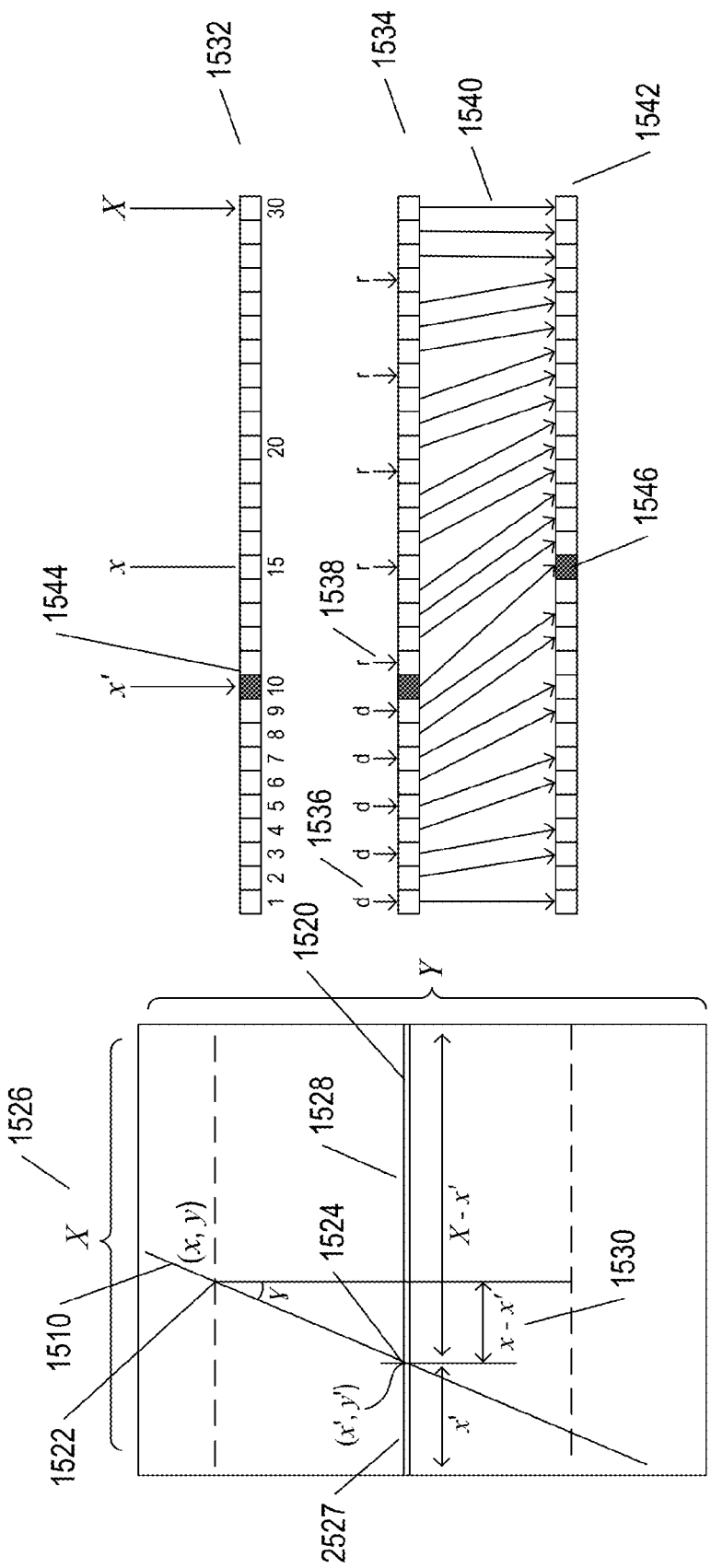

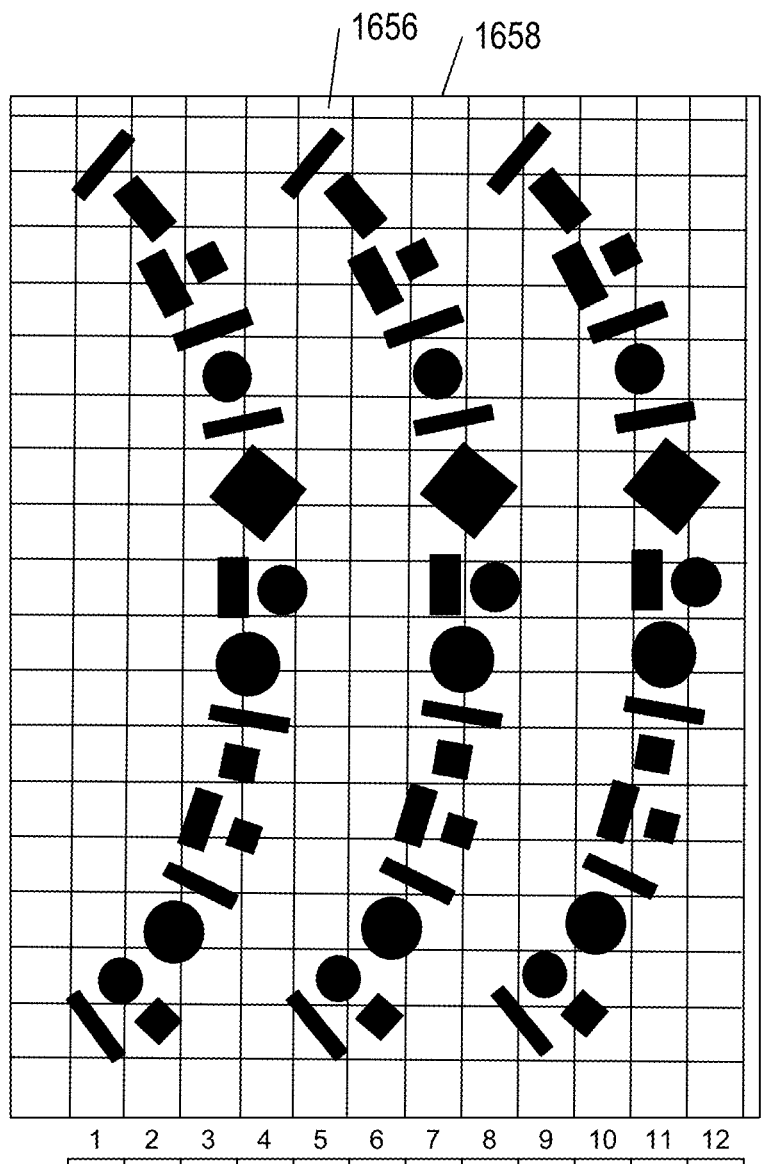
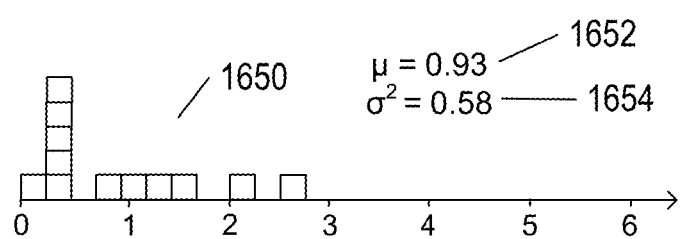
FIG. 16D

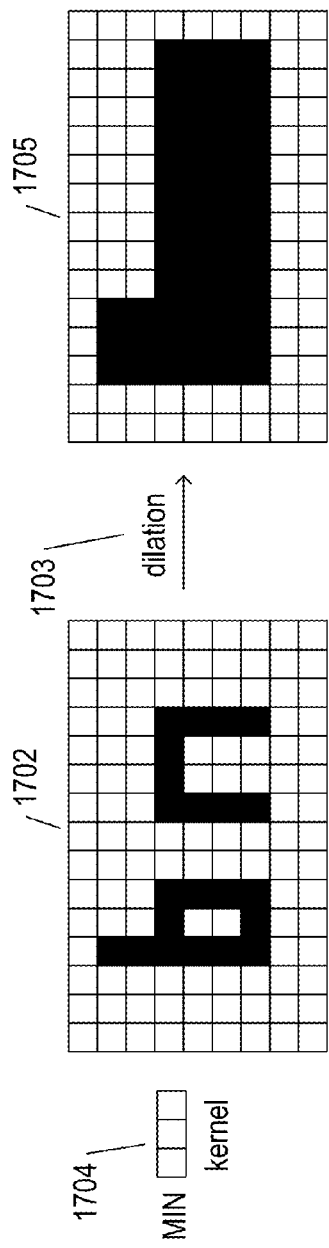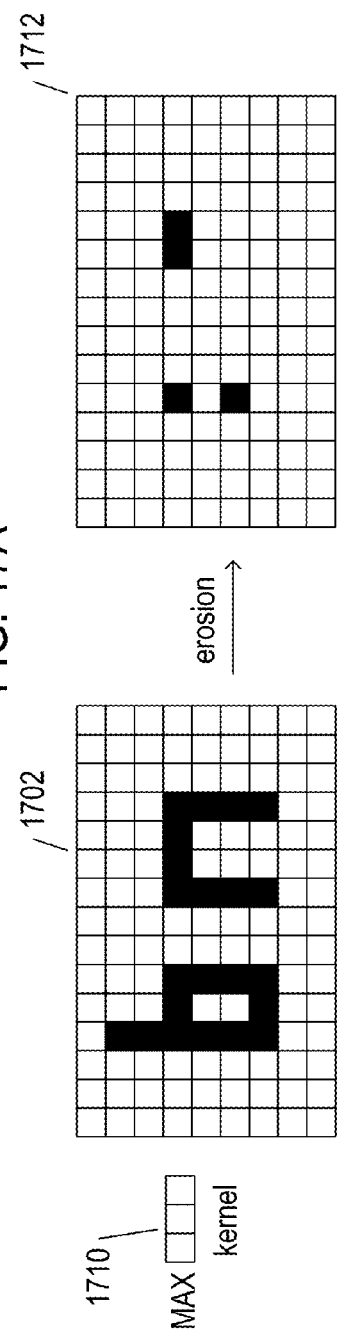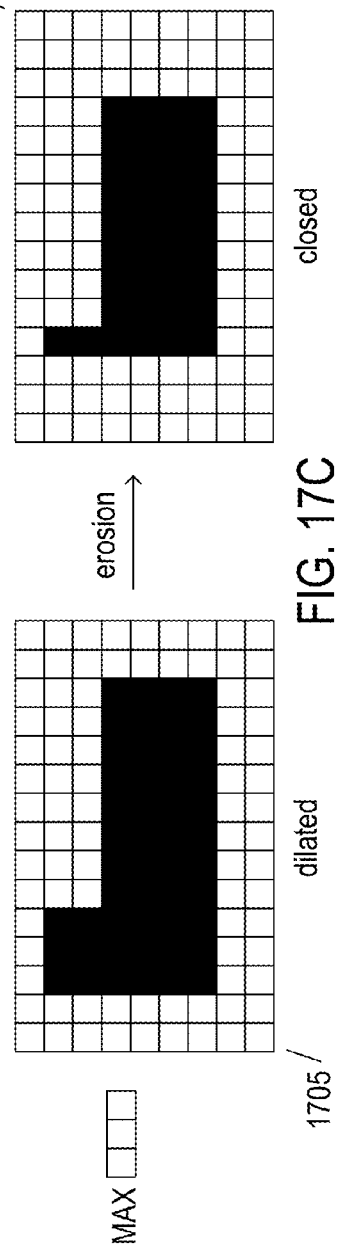
FIG. 17A
FIG. 17B
FIG. 17C $$f(x,y) = a_1 x^3 y + a_2 x^2 y + a_3 xy + a_4 y + a_5 x^3 + a_6 x^2 + a_7 x + a_8 \quad /2052$$

$$2050 \diagdown \quad D = \sum_{i=1}^{m} w_i (\tan(\alpha_o) - \tan(\alpha_c))^2$$

$$\frac{\partial D}{\partial a_1} = \sum_{i=1}^{m} w_i (\tan(\alpha_o) - \tan(\alpha_c))(-x^3 y) = 0 \quad —2054$$

$$\frac{\partial D}{\partial a_2} = \sum_{i=1}^{m} w_i (\tan(\alpha_o) - \tan(\alpha_c))(-x^2 y) = 0 \quad —2055$$

$$\vdots$$

$$\frac{\partial D}{\partial a_8} = \sum_{i=1}^{m} w_i (\tan(\alpha_o) - \tan(\alpha_c)) \quad\quad = 0 \quad —2056$$

$$\left.\begin{array}{l} k_{11}a_1 + k_{21}a_2 + k_{31}a_3 \ldots k_{81}a_8 = k_1 \\ k_{12}a_1 + k_{22}a_2 + k_{32}a_3 \ldots k_{82}a_8 = k_2 \\ \vdots \\ k_{1m}a_1 + k_{2m}a_2 + k_{3m}a_3 \ldots k_{8m}a_8 = k_m \end{array}\right\} 2058$$

$$K = \begin{bmatrix} k_{11} & k_{21} & k_{31} & \ldots & k_{81} \\ k_{21} & k_{22} & k_{32} & \ldots & k_{82} \\ & & \vdots & & \\ k_{1m} & k_{2m} & k_{3m} & \ldots & k_{8m} \end{bmatrix} \quad —2060$$

$$k = \begin{bmatrix} k_1 \\ k_2 \\ \vdots \\ k_m \end{bmatrix} \quad a = \begin{bmatrix} a_1 \\ a_2 \\ \vdots \\ a_8 \end{bmatrix}$$

$\diagdown 2061 \quad \diagdown 2062$ $$Ka = k \quad —2063$$
$$K^T Ka = K^T k \quad —2064$$
$$a = (K^T K)^{-1} K^T k \quad —2065$$

FIG. 20 terminate contour at pixel s when:

(a) ⌐∃ α, γ | average $I_{r_\alpha}$ - average $I_{r_\gamma}$ > threshold$_1$ ∧ $r_\alpha$ and $r_\gamma$ meet requirements for a continuation link; OR ─── 2408

(b) ⌐∃ α | average $I_{r_\alpha}$ > threshold$_2$ ─── 2410

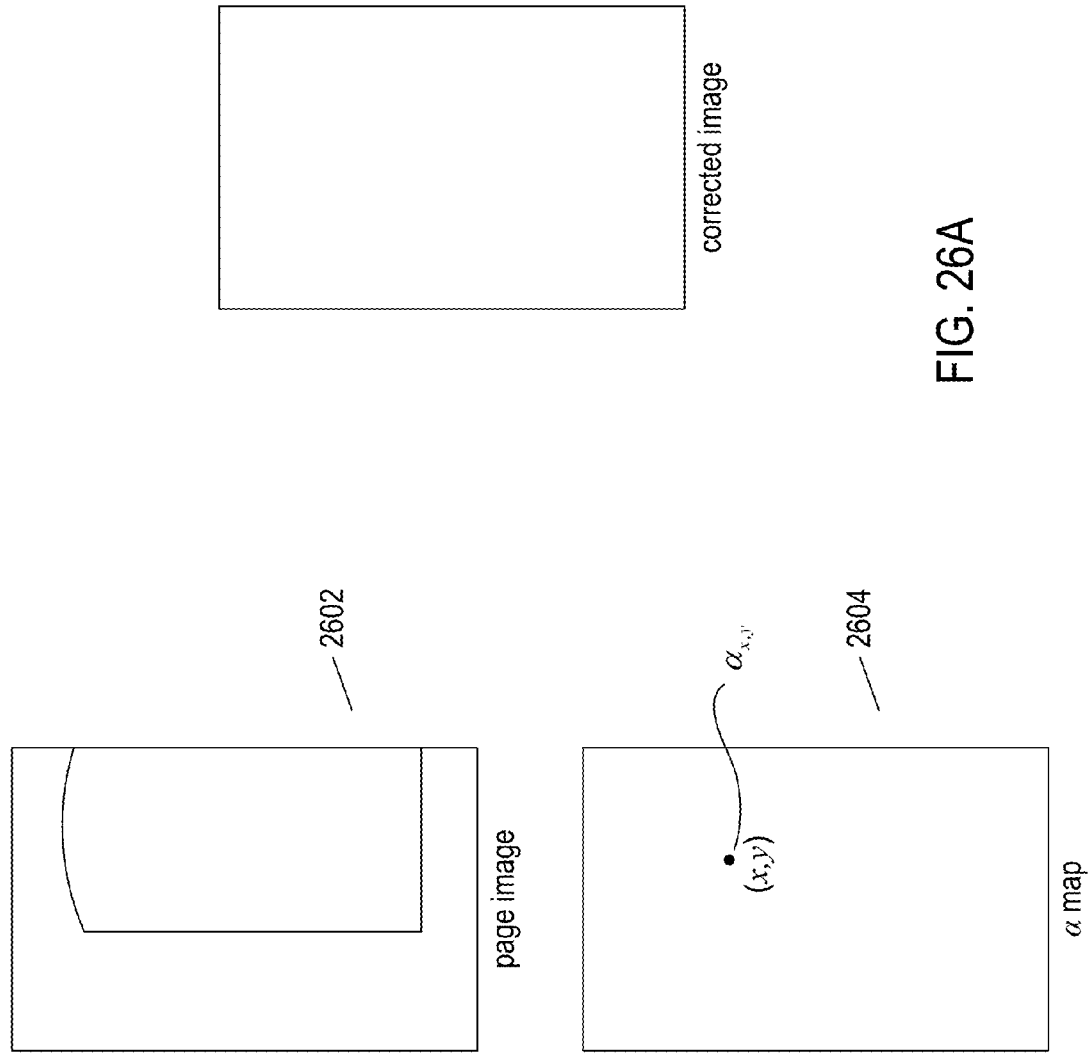

METHOD AND SYSTEM THAT EFFICIENTLY PREPARES TEXT IMAGES FOR OPTICAL-CHARACTER RECOGNITION

CROSS REFERENCE TO RELATED APPLICATIONS

The present application claims the benefit of priority under 35 USC 119 to Russian Patent Application No. 2016147698, filed Dec. 6, 2016. Additionally, the present application is a Continuation-In-Part of U.S. patent application Ser. No. 15/195,726, filed Jun. 28, 2016 and also a Continuation-In-Part of U.S. patent application Ser. No. 15/238,350, filed Aug. 16, 2016; disclosures of all of the priority applications are incorporated herein by reference in their entirety for all purposes.

TECHNICAL FIELD

The current document is directed to image processing and optical-character recognition and, in particular, to a method and system that straightens curved-page-surface-induced and perspective-induced curvature in text images in preparation for application of automated optical-character-recognition methods to the text images.

BACKGROUND

Printed natural-language documents continue to represent a widely used communications medium among individuals, within organizations, and for distribution of information among information consumers. With the advent of ubiquitous and powerful computational resources, including personal computational resources embodied in smart phones, pads, tablets, laptops, and personal computers, as well as larger-scale computational resources embodied in cloud-computing facilities, data centers, and higher-end servers within various types of organizations and commercial entities, natural-language information is, with increasing frequency, encoded and exchanged in electronic documents. Printed documents are essentially images, while electronic documents contain sequences of numerical encodings of natural-language symbols and characters. Because electronic documents provide advantages in cost, transmission and distribution efficiencies, ease of editing and modification, and robust-storage over printed documents, an entire industry supporting methods and systems for transforming printed documents into electronic documents has developed over the past 50 years. Computational optical-character-recognition methods and systems and electronic scanners together provide reliable and cost-effective imaging of printed documents and computational processing of the resulting digital images of text-containing documents to generate electronic documents corresponding to the printed documents.

In the past, electronic scanners were large-size desktop, table top, and free-standing electronic appliances. However, with the advent of camera-containing smart phones and other mobile, processor-controlled imaging devices, digital images of text-containing documents can be generated by a large variety of different types of ubiquitous, hand-held devices, including smart phones, inexpensive digital cameras, inexpensive video surveillance cameras, and imaging devices included in mobile computational appliances, including tablets and laptops. Digital images of text-containing documents produced by these hand-held devices and appliances can then be processed, by computational optical-character-recognition systems, including optical-character-recognition applications in smart phones, to produce corresponding electronic documents.

Unfortunately, text-containing images produced by hand-held document imaging are often distorted by noise, optical blur, curved-page-surface-induced and perspective-induced curvature of linear text lines, and other defects and deficiencies. Even images generated by dedicated document-scanning appliances may suffer from perspective-induced curvature of linear text lines when a book is imaged by opening the book and placing it face down on a transparent scanning surface. These defects and deficiencies can seriously degrade the performance of computational optical-character recognition, greatly increasing the frequency of erroneous character recognition and failure of optical-character-recognition methods and systems to produce accurate text encoding for text contained in digital images. For this reason, designers and developers of imaging devices, imaging appliances, and optical-character-recognition methods and systems, as well as users of the devices, appliances, and optical-character-recognition systems, continue to seek methods and systems to ameliorate the defects and deficiencies inherent in many text-containing digital images, including mobile-device-captured digital text-containing digital images, that frustrate subsequent computational image processing of the text-containing digital images.

SUMMARY

The current document is directed to methods and systems that straighten curvature in the text lines of text-containing digital images, including text-containing digital images generated from the two pages of an open book. Initial processing of a text-containing image identifies the outline of a text-containing page. Next, contours are generated to represent each text line. The centroids and inclination angles of the links or vectors or segments that comprise the contour lines are determined. A model is constructed for the perspective-induced curvature within the text image. In one implementation, the model, essentially an inclination-angle map, allows for assigning local displacements to pixels within the page image which are then used to straighten the text lines in the text image. In another implementation, the model is essentially a pixel-displacement map which is used to straighten the text lines in the text image.

BRIEF DESCRIPTION OF THE DRAWINGS

FIG. 15A illustrates one approach to page-edge alignment, discussed above with reference to FIG. 13B.

FIG. 15B illustrates one approach to page-edge alignment, discussed above with reference to FIG. 13B.

FIG. 16D illustrates one approach to determining the orientation of text lines within a page image or, equivalently, determining a rotational orientation of a page image so that the text lines are horizontal.

FIG. 17A illustrates morphological operations that are used, in certain implementations, to create uniform bands of pixels in a binary map that correspond to text lines.

FIG. 17B illustrates morphological operations that are used, in certain implementations, to create uniform bands of pixels in a binary map that correspond to text lines.

FIG. 17C illustrates morphological operations that are used, in certain implementations, to create uniform bands of pixels in a binary map that correspond to text lines.

FIG. 20 illustrates an alternative data-fitting method to transform the extracted raw curvature data tabulated in Table 1912 of FIG. 19A to the polynomial function.

FIG. 26A illustrates straightening of text-line curves within a page image to produce rectilinear text lines using the inclination-angle map that associates an inclination angle with each pixel in the page image.

DETAILED DESCRIPTION

The current document is directed to methods and systems that straighten curved text lines of text images in order to prepare the text images for accurate optical-character recognition. In a first subsection, below, a short introduction to computer architecture, digital images, and digital-image processing methods is provided with reference to FIGS. 1-12. In a second subsection, a detailed description of the currently disclosed methods and systems is provided with reference to FIGS. 13A-26G. In a final subsection, one implementation of the currently disclosed method is illustrated in control-flow diagrams, with reference to FIGS. 27A-U.

Figure 1:
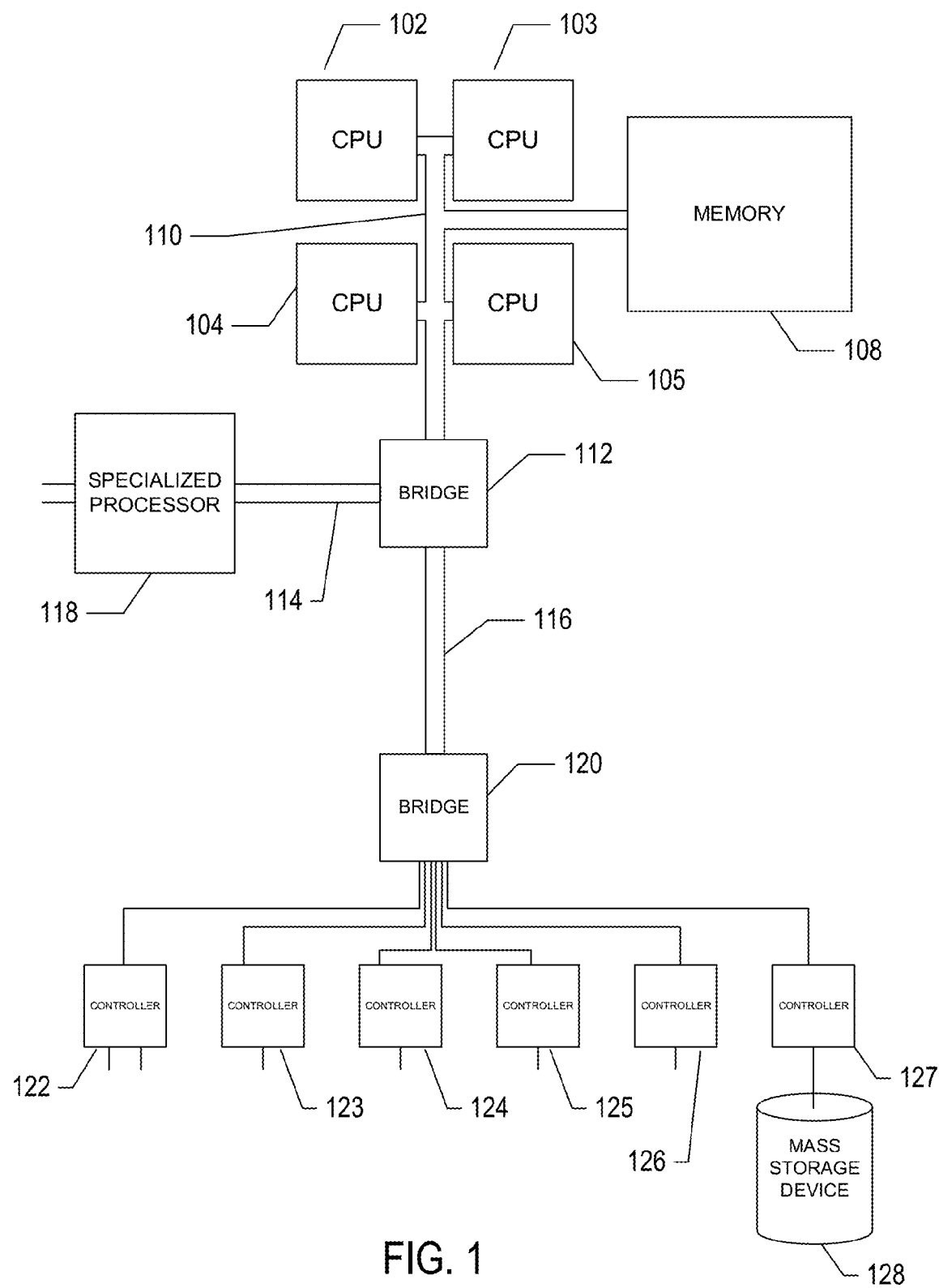
FIG. 1 provides a high-level architectural diagram of a computer system, such as a computer system in which the currently disclosed method is employed to ameliorate perspective-induced text-line curvature.

Overview of Computer Architecture, Digital Images, and Digital-Image Processing Methods FIG. 1 provides a high-level architectural diagram of a computer system, such as a computer system in which the currently disclosed method is employed to ameliorate perspective-induced text-line curvature. Mobile imaging devices, including smart phones and digital cameras, can be similarly diagramed and also include processors, memory, and internal busses. Those familiar with modern technology and science well appreciate that a control program or control routine comprising computer instructions stored in a physical memory within a processor-controlled device constitute the control component for the device and are as physical, tangible, and important as any other component of an electromechanical device, including image-capturing devices. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources.

Figure 2B:
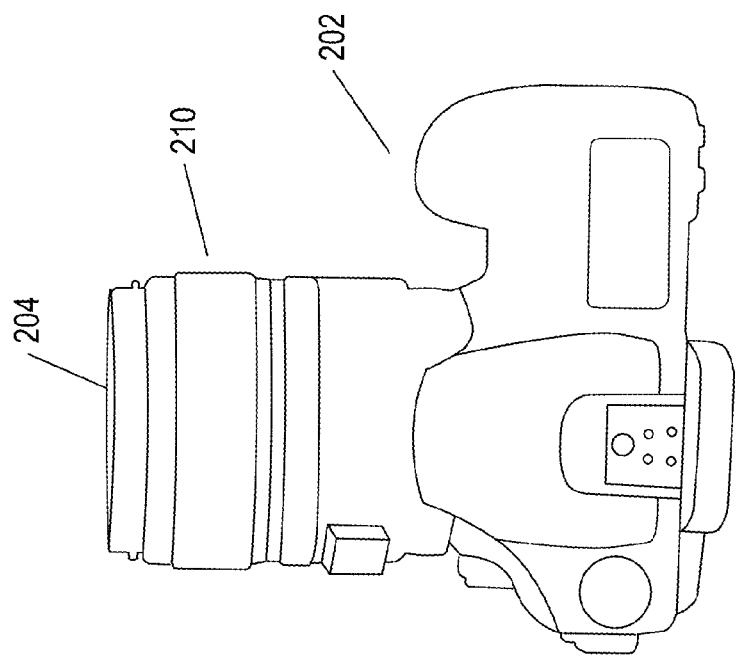
FIG. 2B illustrates two different types of hand-held imaging devices.
Figure 2A:
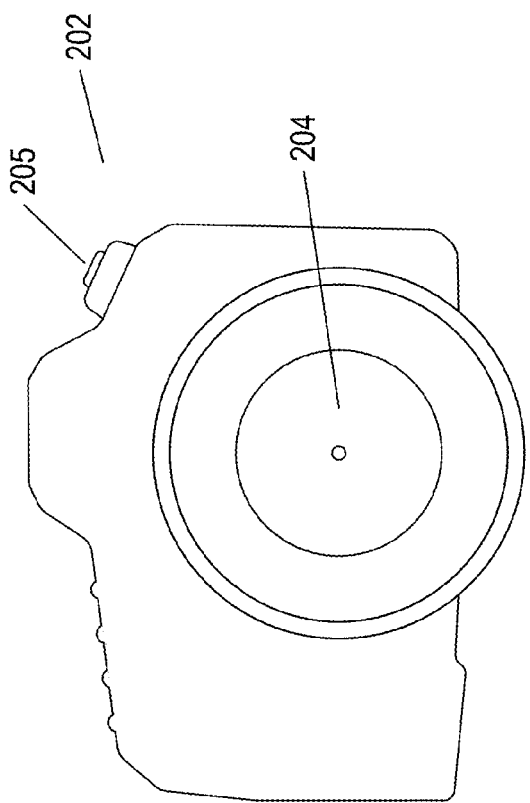
FIG. 2A illustrates two different types of hand-held imaging devices.
Figure 2C:
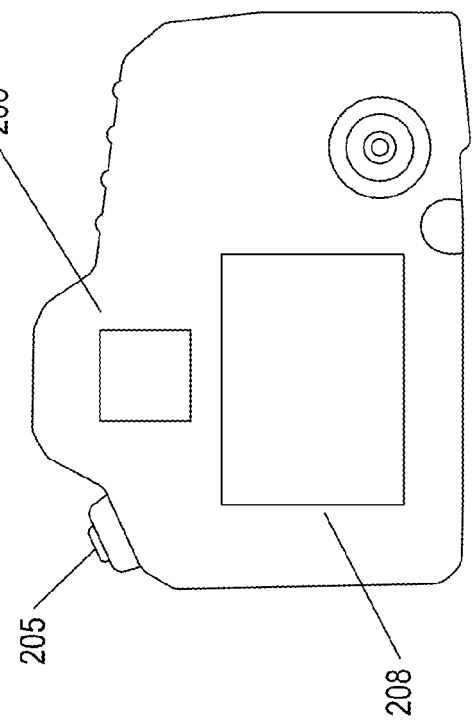
FIG. 2C illustrates two different types of hand-held imaging devices.

FIGS. 2A-D illustrate two different types of hand-held imaging devices. FIGS. 2A-C illustrate a digital camera 202. The digital camera includes an objective lens 204 and a shutter button 205 that, when depressed by a user, results in capture of a digital image corresponding to reflected light entering the lens 204 of the digital camera. On the back side of the digital camera, viewed by a user when the user is holding a camera to capture digital images, the digital camera includes a viewfinder 206 and an LCD viewfinder screen 208. The viewfinder 206 allows a user to directly view the image currently generated by the camera lens 204, while the LCD viewfinder screen 208 provides an electronic display of the image currently produced by the camera lens. Generally, the camera user adjusts the camera focus, using annular focus-adjusting features 210, while looking through the viewfinder 206 or observing the LCD viewfinder screen 208 in order to select a desired image prior to depressing the shutter button 205 to digitally capture the image and store the image in electronic memory within the digital camera.

Figure 2D:
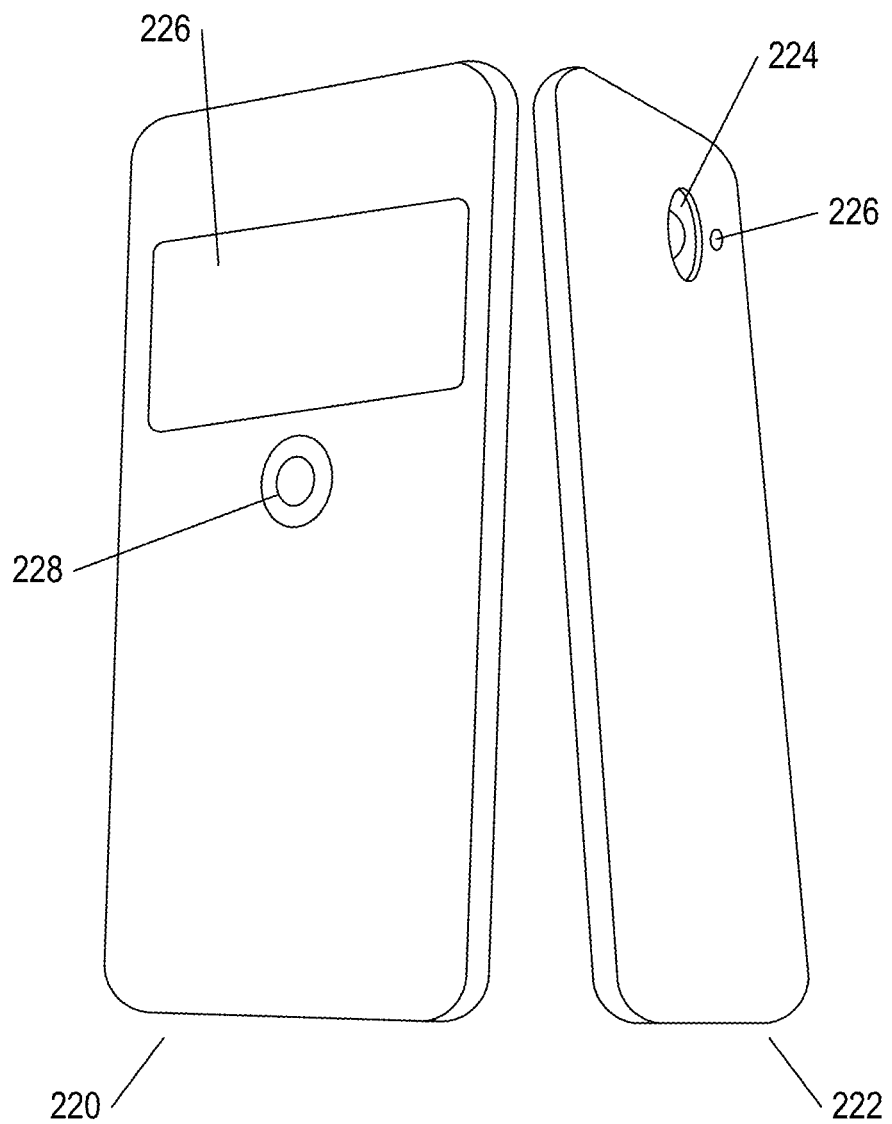
FIG. 2D illustrates two different types of hand-held imaging devices.

FIG. 2D shows a typical smart phone from the front side 220 and from the back side 222. The back side 222 includes a digital-camera lens 224 and digital light meter and/or proximity sensor 226. The front side of the smart phone 220 may, under application control, display the currently received image 226, similar to the LCD viewfinder display 208 of the digital camera, as well as a touch-sensitive shutter-button 228, input of a touch to which captures a digital image within the smart-phone memory.

Figure 3:
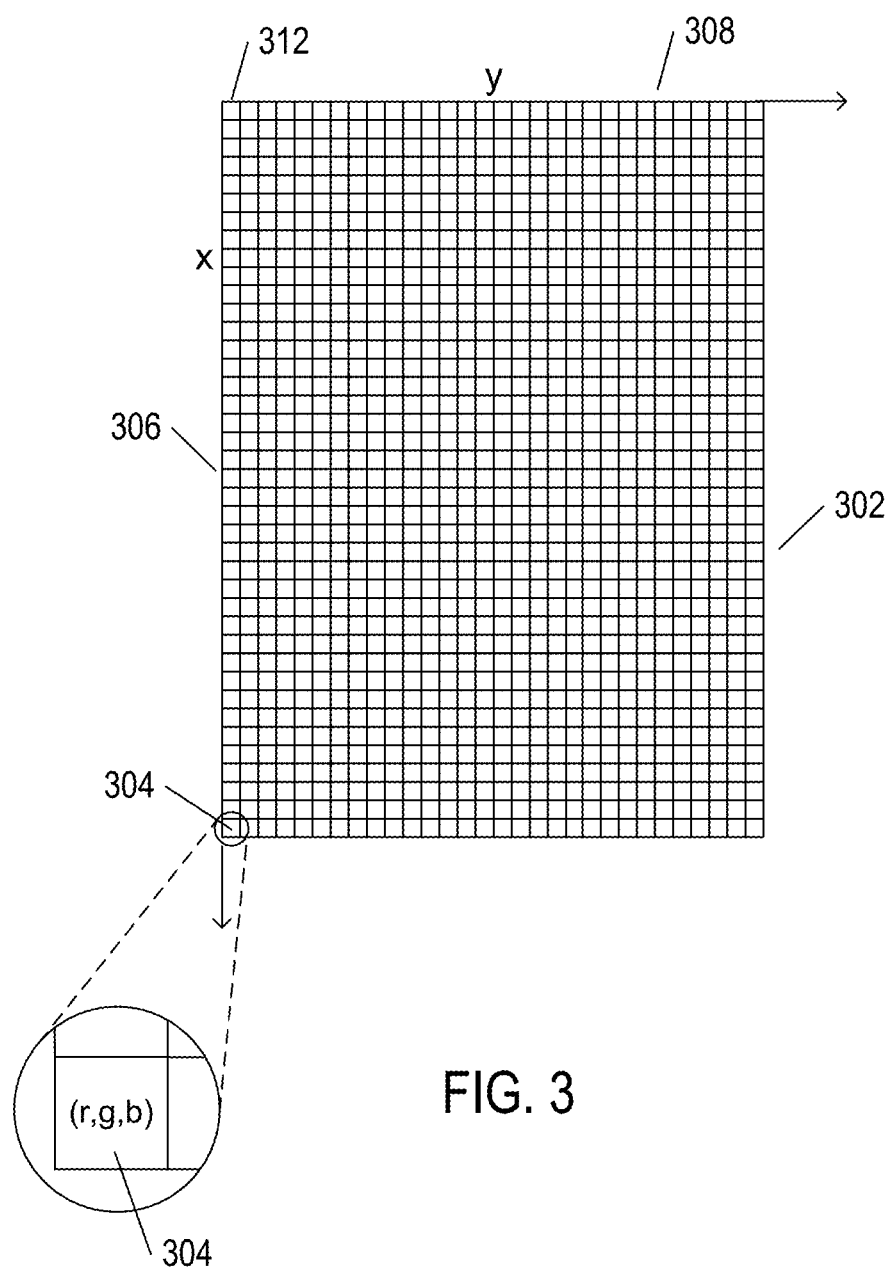
FIG. 3 illustrates a typical digitally encoded image.

FIG. 3 illustrates a typical digitally encoded image. The encoded image comprises a two dimensional array of pixels 302. In FIG. 3, each small square, such as square 304, is a pixel, generally defined as the smallest-granularity portion of an image that is numerically specified in the digital encoding. Each pixel is a location, generally represented as a pair of numeric values corresponding to orthogonal x and y axes 306 and 308, respectively. Thus, for example, pixel 304 has x, y coordinates (39,0), while pixel 312 has coordinates (0,0). The choice of axes is arbitrary. The x and y axes may be interchanged, for example, in another convention. In the digital encoding, the pixel is represented by numeric values that specify how the region of the image corresponding to the pixel is to be rendered upon printing, display on a computer screen, or other display. Commonly, for black-and-white images, a single numeric value range of 0-255 is used to represent each pixel, with the numeric value corresponding to the grayscale level at which the pixel is to be rendered. In a common convention, the value "0" represents black and the value "255" represents white. For color images, any of a variety of different color-specifying sets of numeric values may be employed. In one common color model, as shown in FIG. 3, each pixel is associated with three values, or coordinates (r,g,b), which specify the red, green, and blue intensity components of the color to be displayed in the region corresponding to the pixel.

Figure 4:
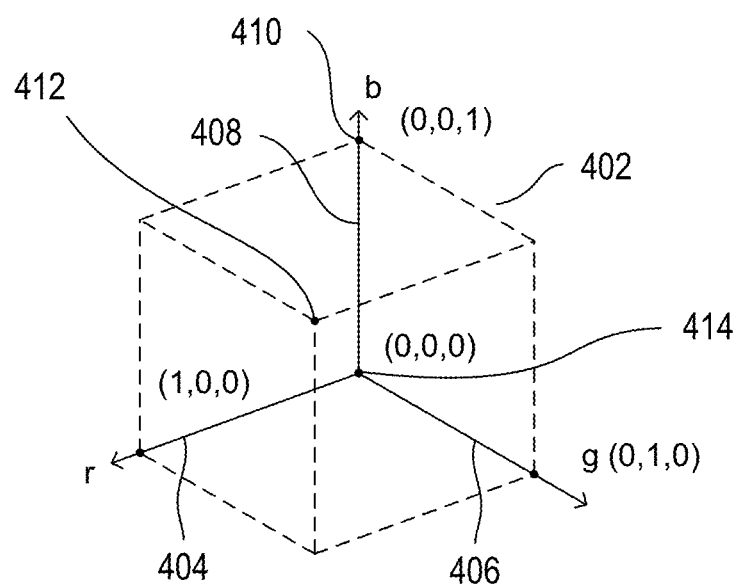
FIG. 4 illustrates one version of the RGB color model.

FIG. 4 illustrates one version of the RGB color model. The entire spectrum of colors is represented, as discussed above with reference to FIG. 3, by a three-primary-color coordinate (r,g,b). The color model can be considered to correspond to points within a unit cube 402 within a three-dimensional color space defined by three orthogonal axes: (1) r 404; (2) g 406; and (3) b 408. Thus, the individual color coordinates range from 0 to 1 along each of the three color axes. The pure blue color, for example, of greatest possible intensity corresponds to the point 410 on the b axis with coordinates (0,0,1). The color white corresponds to the point 412, with coordinates (1,1,1,) and the color black corresponds to the point 414, the origin of the coordinate system, with coordinates (0,0,0).

Figure 5:
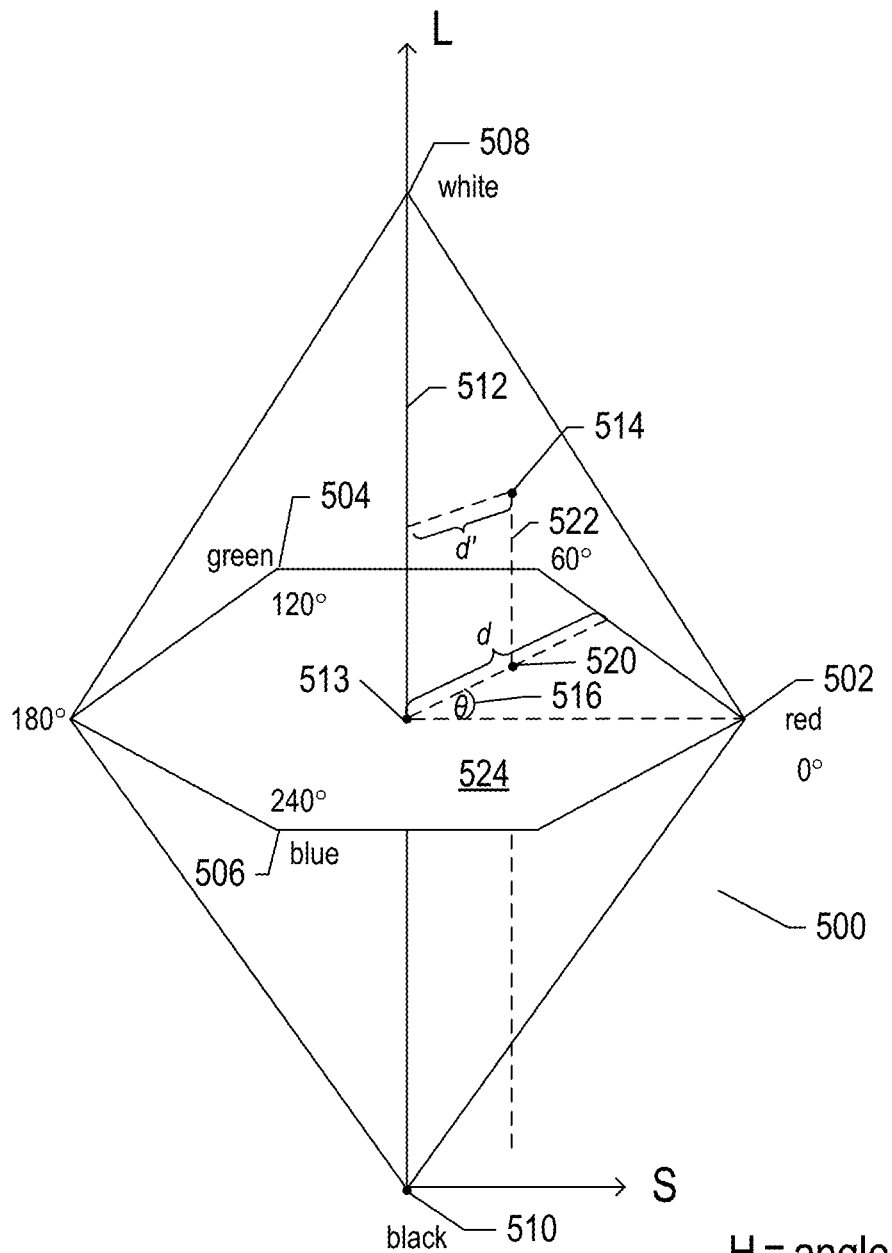
FIG. 5 shows a different color model, referred to as the "hue-saturation-lightness" ("HSL") color model.

FIG. 5 shows a different color model, referred to as the "hue-saturation-lightness" ("HSL") color model. In this color model, colors are contained within a three-dimensional bi-pyramidal prism 500 with a hexagonal cross section. Hue (h) is related to the dominant wavelength of a light radiation perceived by an observer. The value of the hue varies from 0° to 360° beginning with red 502 at 0°, passing through green 504 at 120°, blue 506 at 240°, and ending with red 502 at 660°. Saturation (s), which ranges from 0 to 1, is inversely related to the amount of white and black mixed with a particular wavelength, or hue. For example, the pure red color 502 is fully saturated, with saturation s=1.0, while the color pink has a saturation value less than 1.0 but greater than 0.0, white 508 is fully unsaturated, with s=0.0, and black 510 is also fully unsaturated, with s=0.0. Fully saturated colors fall on the perimeter of the middle hexagon that includes points 502, 504, and 506. A gray scale extends from black 510 to white 508 along the central vertical axis 512, representing fully unsaturated colors with no hue but different proportional combinations of black and white. For example, black 510 contains 100% of black and no white, white 508 contains 100% of white and no black and the origin 513 contains 50% of black and 50% of white. Lightness (l), or luma, represented by the central vertical axis 512, indicates the illumination level, ranging from 0 at black 510, with l=0.0, to 1 at white 508, with l=1.0. For an arbitrary color, represented in FIG. 5 by point 514, the hue is defined as angle θ 516 between a first vector from the origin 513 to point 502 and a second vector from the origin 513 to point 520, where a vertical line 522 that passes through point 514 intersects the plane 524 that includes the origin 513 and points 502, 504, and 506. The saturation is represented by the ratio of the distance of representative point 514 from the vertical axis 512, d', divided by the length of a horizontal line passing through point 520 from the origin 513 to the surface of the bi-pyramidal prism 500, d. The lightness is the vertical distance from representative point 514 to the vertical level of the point representing black 510. The coordinates for a particular color in the HSL color model, (h,s,l), can be obtained from the coordinates of the color in the RGB color model, (r,g,b), as follows:

$$l = \frac{(C_{max} - C_{min})}{2},$$

$$h = \begin{cases} 60° \times \left(\frac{g-b}{\Delta} \bmod 6\right), & \text{when } C_{max} = r \\ 60° \times \left(\frac{b-r}{\Delta} + 2\right), & \text{when } C_{max} = g \\ 60° \times \left(\frac{r-g}{\Delta} + 4\right), & \text{when } C_{max} = b \end{cases}, \text{ and}$$

$$s = \begin{cases} 0, \Delta = 0 \\ \frac{\Delta}{1 - |2l - 1|}, & \text{otherwise} \end{cases},$$

where r, g, and b values are intensities of red, green, and blue primaries normalized to the range [0, 1]; $C_{max}$ is a normalized intensity value equal to the maximum of r, g, and b; $C_{min}$ is a normalized intensity value equal to the minimum of r, g, and b; and $\Delta$ is defined as $C_{max} - C_{min}$.

Figure 6:
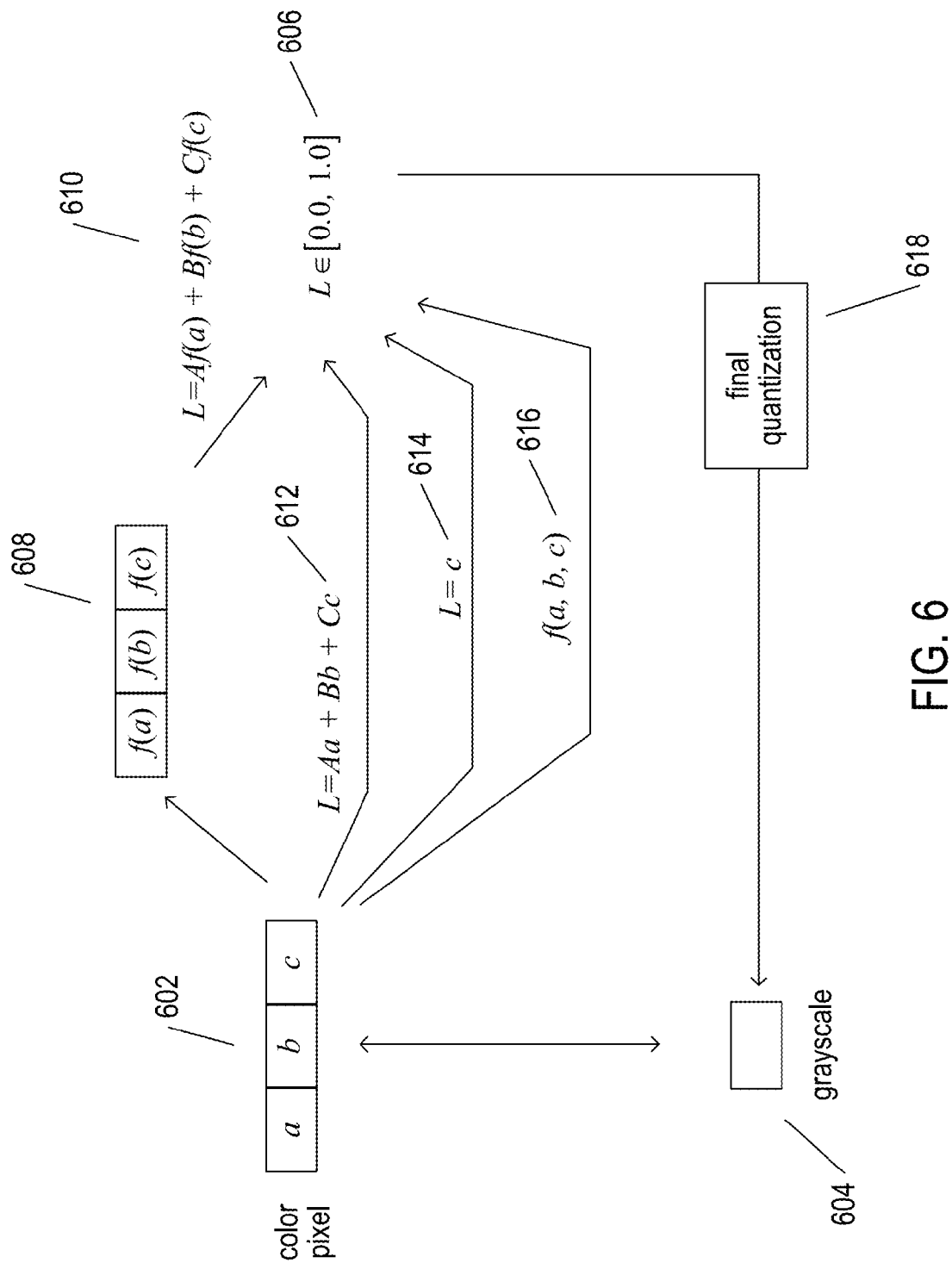
FIG. 6 illustrates generation of a grayscale or binary image from a color image.

FIG. 6 illustrates generation of a grayscale or binary image from a color image. In a color image, each pixel is generally associated with three values: a, b, and c 602. Different color models employ different values of a, b, and c to represent a particular color. A grayscale image includes only a single intensity value 604 for each pixel. A binary image is a special case of a grayscale image with only two different intensity values, "0" and "1." Commonly, grayscale images may have 256 or 65,536 different intensity values, with each pixel represented by a byte or 16-bit word, respectively. Thus, to transform a color image to grayscale, the three values a, b, and c in each color pixel need to be translated to single intensity value for the corresponding grayscale or binary-image pixel. In a first step, the three color values a, b, and c are transformed to a luminosity value L, generally in a range of [0.0, 1.0] 606. For certain color models, a non-trivial function is applied to each of the color values 608 and the results are summed 610 to produce the luminosity value. In other color models, each color value is multiplied by a coefficient and the results are summed 612 to produce the luminosity value. In yet other color systems, one of the three color values is, in fact, the luminosity value 614. Finally, in the general case, a function is applied to the three color values 616 to produce the luminosity value. The luminosity value is then quantized 618 to produce a grayscale intensity value within the desired range, generally [0, 255] for grayscale images and one of the two intensity values (0,1) for binary images.

Figure 7:
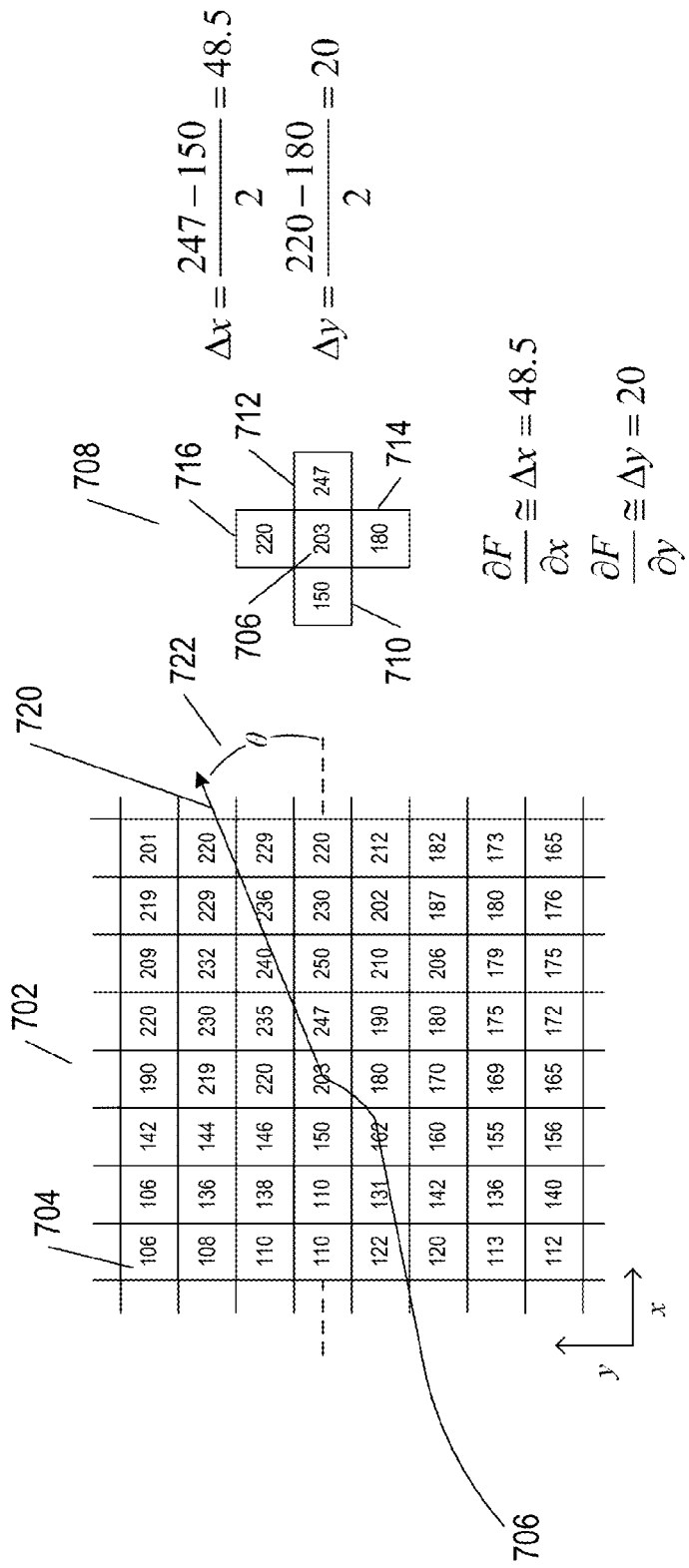
FIG. 7 illustrates a discrete computation of an intensity gradient.

FIG. 7 illustrates a discrete computation of an intensity gradient. In FIG. 7, a small square portion 702 of a digital image is shown. Each cell, such as cell 704, represents a pixel and the numeric value within the cell, such as the value "106" in cell 704, represents a grayscale intensity. Consider pixel 706 with the intensity value "203." This pixel, and four contiguous neighbors, are shown in the cross-like diagram 708 to the right of the portion 702 of the digital image. Considering the left 710 and right 712 neighbor pixels, the change in intensity value in the x direction, Δx, can be discretely computed as:

$$\Delta x = \frac{247 - 150}{2} = 48.5.$$

Considering the lower 714 and upper 716 pixel neighbors, the change in intensity in the vertical direction, Δy, can be computed as:

$$\Delta y = \frac{220 - 180}{2} = 20.$$

The computed Δx is an estimate of the partial differential of the continuous intensity function with respect to the x coordinate at the central pixel 706:

$$\frac{\partial F}{\partial x} \cong \Delta x = 48.5.$$

The partial differential of the intensity function F with respect to the y coordinate at the central pixel 706 is estimated by Δy:

$$\frac{\partial F}{\partial y} \cong \Delta y = 20.$$

The intensity gradient at pixel 706 can then be estimated as:

$$\text{gradient} = \nabla F = \frac{\partial F}{\partial x} i + \frac{\partial F}{\partial y} j = 48.5 i + 20 j$$

where i and j are the unit vectors in the x and y directions. The magnitude of the gradient vector and the angle of the gradient vector are then computed as:

$$|\text{gradient}| = \sqrt{48.5^2 + 20^2} = 52.5$$

$$\theta = a\tan 2(20, 48.5) = 22.$$

The direction of the intensity gradient vector 720 and the angle θ 722 are shown superimposed over the portion 702 of the digital image in FIG. 7. Note that the gradient vector points in the direction of steepest increase in intensity from pixel 706. The magnitude of the gradient vector indicates an expected increase in intensity per unit increment in the gradient direction. Of course, because the gradient is only estimated by discrete operations, in the computation illustrated in FIG. 7, both the direction and magnitude of the gradient are merely estimates.

Figure 8:
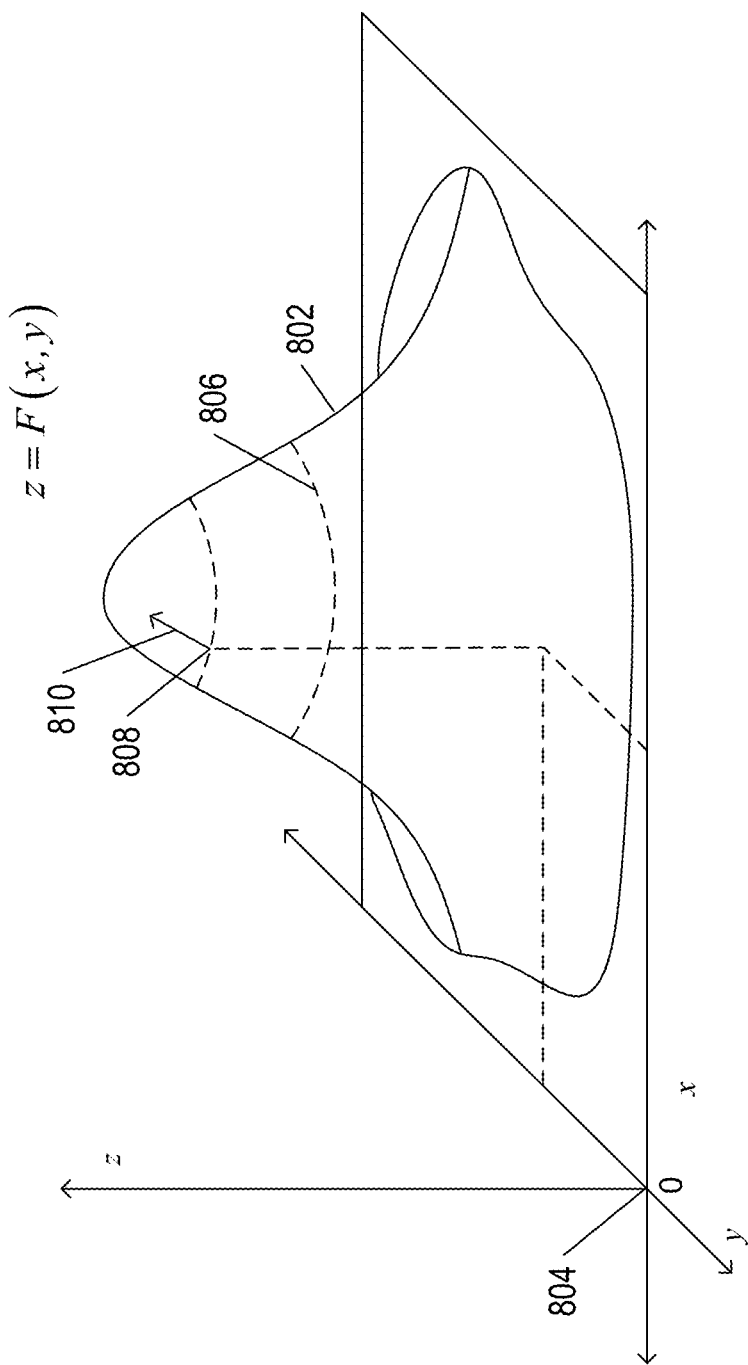
FIG. 8 illustrates a gradient computed for a point on a continuous surface.

FIG. 8 illustrates a gradient computed for a point on a continuous surface. FIG. 8 illustrates a continuous surface z=F(x,y). The continuous surface 802 is plotted with respect to a three-dimensional Cartesian coordinate system 804, and has a hat-like shape. Contour lines, such as contour line 806, can be plotted on the surface to indicate a continuous set of points with a constant z value. At a particular point 808 on a contour plotted on the surface, the gradient vector 810 computed for the point is perpendicular to the contour line and points in the direction of the steepest increase along the surface from point 808.

Figure 9:
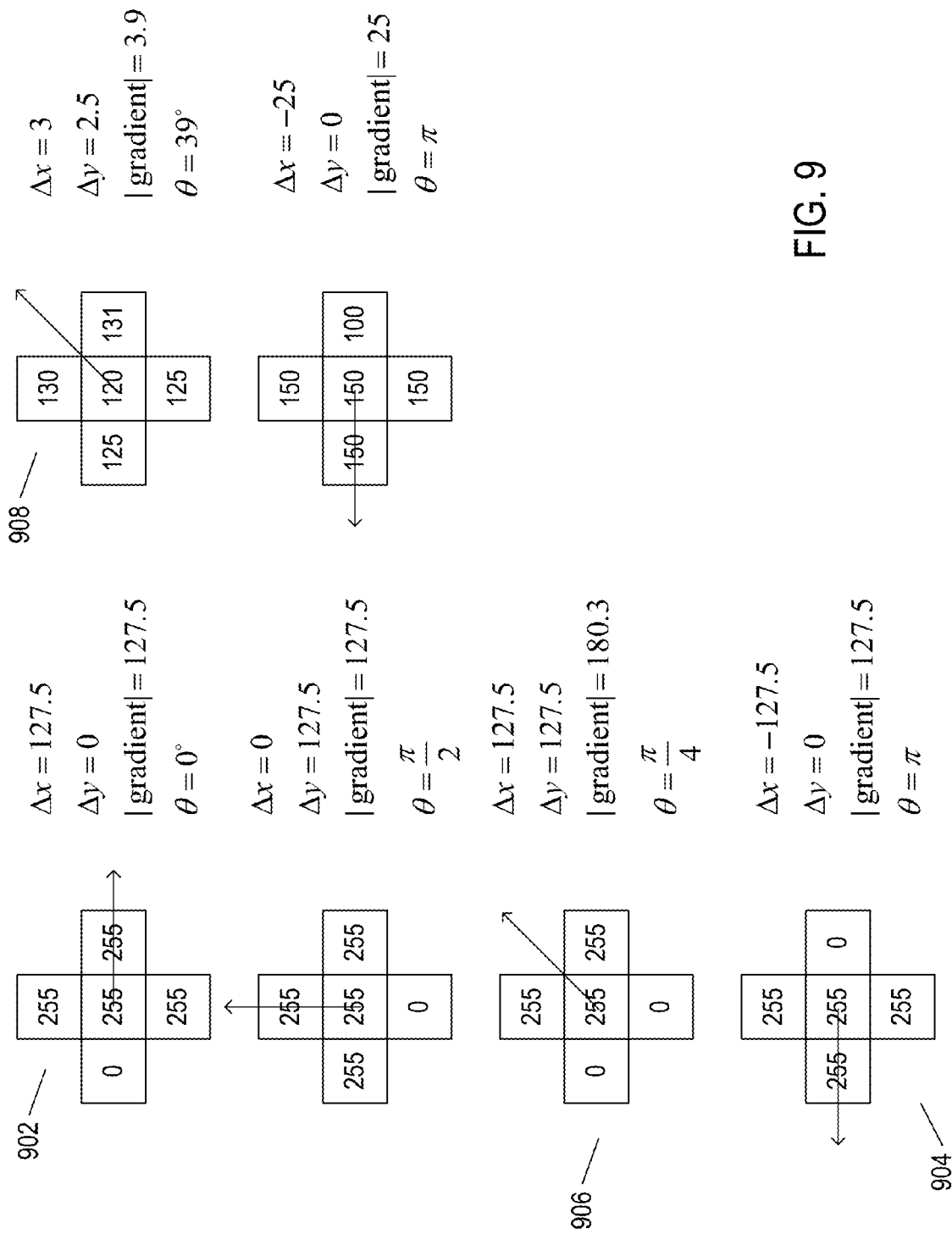
FIG. 9 illustrates a number of intensity-gradient examples.

In general, an intensity gradient vector is oriented perpendicularly to an intensity edge, and the greater the magnitude of the gradient, the sharper the edge. An edge features differences in intensities of the pixels on either side of the edge with common signs or, in other words, the intensity changes in a similar fashion for adjacent lines of pixels perpendicular to the edge. FIG. 9 illustrates a number of intensity-gradient examples. Each example, such as example 902, includes a central pixel for which the gradient is computed and the four contiguous neighbors used to compute Δx and Δy. The sharpest intensity boundaries are shown in the first column 904. In these cases, the magnitude of the gradient is at least 127.5 and, for the third case 906, 180.3. A relatively small difference across an edge, shown in example 908, produces a gradient with a magnitude of only 3.9. In all cases, the gradient vector is perpendicular to the apparent direction of the intensity edge through the central pixel.

Figure 10:
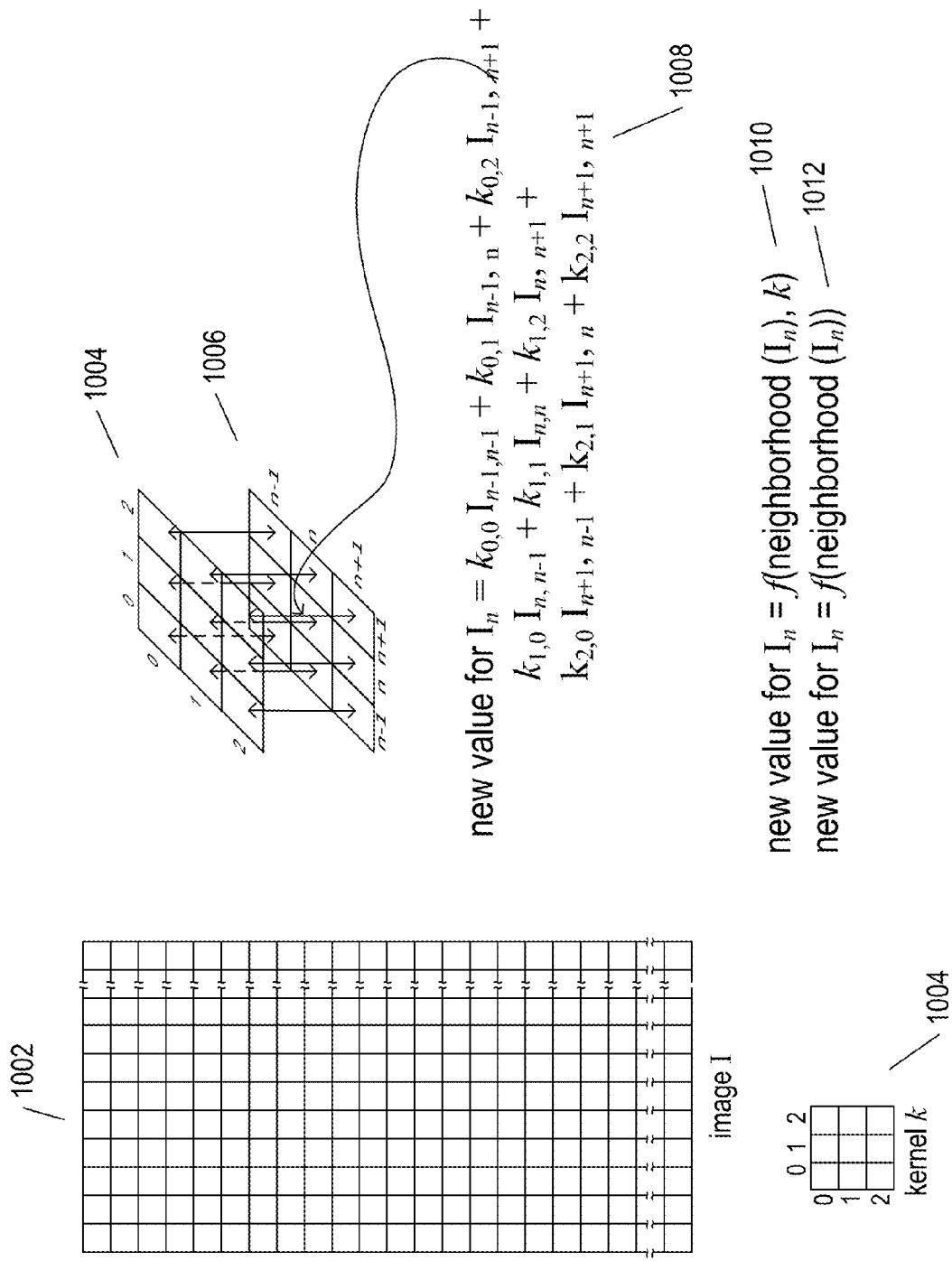
FIG. 10 illustrates application of a kernel to an image.

Many image-processing methods involve application of kernels to the pixel grid that constitutes the image. FIG. 10 illustrates application of a kernel to an image. In FIG. 10, a small portion of an image I 1002 is shown as a rectilinear grid of pixels. A small 3×3 kernel k 1004 is shown below the representation of image I 1002. A kernel is generally applied to each pixel of an image to carry out a kernel-based processing operation on the image. In the case of a 3×3 kernel, such as kernel k 1004 shown in FIG. 10, a modified kernel may be used for edge pixels or the image can be expanded by copying the intensity values in edge pixels to a circumscribing rectangle of pixels so that the kernel can be applied to each pixel of the original image. To apply the kernel to an image pixel, the kernel 1004 is computationally layered over a neighborhood of the pixel 1006 within the image having the same dimensions, in pixels, as the kernel. Application of the kernel to the neighborhood of the pixel to which the kernel is applied produces a new value for the pixel in a transformed image produced by the kernel-based operation. For certain types of kernels and kernel-based operations, the new value for the pixel to which the kernel is applied, $I_n$, is obtained as the sum of the products of the kernel value and pixel aligned with the kernel value 1008. In other cases, the new value for the pixel is a more complex function of the neighborhood about the pixel and the kernel 1010. In yet other types of image processing, a new value for a pixel is generated by a function applied to the neighborhood of the pixel, without using a kernel 1012.

Figure 11:
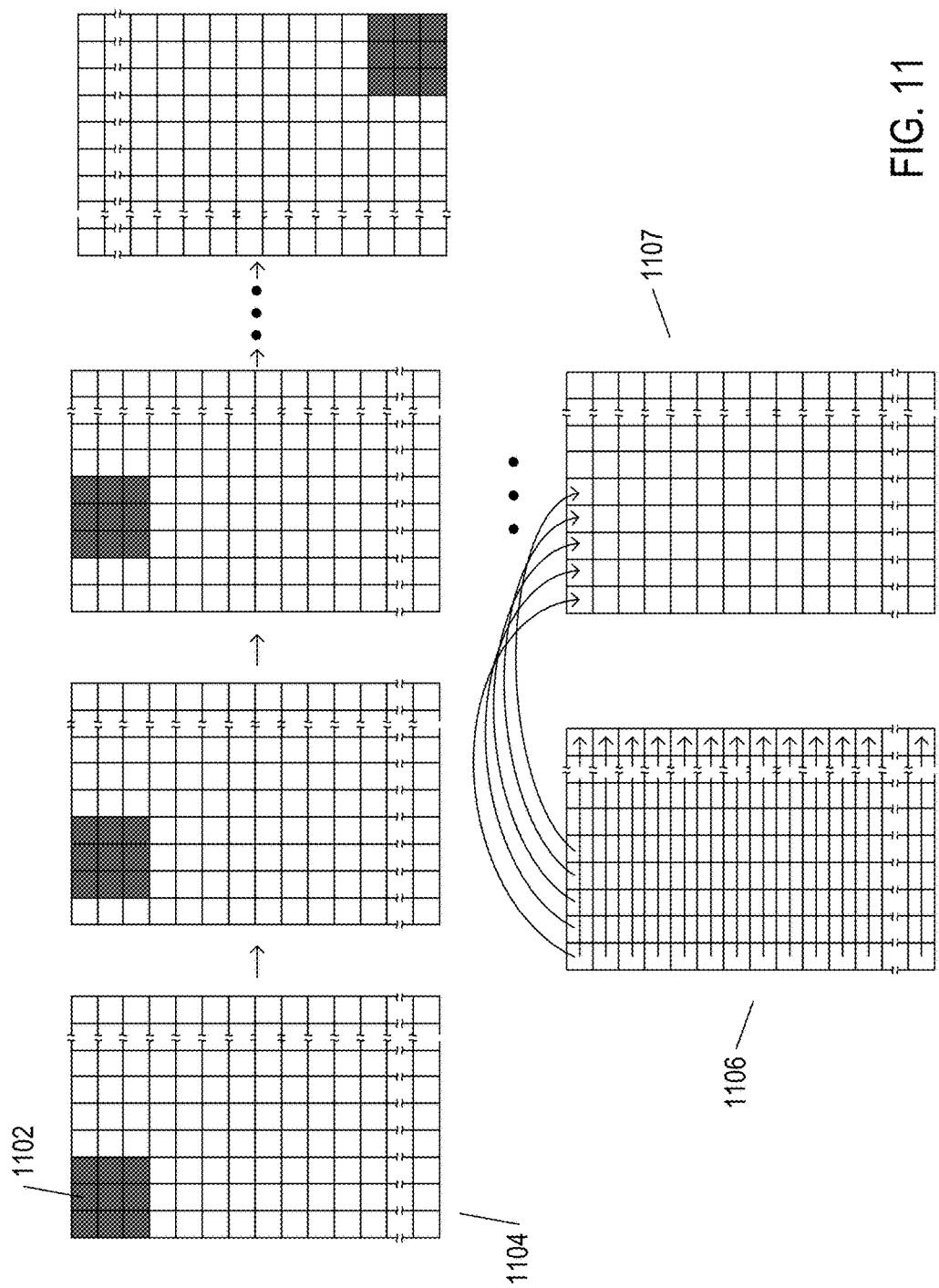
FIG. 11 illustrates convolution of a kernel with an image to produce a transformed image.

FIG. 11 illustrates convolution of a kernel with an image to produce a transformed image. In general, the kernel is sequentially applied to each pixel of an image. In some cases, the kernel is applied only to each non-edge pixel of an image. In FIG. 11, a 3×3 kernel, shown by shading 1102, is sequentially applied to the first row of non-edge pixels in an image 1104. Each new value generated by application of a kernel to a pixel in the original image 1106 is then placed into the transformed image 1107. In other words, the kernel is sequentially applied to the original neighborhoods of each pixel in the original image to produce the transformed values of the pixels included in the transformed image. This process is referred to as "convolution" and is somewhat related to the mathematical convolution operation computed by multiplying Fourier-transformed images and then carrying out an inverse Fourier transform on the product.

Figure 12:
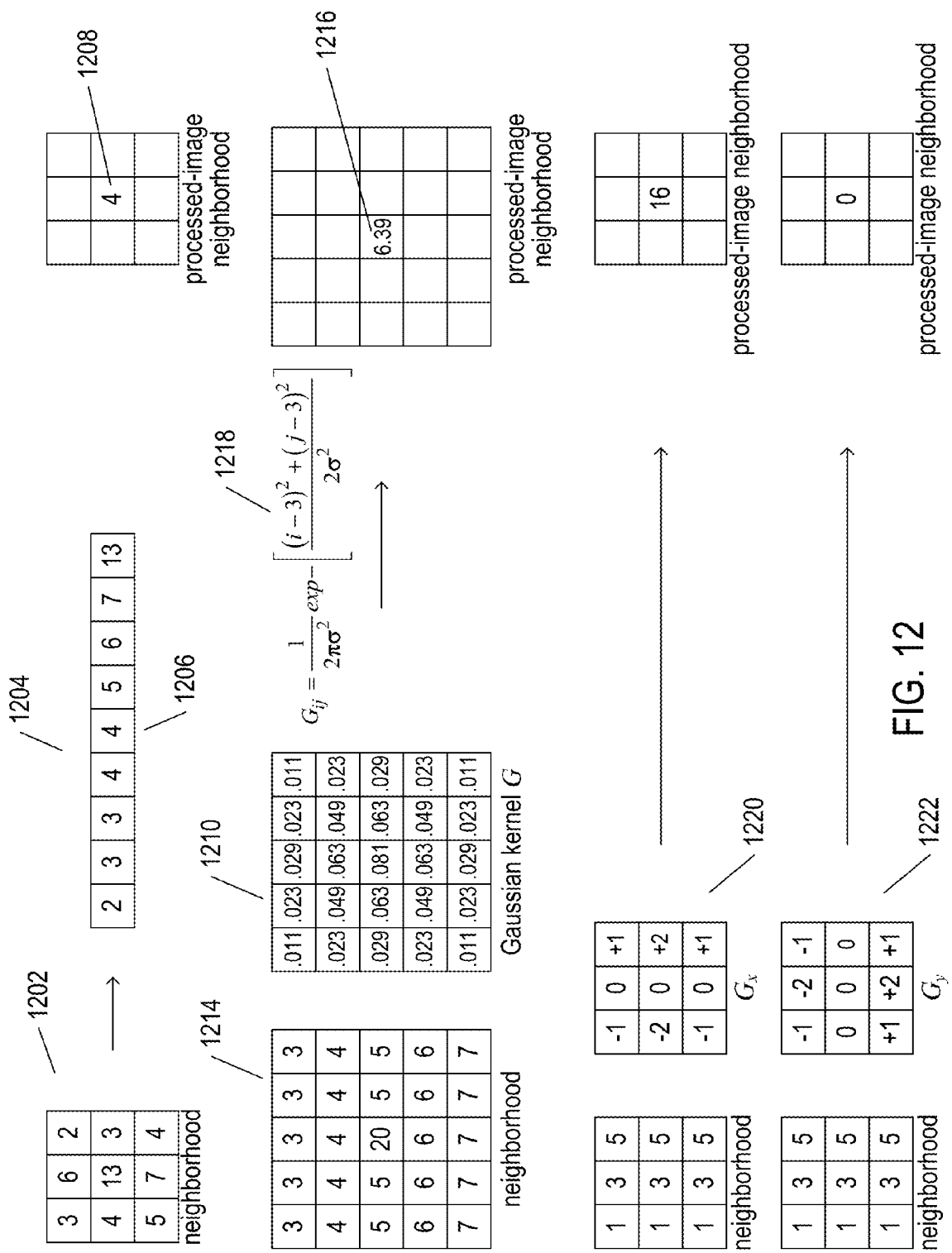
FIG. 12 illustrates example kernel and kernel-like image-processing techniques.

FIG. 12 illustrates example kernel and kernel-like image-processing techniques. In the process referred to as "median filtering," the intensity values of a pixel and the pixels in a neighborhood of the pixel in the original image 1202 are sorted 1204 in ascending-magnitude order and the median value 1206 is selected as the value 1208 for the pixel in the transformed image. Gaussian smoothing and denoising involves applying a Gaussian kernel 1210 to each neighborhood 1214 of the original image to produce the value for the central pixel of the neighborhood 1216 in the corresponding neighborhood of the processed image. The values in the Gaussian kernel are computed by an expression, such as expression 1218, to produce a discrete representation of a Gaussian surface, above the neighborhood, formed by rotation of a bell-shaped curve about a vertical axis coincident with the central pixel. The horizontal and vertical components of the image gradient for each pixel is estimated by application of the corresponding $G_x$ 1220 and $G_y$ 1222 gradient kernels. These are only three of the many different types of convolution-based image-processing techniques.

Methods and Systems to which the Current Document is Directed

Figure 13A:
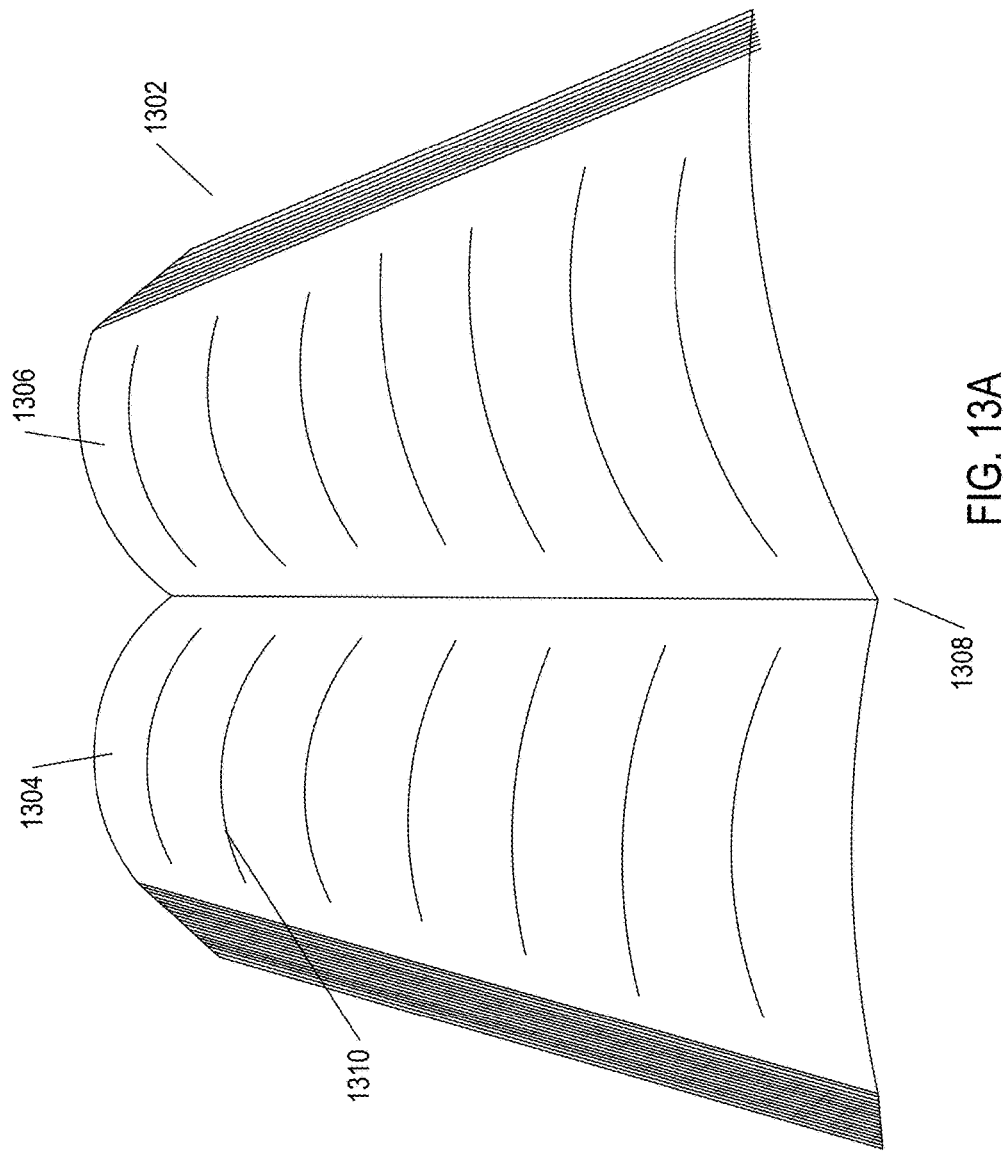
FIG. 13A illustrates one implementation of the method to which the current document is directed.
Figure 13B:
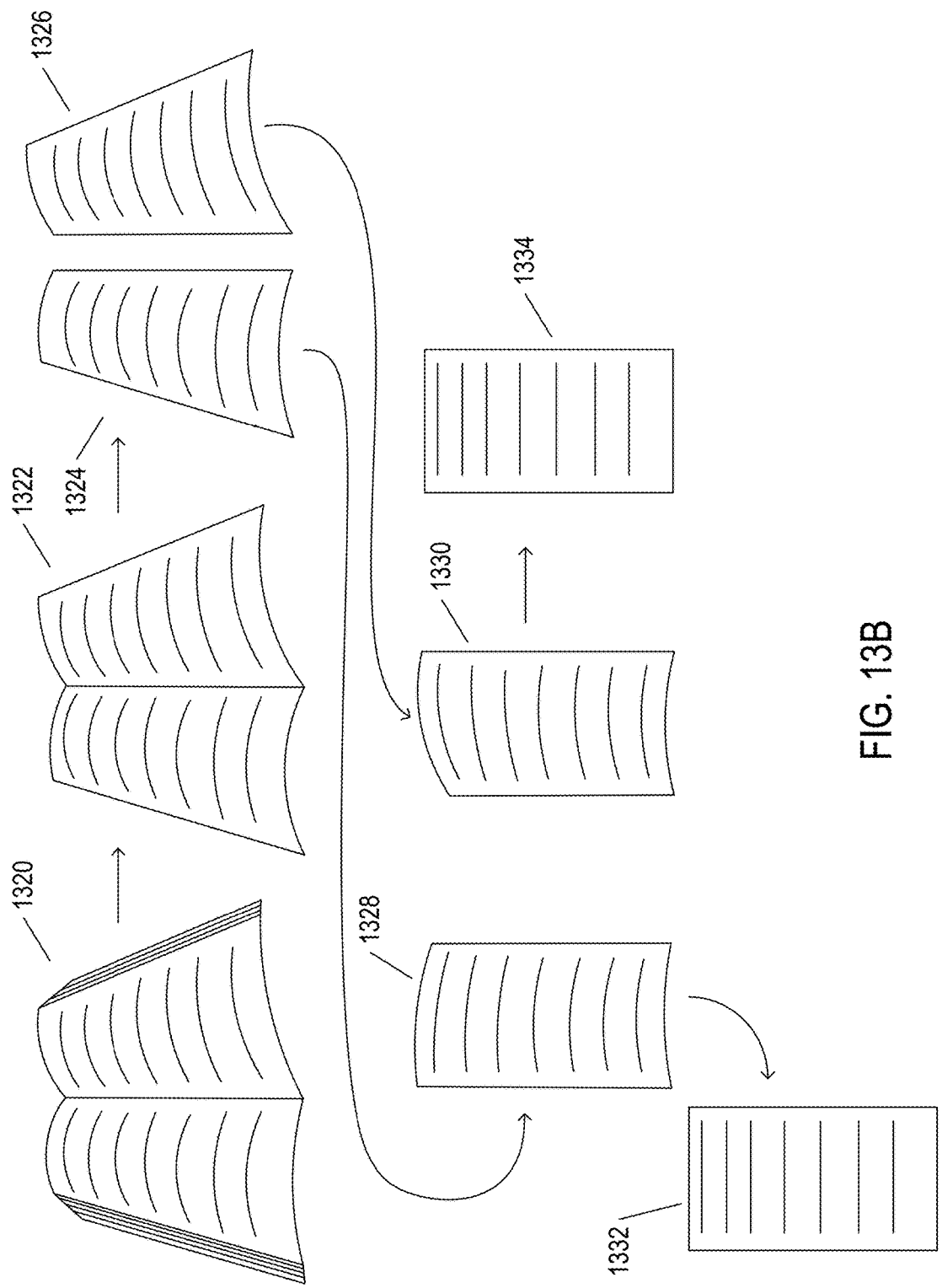
FIG. 13B illustrates one implementation of the method to which the current document is directed.

FIGS. 13A-B illustrate one implementation of the method to which the current document is directed. This implementation specifically addresses text-line curvature in images of open books. However, the same method or similar methods can be used to ameliorate a wide variety of text-line curvature encountered in many different types of digital images that contain text.

FIG. 13A shows an open book. The open book 1302 has two exposed pages 1304 and 1306. Because the pages are anchored along the spine of the book 1308, when the book is opened and placed cover-down on a surface, the pages arc up and away from the spine, curving the page surfaces. In an image of the open book acquired by a digital camera, the text lines, such as text line 1310, are therefore curved, not only because the page surfaces are actually curved, but also because of perspective-induced curvature. However, were the page flattened and viewed from above, the text lines would appear to be linear and the symbols and words contained in the text lines would appear to be arranged in a familiar rectilinear pattern. When text lines are curved and distorted due to perspective and to curvature in the pages of an open book, the characters and symbols within the text lines are distorted and nonlinearly compressed, which significantly complicates automated optical-character recognition of the characters and symbols in a text image.

FIG. 13B illustrates processing steps undertaken by the currently disclosed method to process the image of the open book, discussed above with reference to FIG. 13A. The image of the open book 1320 is processed in a first step to isolate only the portion of the image corresponding to the two pages of the book 1322. In a next step, separate images are prepared for each of the two pages 1324 and 1326. In each of these two single-page images, the page is rotated, when not vertically oriented in the original image 1320, to be vertically oriented. In a next step carried out on each of the two images 1324 and 1326, the single-page image is processed so that the non-spine-adjacent edge of the page is also vertically oriented, or parallel to the spine-adjacent edge, producing images 1328 and 1330. In a final step, the curved top and bottom edges of each image are straightened, along with the text lines within the page, to produce final processed images 1332 and 1334 in each of which the page appears to be rectangular, as if acquired from directly above a centroid of the page with the optical axis of the imaging device normal to the page. There are many additional operations that can be performed, including rescaling, sharpening, and other image-processing operations that further improve the page image for optical character recognition.

Figure 14A:
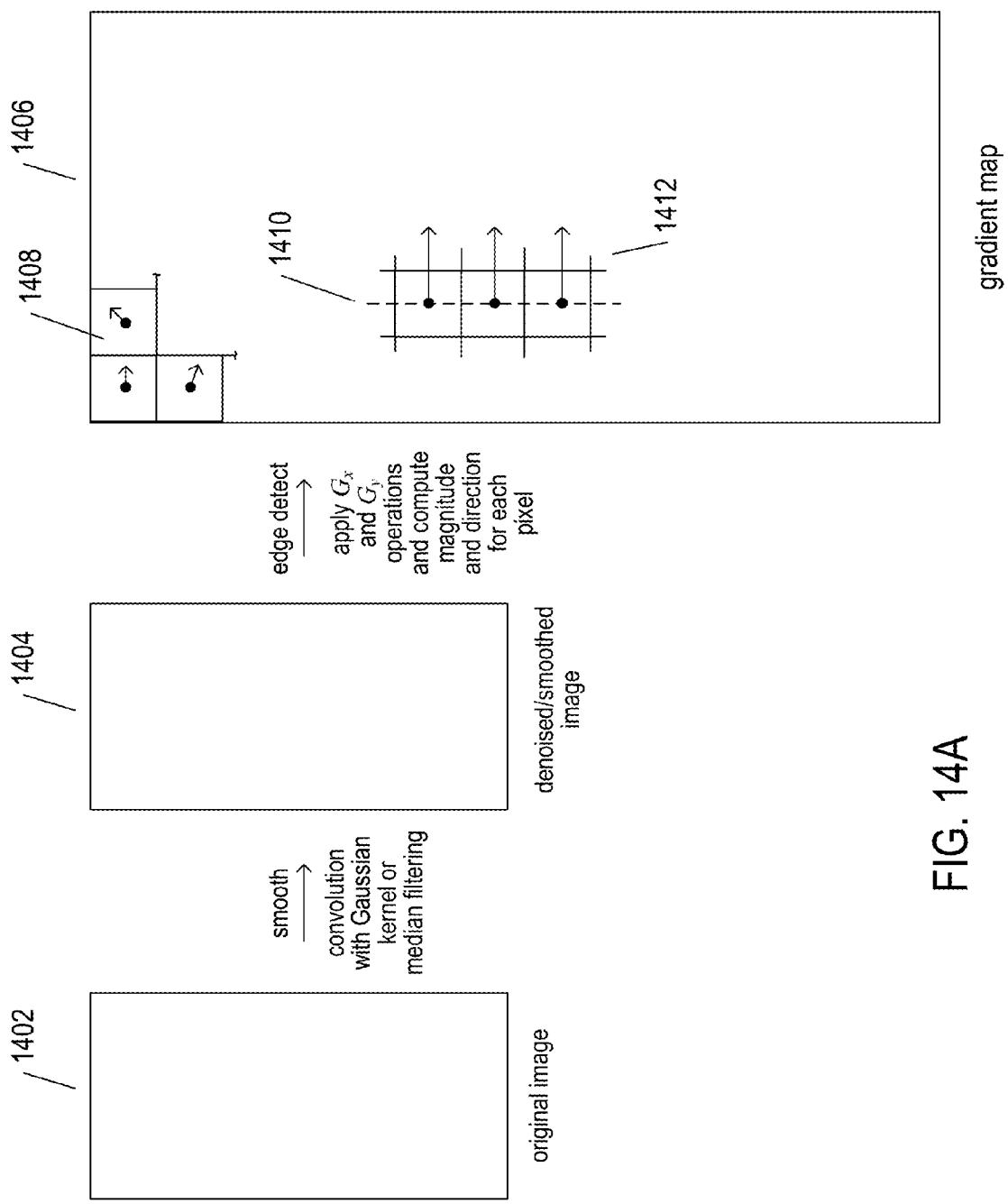
FIG. 14A illustrates initial processing of a page image in order to prepare for aligning the vertical edges of the page, as described above with reference to FIG. 13B.

FIGS. 14A-D illustrate initial processing of a page image in order to prepare for aligning the edges of the page parallel to the spine, as described above with reference to FIG. 13B. As shown in FIG. 14A, the original page image 1402 is convolved with a Gaussian kernel, or a median-filtering technique is applied to the image, to produce a denoised and smoothed image 1404. Then, the two gradient kernels $G_x$ and $G_y$ are separately applied to the denoised and smoothed image to produce two gradient-component maps from which a gradient map 1406 is obtained, as discussed above with reference to FIGS. 7-9. In the gradient map, each pixel, such as pixel 1408, is associated with a gradient direction and a gradient magnitude. Edges, such as the outline of a page in a page image, can be detected from the gradient map as a line or curve of pixels with associated gradient vectors having similar orientations, having directions perpendicular to the line or curve, and having relatively large magnitudes. For example, as shown in FIG. 14A, a vertical edge 1410 within the image would correspond to a column 1412 of pixels in the gradient map with large-magnitude vectors pointing in the same direction and perpendicular to the edge. Gradient-magnitude thresholding and various continuity-based techniques can be employed to extract edges from the gradient map corresponding to intensity boundaries within the original image. Other well-known edge-detection methods are similarly applied, in alternative implementations, to detect edges in the page image.

Figure 14B:
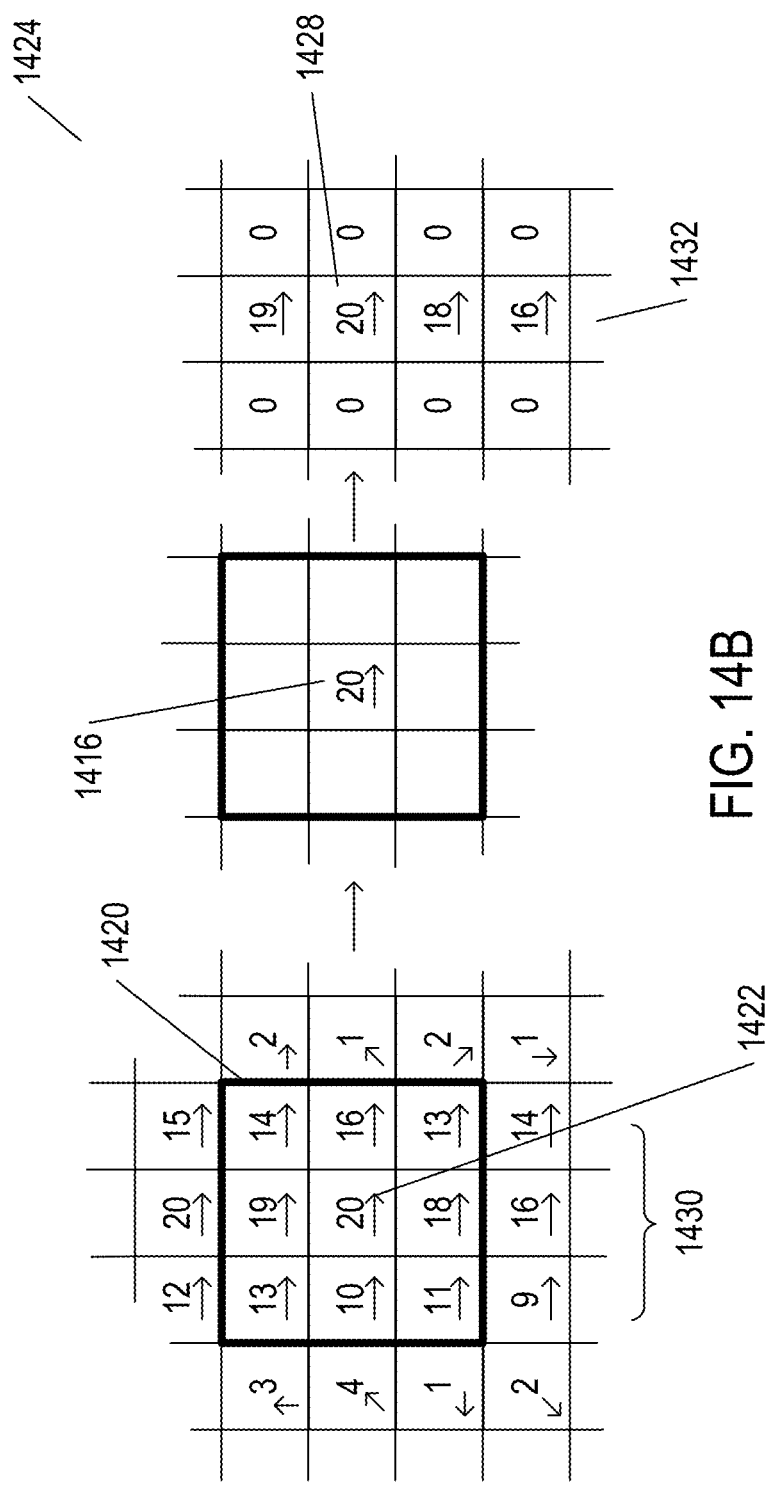
FIG. 14B illustrates initial processing of a page image in order to prepare for aligning the vertical edges of the page, as described above with reference to FIG. 13B.

As shown in FIG. 14B, a non-maximum-suppression technique applied as a function to pixel neighborhoods within the gradient map is employed to thin the edges so that well-defined edges can be extracted from the page image. In FIG. 14B, a 3×3 neighborhood 1420 about a central gradient-map cell or element 1422 is used to decide whether or not to retain the value of the central cell or element 1422 in a transformed image 1424. When the central pixel has the maximum magnitude along the gradient direction within the neighborhood 1426, then it is retained 1428 in the transformed gradient map produced by non-maximum suppression. Thus, non-maximum gradient magnitudes perpendicular to an edge are suppressed, or set to 0, in order to thin a multi-pixel edge 1430 in the original gradient map to a single-pixel edge 1432 in the transformed gradient map.

Figure 14C:
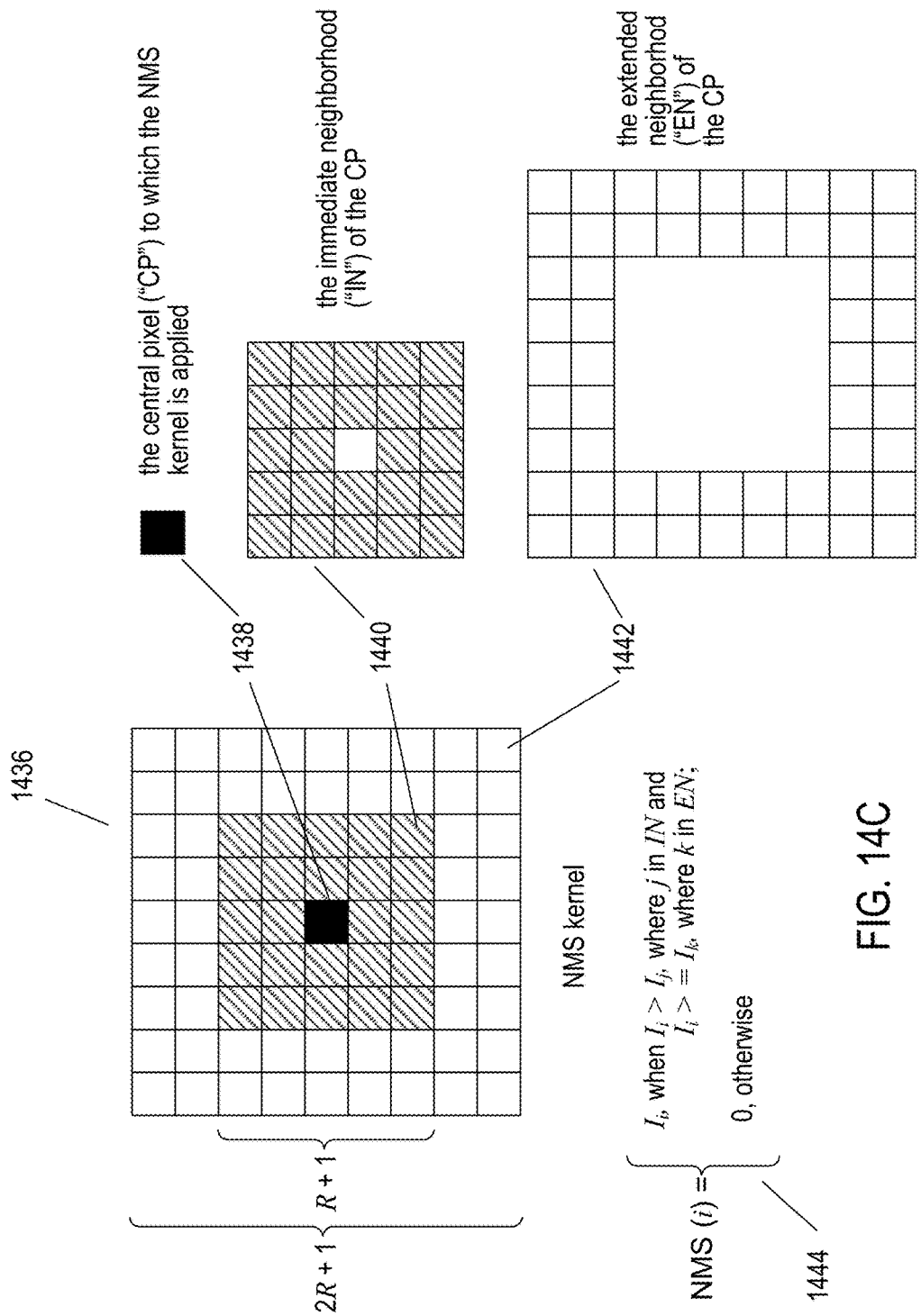
FIG. 14C illustrates initial processing of a page image in order to prepare for aligning the vertical edges of the page, as described above with reference to FIG. 13B.

FIG. 14C illustrates a general non-maximum-suppression kernel ("NMS kernel") that can be convolved with an image. The NMS kernel 1436 includes three regions: (1) the central pixel 1438; (2) an immediate neighborhood 1440; and (3) an extended neighborhood 1442. Application of the NMS kernel to a pixel involves overlaying the NMS kernel so that the central-pixel region 1438 of the NMS kernel overlies the pixel to which the kernel is applied. Application of the kernel is used to decide whether or not the intensity of the pixel to which the kernel applied is transferred to the corresponding pixel or cell of the result image or map, or whether, instead, a low-intensity value, which may any numeric intensity value appropriate for the image or map, is transferred to the result map or image. When the intensity of the pixel underlying the central pixel of the NMS kernel is greater than the intensity of any pixel underlying the intermediate neighborhood of the NMS kernel and when the intensity of the pixel underlying the central-pixel region is greater or equal to the intensity of any pixel underlying the extended neighborhood of the NMS kernel, the intensity value of the central pixel is transferred to the resultant image or map. Otherwise, the value low-intensity is transferred to the resultant image or map. This decision process is formally expressed 1444 in FIG. 14C. Convolution of the NMS kernel with an image or map selects pixels or cells of the image or map with local maximal intensities for transfer to the resultant map or image.

Of course, operations such as non-maximum suppression can be carried out on an image in either of two different senses. For example, non-maximum suppression may consider grayscale value 255 to be maximum and grayscale value 0 to be minimum or may consider grayscale value 0 to be maximum and grayscale value 255 to be minimum. In general, the correspondence between numeric pixel values and maximum and minimum values is easily inferred from the context, such as white characters on a dark background vs. dark characters on a white background.

Figure 14D:
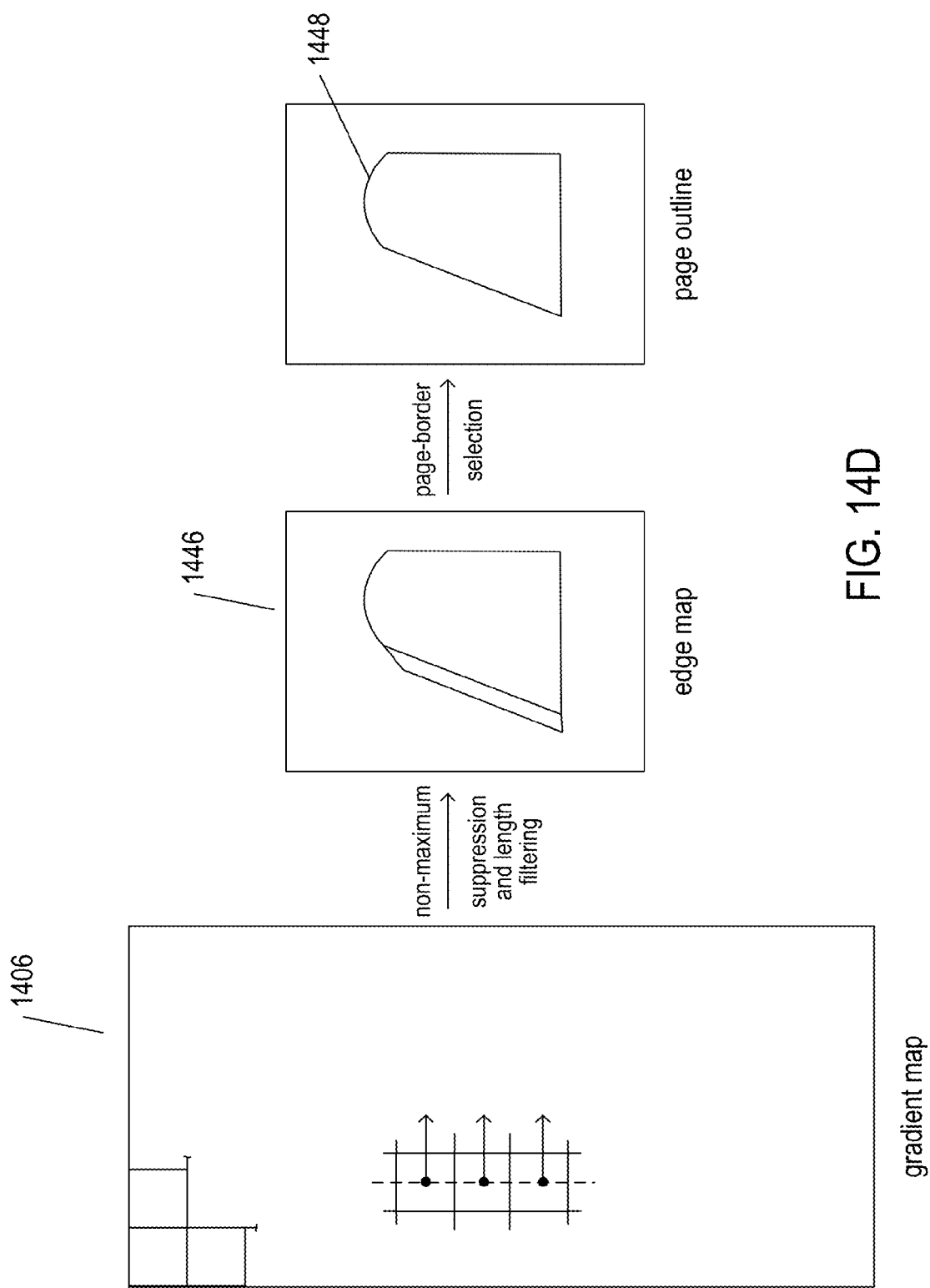
FIG. 14D illustrates initial processing of a page image in order to prepare for aligning the vertical edges of the page, as described above with reference to FIG. 13B.

As shown in FIG. 14D, non-maximum suppression and edge-length filtering is applied to the gradient map 1406 in order to produce an edge map 1446 from which the outline of the page 1448 can be extracted using the edges in the edge map and additional geometrical and intensity characteristics of pages. The additional characteristics may include using color information from the original open-book image to differentiate text pixels from background pixels, using expected shapes and sizes of books and book pages, and other information to filter the page edges from other, additional intensity edges discovered during the edge-detection processing discussed above with reference to FIGS. 14A-B.

FIGS. 15A-B illustrate one approach to vertical-page-edge alignment, or correction of the vertical perspective of the page, discussed above with reference to FIG. 13B. As shown in FIG. 15A, the page outline extracted from the non-maximum-suppressed gradient map is superimposed over the original page image to identify the page 1502 within the page image 1504. The page image is then rotated so that the spine-adjacent edge 1506 of the page is vertical. At this point in the process, the top 1508 and lower 1512 edges of the page are generally curved, the edge of the page parallel, but not adjacent, to the spine 1510 may be inclined with respect to the vertical direction by an angle α 1511, and the lower edge of the page 1512 may be oriented with respect to edge 1510 by an angle β 1513 and inclined from the vertical direction by an angle γ 1514. In a first step, pixels within the image are shifted in order to adjust the non-spine edge to a vertical orientation, as shown in intermediate image 1516, and, in a second step, pixels are reorganized within the image in order to adjust the lower edge 1512 to be horizontal 1518.

FIG. 15B illustrates one method for adjusting the orientation of a page edge. FIG. 15B illustrates the adjustment of the edge parallel, but not adjacent, to the spine so that it has a vertical orientation. Each horizontal line of pixels in the image is adjusted. For the horizontal line of pixels 1520, FIG. 15B shows a number of values obtained from the geometry of edge 1510 within the text image. The top corner of the page 1522 has coordinates (x,y). The intersection 1524 of the horizontal line of pixels 1520 and edge 1510 has coordinates (x',y'). The width of the page has a value X 1526. The point 1524 divides the horizontal line of pixels into two sections, one of length x' 1527 and the other of length X-x' 1528. In order to adjust the horizontal lines of pixels 1520 to bring edge 1510 to a vertical orientation, x-x' pixels 1530 need to be removed from the second portion 1528 of the horizontal line and the same number of pixels need to be added to the first portion 1527 of the horizontal pixel line. The horizontal pixel line 1532 is again shown on the right-hand, top portion of FIG. 15B. In a replicated depiction 1534, small vertical arrows labeled with the letter "d," such as arrow 1536, indicate pixels that are doubled within the first portion of the line of pixels and small vertical arrows labeled with the letter "r," such as arrow 1538, indicate pixels to be removed from the second portion of the line of pixels. Longer arrows, such as arrow 1540, illustrate a mapping between the pixels in the original horizontal pixel line 1532 and in a transformed horizontal pixel line 1542 following the pixel-doubling and pixel-deletion operations. As can be seen by comparing the original horizontal line of pixels 1534 with the transformed horizontal line of pixels 1542, the pixel intensity value at the position x' in the original line of pixels, indicated by shading 1544, is shifted to the right 1546 in the transformed horizontal pixel line 1542. The intensities of pixels added to the first portion of the pixel line and the intensities of the two pixels adjacent to each pixel removed from the second portion of the line of pixels may be modified to avoid sharp discontinuities in pixel-intensity gradients. As shown in FIG. 15B, pixels are doubled and removed at fixed intervals across the line of pixels, to avoid local distortions. Many other techniques and variations on the technique illustrated in FIG. 15B can be used to adjust the orientation of a page edge within the page image, in alternative implementations, or to correct the vertical perspective of the page. In certain cases, for example, the page edge may not be visible in the original image, so that other signposts or landmarks within the image are employed to carry out an equivalent operation, without the use of the page edge. The illustrated method is slightly modified to adjust the edge parallel, but not adjacent, to the spine in the image of the opposite page in a two-page book image.

Once the sub-image for each page, referred to below as a "page image," has been recognized, a next step in many implementations is to determine the direction of the text lines within the page. In the following discussion, it is assumed that the text lines are English, German, Russian, or another Western language with the characters sequenced from the left margin to the right margin within horizontal text lines. Similar methods can be used for languages for which character lines have vertical orientations. It should also be noted that, in addition to straightening images of open books, the currently disclosed methods and systems can be used to straighten text lines in single-text-page images and other types of text-containing images. In many of those cases, initial processing steps would identify the boundaries of a single page, rather than two pages.

Figure 16A:
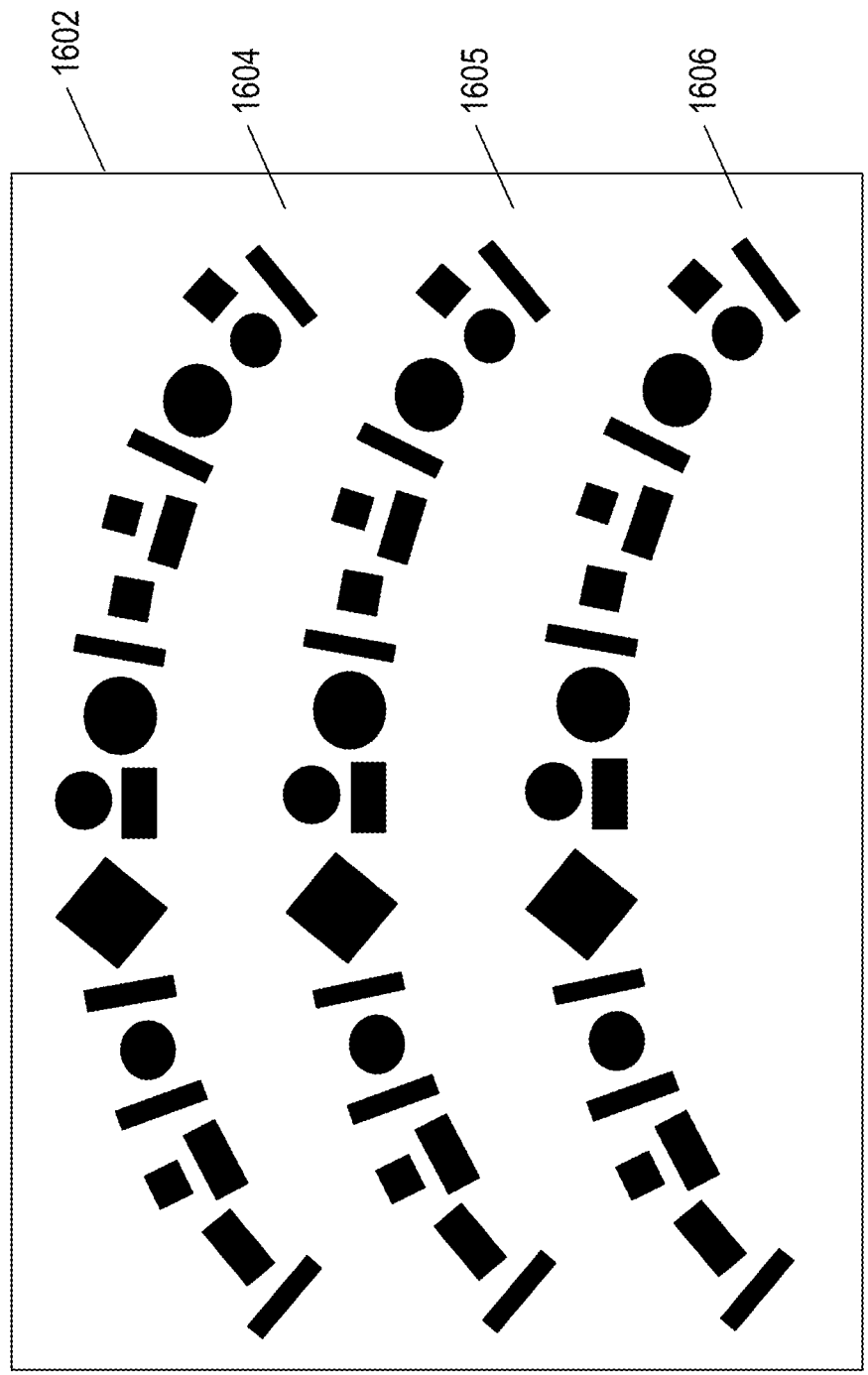
FIG. 16A illustrates one approach to determining the orientation of text lines within a page image or, equivalently, determining a rotational orientation of a page image so that the text lines are horizontal.

FIGS. 16A-D illustrate one approach to determining the orientation of text lines within a page image or, equivalently, determining a rotational orientation of a page image so that the text lines are horizontal. FIG. 16A shows a simplified page image 1602 containing three text lines 1604-1606. The text lines are exaggeratedly curved for illustration purposes. The text lines contain various darkly colored symbol shapes rather than characters of any particular language, again for simplicity of illustration. In the currently described technique, calculations are made for each of various rotations of the page image in order to find a rotation that best orients the text lines in an expected horizontal orientation.

Figure 16B:
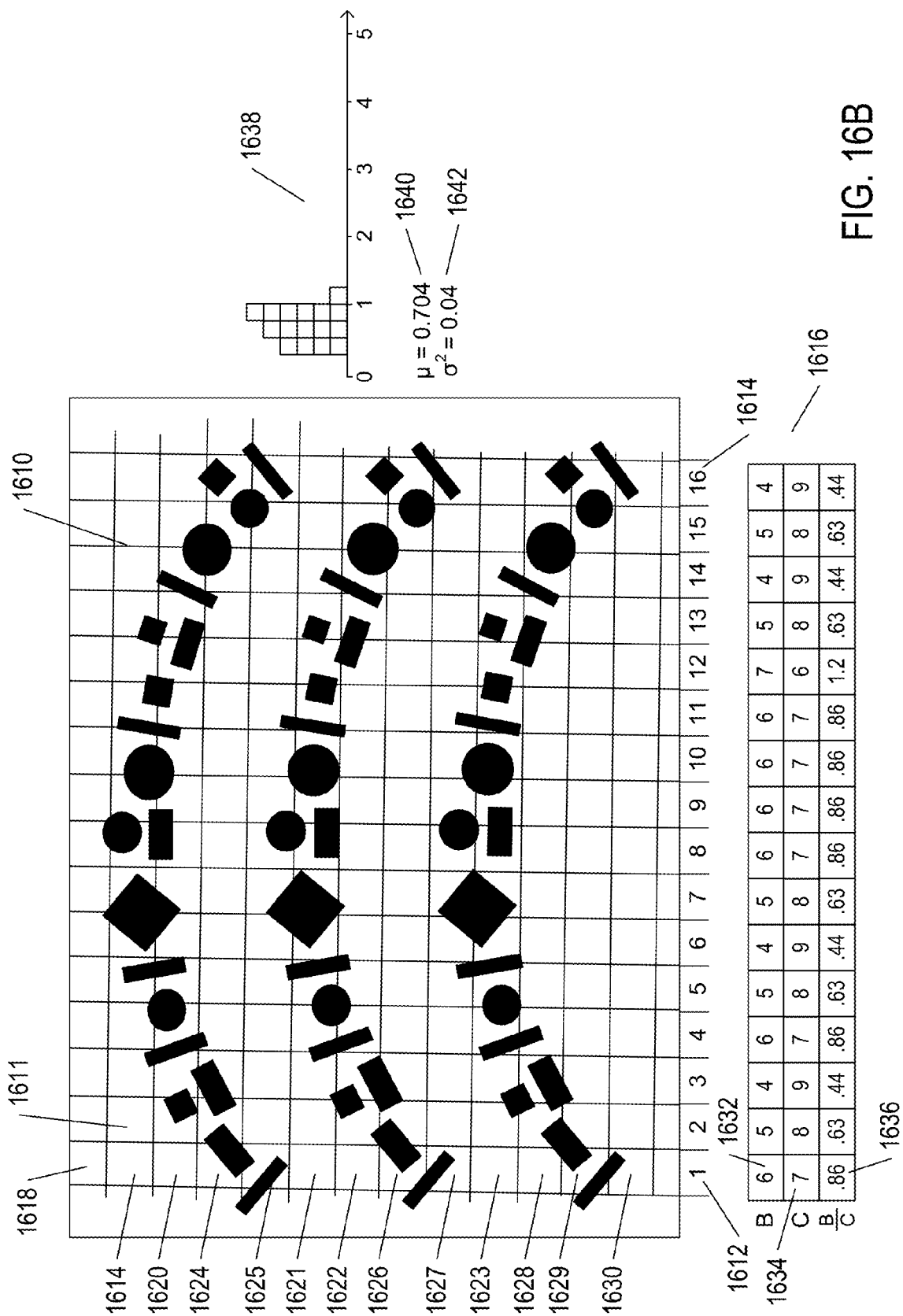
FIG. 16B illustrates one approach to determining the orientation of text lines within a page image or, equivalently, determining a rotational orientation of a page image so that the text lines are horizontal.
Figure 16C:
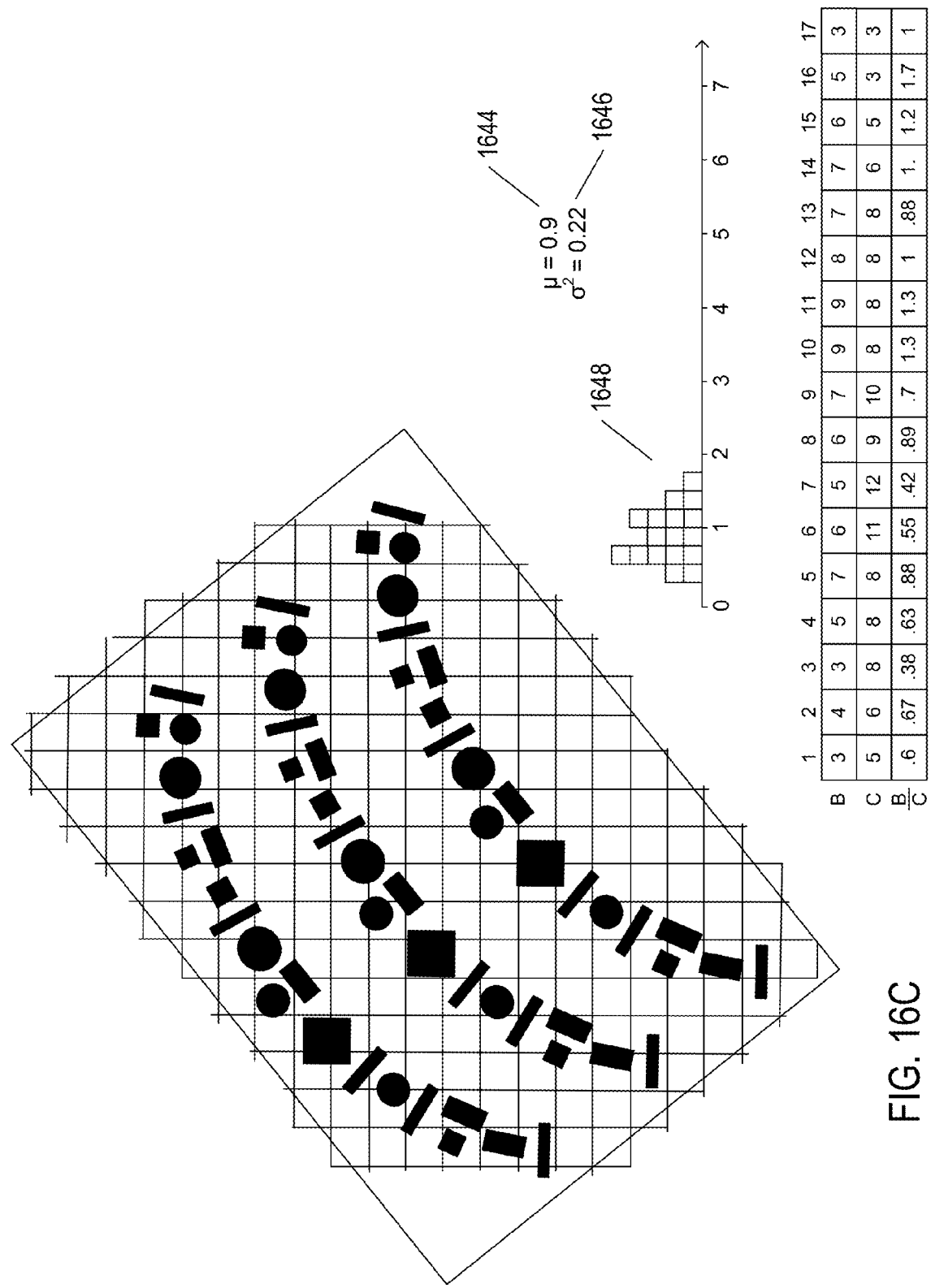
FIG. 16C illustrates one approach to determining the orientation of text lines within a page image or, equivalently, determining a rotational orientation of a page image so that the text lines are horizontal.

FIG. 16B shows the calculations for a first rotational state of the page image. A grid or lattice 1610 is superimposed over the text lines to form a matrix-like pattern of cells, such as cell 1611, the grid-like pattern including columns of cells and rows of cells. The columns are numbered below the diagram, beginning with column 1 (1612 in FIG. 16B) and ending with column 16 (1614 in FIG. 16B). The grid is placed over the bulk of the symbols on the page, but may be cropped so as not to include blank and largely blank margins. In the currently described method, the grayscale input image is copied to a temporary image that is binarized so that character pixels are dark, with the binary value "0," and non-character background pixels are white, with the pixel value "1." However, the method can be performed without copying and binarization. Then, as shown in the table 1616 below the text page with the superimposed grid, the number of character-containing cells and background cells in each column are tabulated, along with a computed ratio of the background cells to character-containing cells. For example, in column 1, cells 1618-1623 contain no character pixels, and are therefore background cells, while the remaining cells in column 1 1624-1630 include at least one character pixel. Thus, there are six background cells 1632 and seven character-containing cells 1634 in column 1, and the computed ratio of background-to-character-containing cells is 0.86 (1636 in FIG. 16B). The remaining columns are similarly tabulated. The computed background-cell-to-character-containing-cell ratios are plotted in a histogram 1638 and the mean 1640 and variance 1642 for the set of background-cell-to-character-containing-cell ratios is computed. FIG. 16C illustrates the same calculations for a different orientation of the page, producing a different mean 1644 and variance 1646. Histogram 1648 shows a greater range of background-cell-to-character-containing-cell ratios than histogram 1638 in FIG. 16B. FIG. 16D shows the same calculations performed for another orientation of the page different from the page orientations in FIGS. 16B and 16C. The histogram 1650, computed mean 1652, and computed variance 1654 are again different from those generated from the page orientations of FIGS. 16C and 16B.

A trend in computed variances emerges. The desired orientation of the page that produces approximately horizontal text lines, shown in FIG. 16B, has a markedly smaller computed variance for background-cell-to-character-containing-cell ratios than the orientations shown in FIGS. 16C and 16D, with the variance increasing from the desired orientation shown in FIG. 16B all the way up to the orthogonal orientation of the page shown in FIG. 16D. This, of course, is an expected trend. In the proper orientation, shown in FIG. 16B, each column contains a few cells with character pixels for each of the text lines and a few cells with no character pixels corresponding to the horizontal spaces between text lines. By contrast, in the orthogonal orientation of the page, shown in FIG. 16D, some columns, such as column 1656, contain almost no cells with character pixels while other columns, such as column 1658, contain mostly character-containing cells. Thus, an approximation to the proper orientation for the page that gives horizontal text lines would be one of the two orientations with minimum computed variance for computed background-to-character-containing-cell ratios. These two orientations generally correspond to the proper orientation, shown in FIG. 16B, and an inverse orientation produced by a rotation of the image in the proper orientation by 180°. The latter orientation would feature inverted text symbols. These two minimum-variance orientations can be differentiated by a variety of different techniques. In one method, optical-character-recognition techniques can be applied to a few selected symbols for the two orientations, with the orientation that produces the most recognized symbols selected as the proper orientation for the page. This method is but one of many possible approaches to generating a page-image orientation with horizontal text lines that include characters in left-to-right sequence order.

Figure 17D:
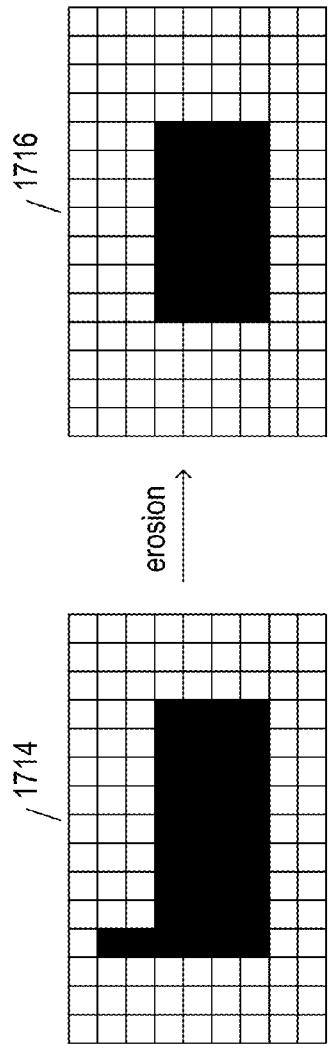
FIG. 17D illustrates morphological operations that are used, in certain implementations, to create uniform bands of pixels in a binary map that correspond to text lines.

FIGS. 17A-D illustrates morphological operations that are used, in certain implementations, to create uniform bands of pixels in a binary map that correspond to text lines. The morphological operations include dilation, erosion, closing, and opening operations. FIGS. 17A-F all use the same illustration conventions, next described with respect to FIG. 17A. On the left side of FIG. 17A, a small portion of a text image 1702 is shown. This is a binary image in which the value "0" represents a black, or text, pixel and the value "1" represents white space. A horizontal dilation operation 1703 is carried out by convolving the image 1702 with a horizontal kernel 1704. When the central pixel of the kernel overlays a pixel within the image, the pixel within the image generated by convolution receives the value of the minimum value of pixels in the image overlain by the kernel pixels. This has the effect of dilating or horizontally expanding dark-pixel-containing regions of the image. The result of applying a three-pixel horizontal dilation kernel 1704 to image 1702 is the dilated image 1705. FIG. 17B shows a horizontal erosion operation. The horizontal erosion operation is, in a sense, opposite from the horizontal dilation operation. In the horizontal erosion operation, a three-pixel horizontal kernel 1710 is convolved with the initial image 1702, with the image pixel overlain by the central pixel in the kernel 1710 receiving, in the image produced by convolution, the maximum value of any pixel in the image overlain by pixels in the kernel. This has the effect of eroding, or thinning, any dark-pixel-containing regions in the image. In FIG. 17B, application of the erosion kernel through a convolution process to the original image 1702 results in the eroded image 1712. Note that the examples of FIGS. 17A-F are artificial, in that character features in text pages generally have widths or more than a single pixel.

As shown in FIG. 17C, when the initially dilated image 1705 produced by convolving the original image with a horizontal dilation operator is eroded, by convolving the dilated image with a horizontal erosion operator, a closed image 1714 is produced. The closing operation is thus a two-part operation in which an image is first dilated and then eroded.

Figure 17E:
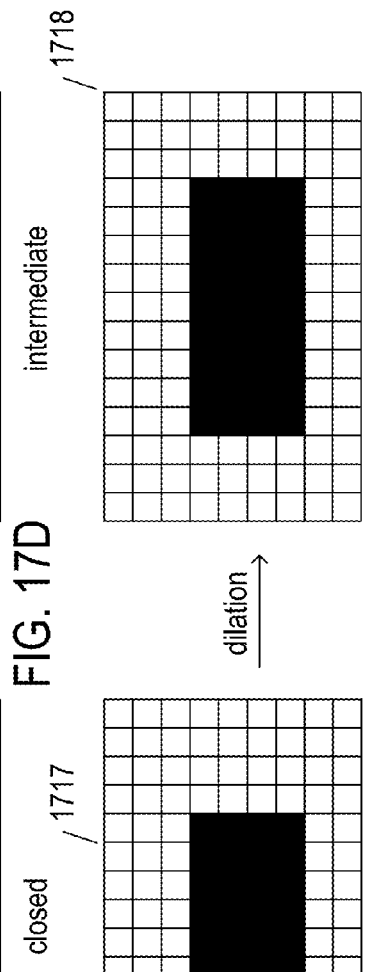
FIG. 17E illustrates morphological operations that are used, in certain implementations, to create uniform bands of pixels in a binary map that correspond to text lines.
Figure 17F:
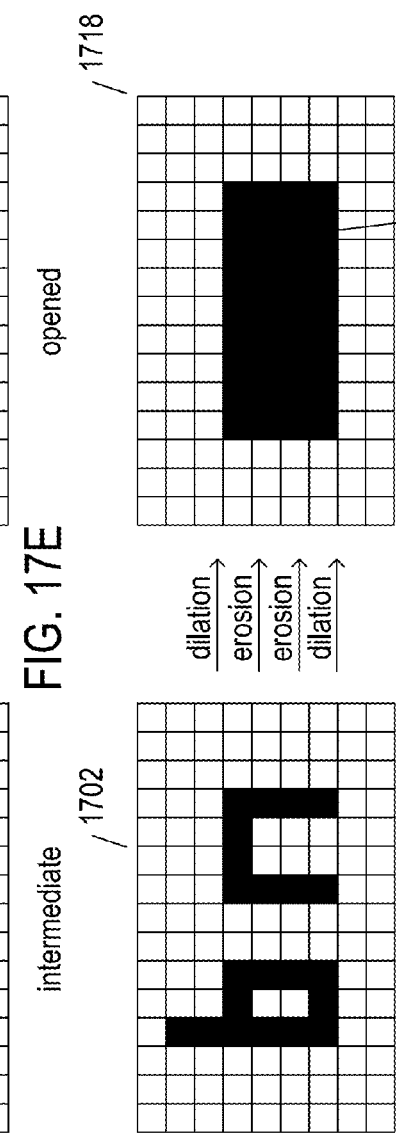
FIG. 17F illustrates morphological operations that are used, in certain implementations, to create uniform bands of pixels in a binary map that correspond to text lines.

FIGS. 17D-E illustrate the opening operation. An opening operation is opposite from the closing operation, involving first eroding an image and then dilating the image. In FIG. 17D, the closed image 1714 produced by eroding the dilated image, as discussed above with reference to FIG. 17C, is eroded to produce an intermediate image 1716. In FIG. 17E, the intermediate image 1716 is dilated to produce an opened image 1718. The technique employed in the currently described implementation of the currently disclosed method is summarized in FIG. 17F, where an initial image 1702 is dilated, eroded, again eroded, and then dilated, equivalent to first being closed and then being opened to produce the closed-and-then-opened image 1718. As can be seen in FIG. 17F, the closing-and-then-opening operation replaces characters in a text line with a filled text-line contour 1720.

As discussed below, various combinations of one or more morphological operations are used, in alternative implementations, to general bands of pixels with uniform binary values, corresponding to text lines, on a background of pixels with opposite binary values. Seed pixels for contour-line generation are selected from the pixels in each band. The morphological operators can be used to generate 1-valued-pixel bands on a 0-valued-pixel background or 0-valued-pixel bands on a 1-valued-pixel background and can be used to generate bands for light characters on a dark background or for dark characters on a light background.

Figure 18A:
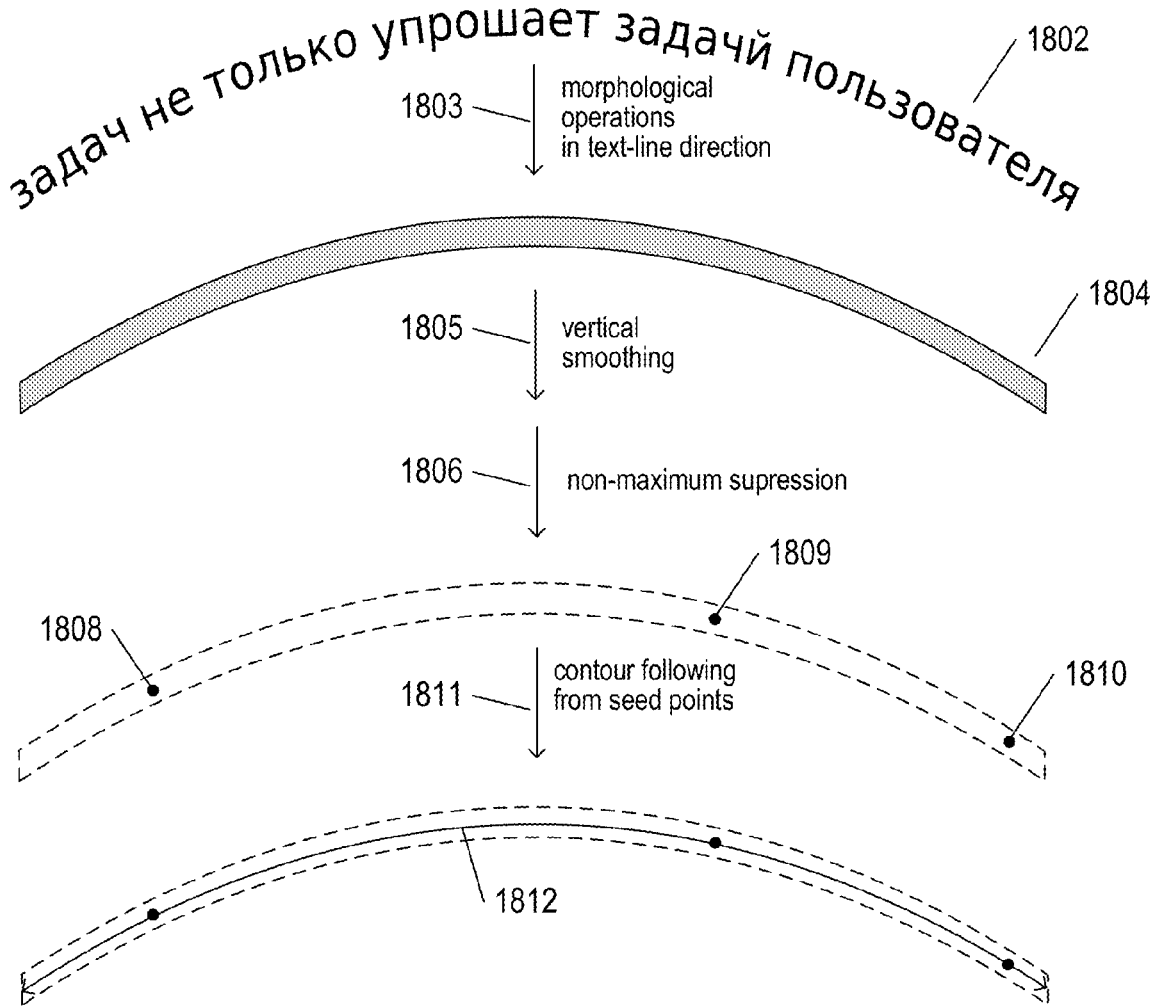
FIG. 18A illustrates contour-line generation.
Figure 18B:
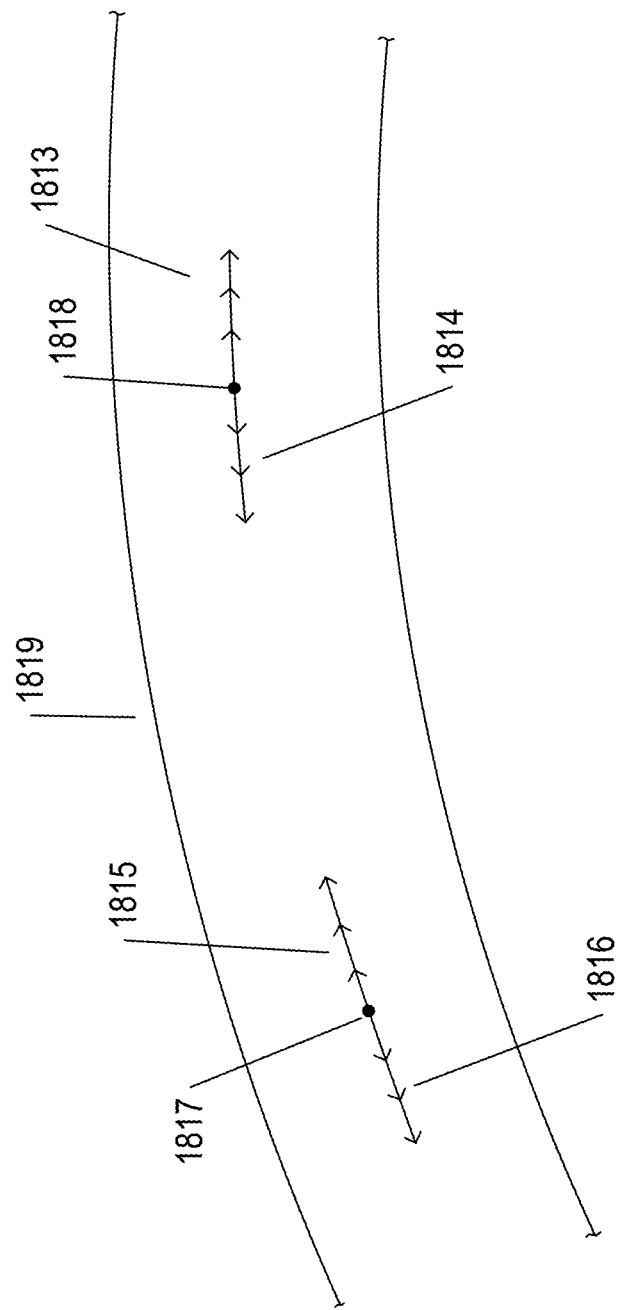
FIG. 18B illustrates contour-line generation.
Figure 18C:
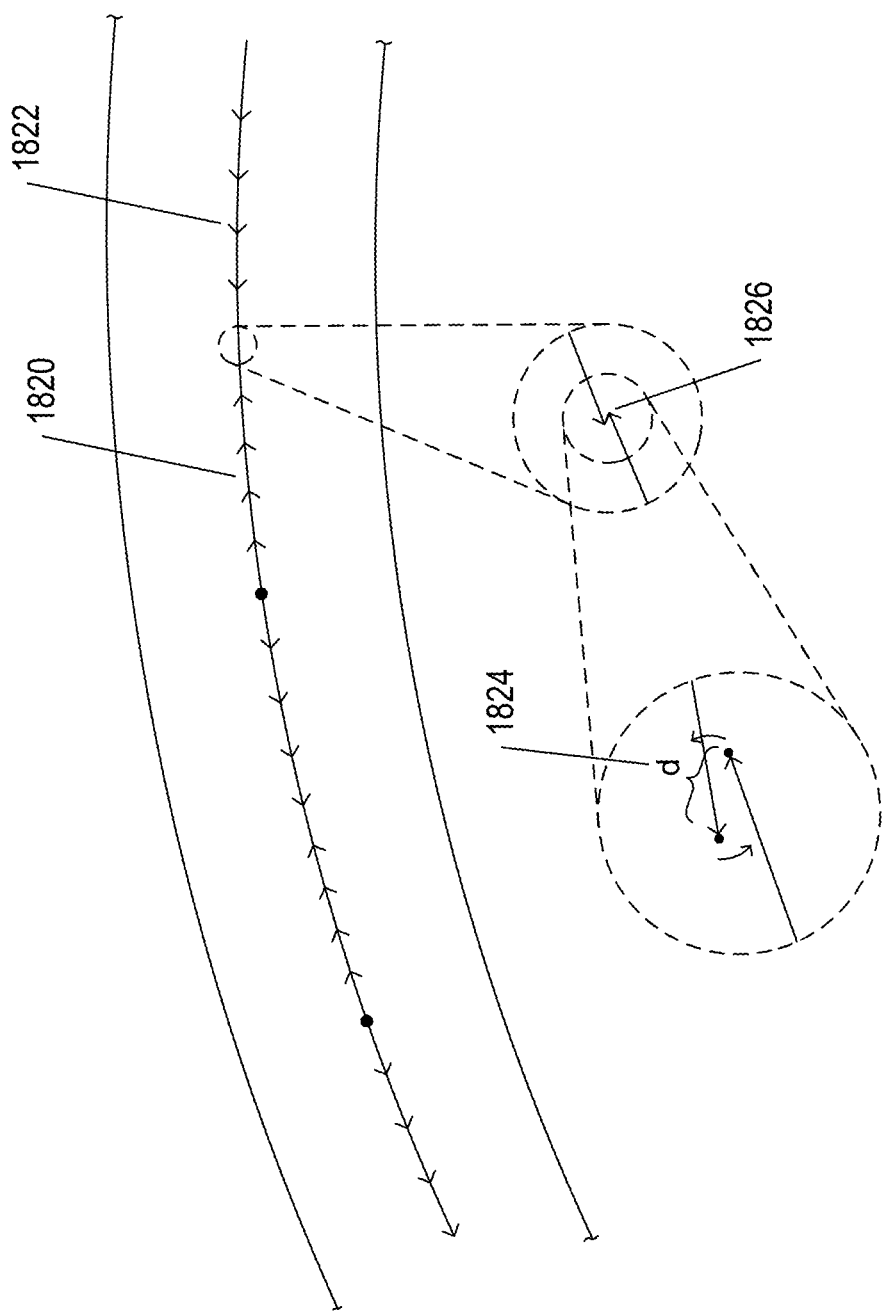
FIG. 18C illustrates contour-line generation.

FIGS. 18A-C illustrate contour-line generation. FIG. 18A illustrates one approach to identifying the locations and dimensions of text lines within a page image. FIG. 18A shows an example text line 1802. In a first step, represented by downward-pointing vertical arrow 1803, one or more morphological operators, generally kernels that are convolved with the page image, are used to fill in, or completely shade, the text line 1804. These may include a dilation operation, discussed above with reference to FIG. 17A, in the assumed case that the characters are associated with 0 valued pixels and the non-character background is associated with 1-valued pixels. Alternatively, a series of dilation, erosion, erosion, and dilation operations may be performed, as discussed above with reference to FIG. 17F. Other single or combined morphological operators may be applied, as well. In an implementation described below, a copy of the page image is made and then binarized, and the morphological operators are applied to the binarized copy. This generates a bit-map for text lines. In a next step 1805, a vertical smoothing operator, such as a Gaussian kernel that smoothes in the vertical direction, is applied to the binarized copy image in order to remove isolated remaining 0-valued pixels in between the shaded text lines, so that the only text-containing bands within the page sub-image are shaded.

The copied, binarized image contains bands of 0-valued pixels corresponding to text lines in the original page image. The grayscale pixels corresponding to these bands are copied to two white-background image to produce two text-line-only images for seed generation and contour generation, in one implementation. However, in alternative implementations, indications of the areas of text lines can be generated without page-copy operations.

A non-maximum-suppression operator is applied 1806 to a first of the two text-line-only images in order to produce a small number of seed pixels 1808-1810 within each text line. In one method, the NMS kernel discussed above with reference to FIG. 14C is convolved with the text-line-only image in order to generate the seed pixels. Various different NMS kernels with different parameters, such as differently sized immediate and extended neighborhoods, may be applied to each shaded band of text pixels in order to produce a number of seed pixels within a desired numeric range. NMS kernels with additional adjustable parameters may also be used.

The seed pixels are used to initiate contour lines that are extended by a contour-generation method that is applied 1811 to the second of the two text-line-only images in order to generate a continuous contour 1812 that describes the text line. The contour-generation method is discussed below. As shown in FIG. 18B, contour lines are extended as a sequence of vectors, or links, 1813-1816 in each direction from each seed pixel 1817-1818 within a text line 1819. As shown in FIG. 18C, when two growing contour-line segments 1820 and 1822 come within a minimum distance d 1824 of one another, the two contour segments may be joined 1826 to produce a single contour-line segment by rotation of the terminal links of the two segments.

Figure 19A:
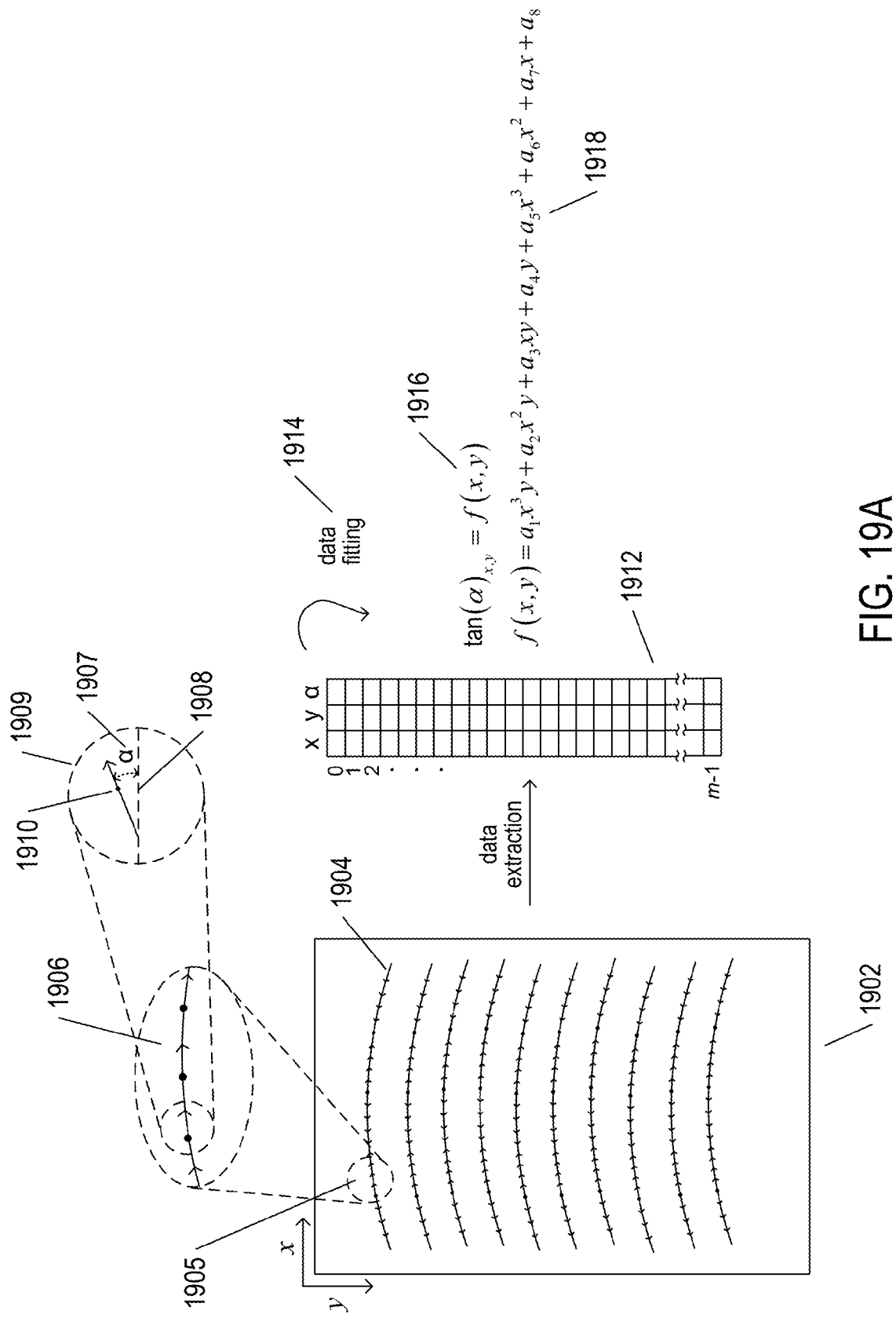
FIG. 19A illustrates generation of a model for the text-line curvature within a page-image.
Figure 19B:
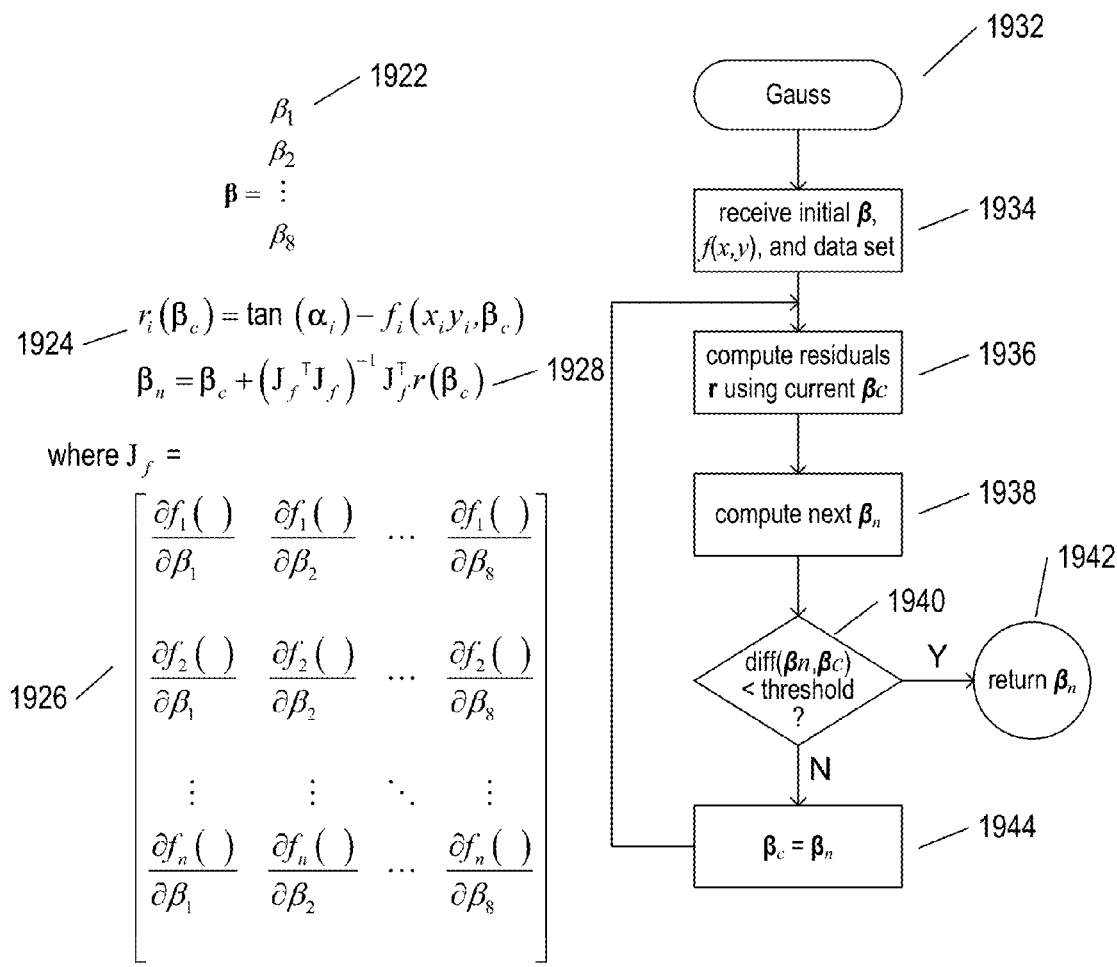
FIG. 19B illustrates generation of a model for the text-line curvature within a page-image.

Next, the contour lines generated to represent text lines within the page image are used to produce a mathematical model for the curvature, or angle of orientation of the text lines, and each point in the page sub-image. FIGS. 19A-B illustrate generation of a model for the text-line curvature within a page-image.

FIG. 19A illustrates generation of a first type of mathematical model for curvature within the page sub-image. A representation 1902 of the contour-line representation of the text lines is shown on the left side of FIG. 19A. Each contour is made up of small vectors or links. A portion of the contour line 1904 shown in inset 1905 is expanded in inset 1906 to show the individual links. An angle $\alpha$ 1907 is computed for each link. The angle $\alpha$ is an inclination angle of the vector or segment with respect to the horizontal direction represented by dashed line 1908 in inset 1909. A midpoint 1910 is also computed for each link. The computed (x,y) coordinates for the midpoint and the angle of inclination $\alpha$ for each link is placed into a table 1912 that represents the raw data for page-curvature-model generation. This raw data is processed 1914, by a data-fitting method discussed below, to produce a function $f(x,y)$ 1916 that provides an estimate of the tangent of the angle of inclination for each point (x,y) within the page. In one implementation, the function is a polynomial 1918 in x and y with eight coefficients $\alpha_1$, $\alpha_2, \ldots, \alpha_8$.

FIG. 19B illustrates one method, referred to as the "Gauss-Newton method," for fitting the inclination angle and coordinate data obtained from the contour-line links to the polynomial function $f(x,y)$. First, the data-fitting problem is restated 1920 in FIG. 19B. The coefficients $\beta_1$, $\beta_2, \ldots \beta_8$ can be considered to be a vector $\beta$ 1922. A guess is made for the values of these coefficients to generate an initial vector $\beta$. The difference between the tangents returned by function $f(x,y)$ with the current values of $\beta$ and the tangents of the observed inclination angles is expressed as a set of n residuals $r_i$ 1924, where n is the number of pixels with assigned inclination angles $\alpha$. Each residual is the difference between the tangent of the inclination angle $\alpha$ assigned to the pixel and the inclination angle computed for the pixel by function $f(x,y)$ assuming the current values for the coefficients $\beta_c$. A new value for the coefficients vector, $\beta_n$, can be computed from the current values of the coefficients vector, $\beta_c$, from the computed residuals and the Jacobean $J_f$ for the function $f(x,y)$ 1926, as shown in expression 1928. Note that the Gauss-Newton method minimizes the sum of the squared residuals 1930. The Gauss-Newton method is illustrated in the small control-flow diagram 1932. The method starts with an initial β, the function ƒ(x,y), and a data set 1934. In an iterative loop, the method computes residuals $r_1, r_2, \ldots, r_n$, where r is a vector of residuals, from the data set and function ƒ(x,y) assuming the current coefficients $\beta_c$ in step 1936. Then, using expression 1928, a new set of coefficients $\beta_n$ is computed in step 1938. When the difference between the new coefficients and previous coefficients is less than a threshold value, as determined in step 1940, the new coefficients are returned as the coefficients for function ƒ(x,y) 1942. Otherwise, $\beta_c$ is assigned to $\beta_n$, in step 1944, and another iteration is undertaken. This control-flow diagram is somewhat simplistic, in that the Gauss-Newton method is not guaranteed to converge. Thus, in addition to the difference test in step 1940, the method generally employs an iteration-number cutoff and other techniques to ensure that the method does not iterate endlessly. Other data-fitting methods can be used in alternative implementations, such as the Nonlinear Conjugate Gradient Method, variations of many other curve-fitting techniques, including non-linear curve-fitting methods, such as the Levenberg-Marquart method.

FIG. 20 illustrates a simpler, alternative data-fitting method that transforms the extracted raw curvature data tabulated in Table 1912 of FIG. 19A to the polynomial function. In this method, a difference D is computed 2050 as the sum of the weighted squares of the differences, for each data point, between the observed inclination angle $\alpha_0$ and the inclination angle $\alpha_c$ computed for the data point using an initial polynomial expression 2052 with initial coefficients. The partial differentials of the difference with respect to each polynomial coefficient are easily computed, as shown by expressions 2054-2056 in FIG. 20. In order to minimize the computed difference, the value of these partial differentials is set to 0. The partial differentials can then be transformed into a series of m equations 2058. Defining a matrix K 2060 and two column vectors 2061 and 2062, as shown in FIG. 20, the set of equations 2058 can be expressed, in matrix form, as equation 2063. This equation is solved for estimates of the values of the coefficients $\alpha_1, \alpha_2, \ldots, \alpha_8$ by matrix inversion, as shown in steps 2064 and 2065. The matrix inversion is computed using Gaussian elimination, in certain implementations.

Figure 21:
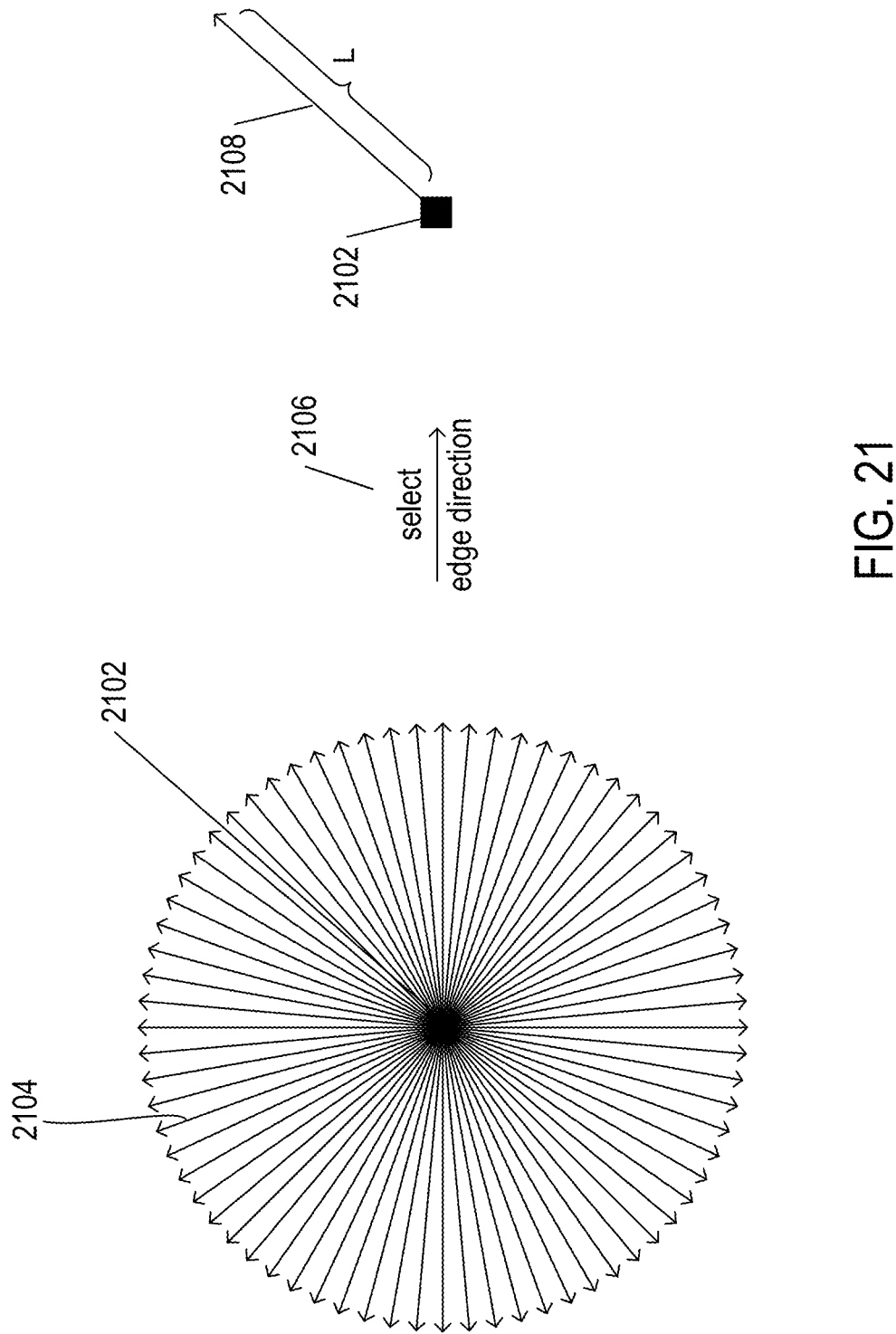
FIG. 21 illustrates the generation of contours for text lines, shown as step 1809 in FIG. 18A.

FIGS. 21-24 illustrate the generation of contours for text lines, shown as step 1809 in FIG. 18A. FIG. 21 illustrates selection of a first link for a seed pixel. As shown in FIG. 21, from each seed pixel 2102, an initial link is chosen from among a set of candidate links, such as link 2104. In FIG. 21, the candidate links all have a fixed length L but may have any of many different possible directions or orientations. An edge-direction-selection process 2106 is used to select one of the candidate links 2108 as the initial link in a contour that starts with seed pixel 2102.

Figure 22:
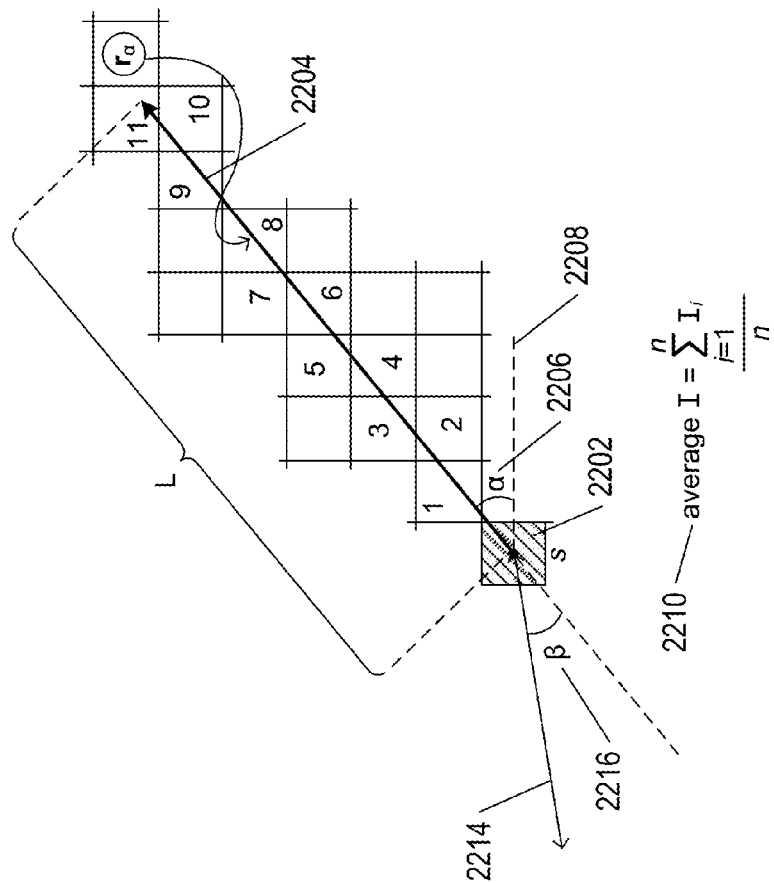
FIG. 22 illustrates the generation of contours for text lines, shown as step 1809 in FIG. 18A.

FIG. 22 illustrates a how a candidate link is selected as the next link of a contour line. In FIG. 22, the shaded pixel 2202 represents the end point of terminal link. The link 2204, $r_\alpha$, extends from the end point 2202 at an inclination angle α 2206 with respect to the horizontal direction represented by dashed line 2208. An average intensity for this candidate link 2210 is computed as the sum of the intensities of the pixels underlying the link divided by the number of pixels underlying the link. A link $r_\alpha$ is chosen as the next link of a contour segment when 2212 the average intensity of $r_\alpha$ is greater than any other of the candidate links, all of the pixels underlying $r_\alpha$ are text-line pixels contained within a shaded text-line band (1804 in FIG. 18A) generated by application of one or more morphological operations to a binarized version of the page image, and, considering previous link 2214, the angle β 2216 has a value, in degrees or radians, less than a threshold value. A similar method is used to choose the direction for the initial link for a seed point (2106 in FIG. 21), with the candidate link having the greatest average intensity selected, although there may be additional constraints on the angle α, as a result of which only a subset of links corresponding to all possible angles α, shown in FIG. 21, are considered.

Figure 23:
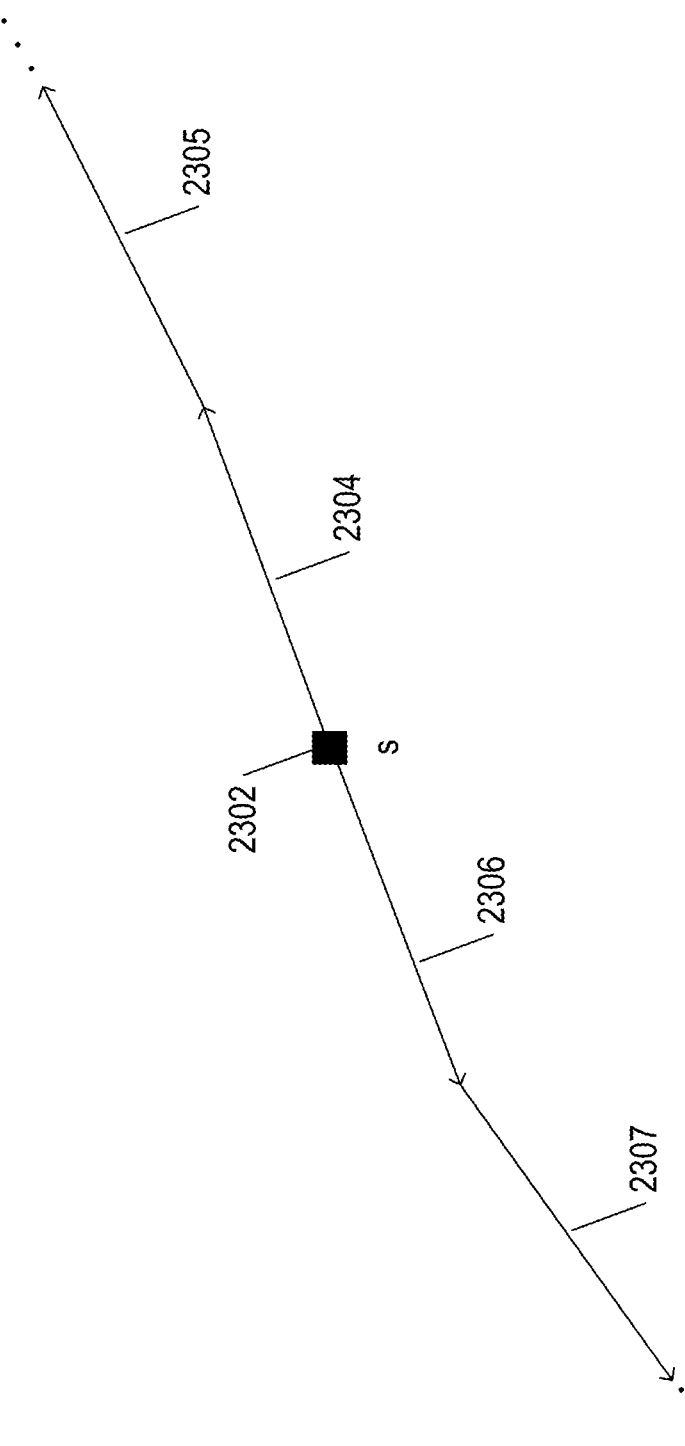
FIG. 23 illustrates the generation of contours for text lines, shown as step 1809 in FIG. 18A.

As shown in FIG. 23, starting from a given seed pixel 2302, links 2304 and 2305 are generated in a right-hand direction from the seed point and links 2306 and 2307 are generated in a left-hand direction from the seed point. In other words, links are successively added in both directions from a seed point to generate a nascent contour-line segment from the seed point. In an implementations discussed below, an initial link is selected, the head and tail of the link are considered to be active end points to which additional links are appended to grow a contour-line segment.

Figure 24:
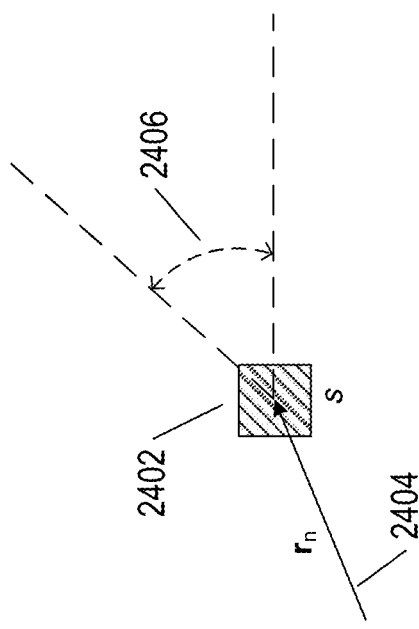
FIG. 24 illustrates the generation of contours for text lines, shown as step 1809 in FIG. 18A.

FIG. 24 illustrates termination conditions for a contour line. In FIG. 24, pixel 2402 is the end point of a last link 2404 of a growing contour-line segment. Candidate continuation segments must fall within a range of inclination angles 2406 defined by the inclination angle of the final contour-line segment 2404. In one implementation, pixel 2402 is defined as a terminal pixel for the contour-line segment when no candidate continuation link $r_\alpha$ has an average intensity greater than the average intensity of the next-best candidate continuation link by at least a threshold amount 2408 or when no candidate continuation link $r_\alpha$ has an average intensity greater than a second threshold value 2410. In alternative implementations, additional or different termination criteria may be used.

Figure 25:
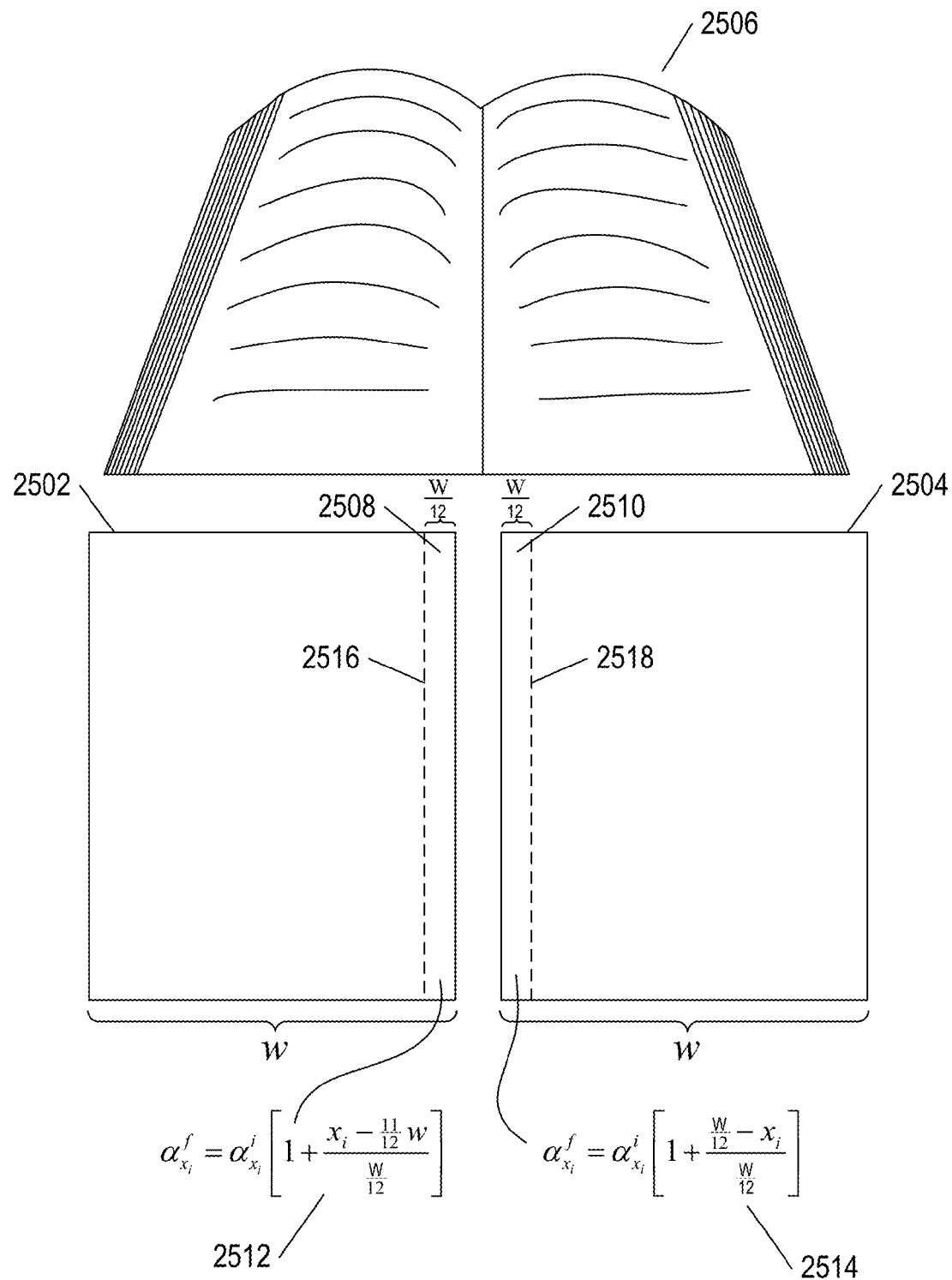
FIG. 25 illustrates the especially distorted regions of page images and computation of correction coefficients.

As it turns out, the region of a page image parallel to, and coincident with, the spine edges of the two pages of an open book are subject to significantly greater perspective-induced distortion and page-curvature than the remaining portions of the page image. FIG. 25 illustrates the especially distorted regions of page images and computation of correction coefficients. In FIG. 25, two page images 2502 and 2504 are shown below the corresponding image of an open book 2506. The especially distorted regions 2508 and 2510 of the two page images 2502 and 2504 lie in the narrow strip of pixels of width $$\frac{w}{12}.$$

In order to handle the additional perspective-induced distortion in these narrow strips, the inclination angle computed by the model ƒ(x,y) for pixels in these narrow regions are modified by multiplication by a left-page coefficient 2512 and a right page-image coefficient 2514. These coefficients have values that the depend on the horizontal location of a pixel within the narrow region, with the coefficient value increasing from 1.0 along the dashed lines 2516 and 2518 to 2.0 along the spine-adjacent edge of the image. Thus, the model ƒ(x,y) is modified and/or the initial inclination-angle map is modified in order to take into consideration the especially distorted regions 2508 and 2510.

Figure 26B:
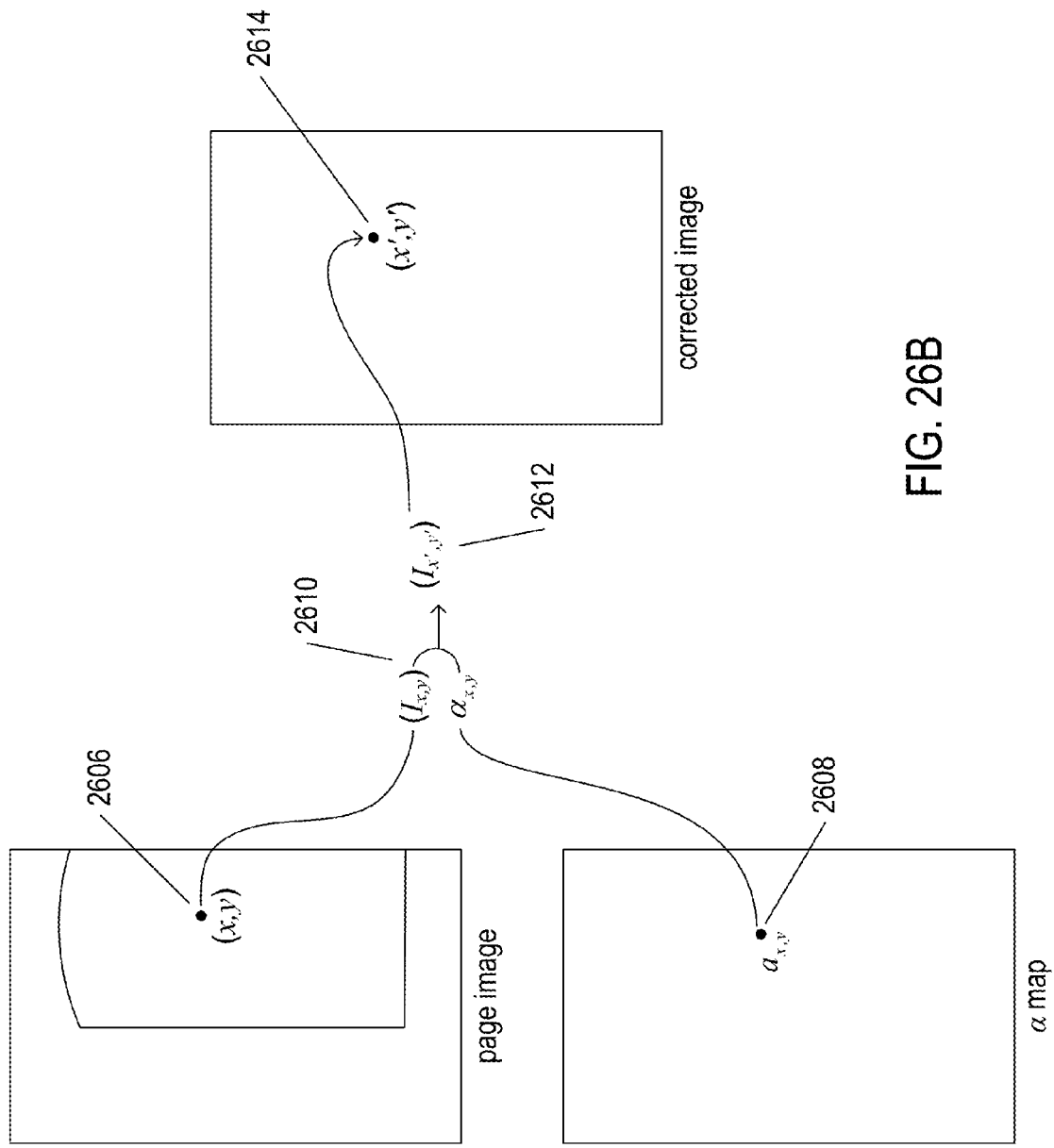
FIG. 26B illustrates straightening of text-line curves within a page image to produce rectilinear text lines using the inclination-angle map that associates an inclination angle with each pixel in the page image.

FIGS. 26A-F illustrate straightening of text-line curves within a page image to produce rectilinear text lines using the inclination-angle map that associates an inclination angle with each pixel in the page image. FIG. 26A illustrates the information at hand following previously discussed processing steps. The information includes the justified and aligned page image 2602, both in grayscale and in color, if originally received in color, and the inclination-angle map 2604. These are used to generate a corrected image in which text-lines and characters and symbols within the text lines have a normal, flat-page rectilinear organization. As shown in FIG. 26B, in the final steps of text-line-curvature correction, the intensity information and coordinates for a pixel in the page image 2606 and the inclination angle for that pixel α2608 are combined 2610 to generate coordinates for a new position for the pixel 2612 in the corrected image. The pixel is then transferred, or copied, to that new position 2614 in the corrected image. Transferring a pixel means that the intensity value for the pixel is copied into the new location in the correct page image.

Figure 26C:
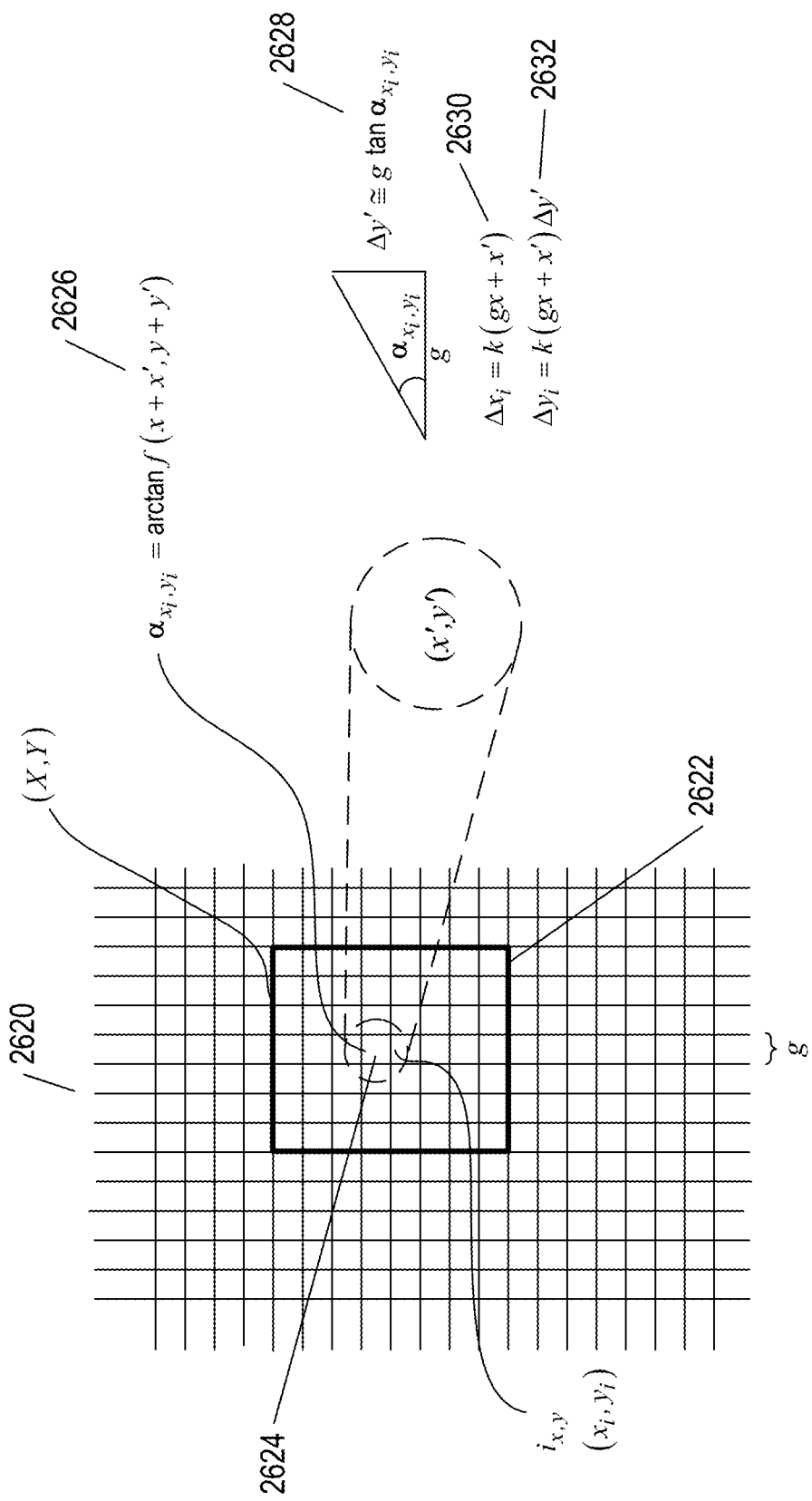
FIG. 26C illustrates straightening of text-line curves within a page image to produce rectilinear text lines using the inclination-angle map that associates an inclination angle with each pixel in the page image.

FIGS. 26C-F provide details of how the page image and inclination-angle map are employed to determine positions in a corrected image to which pixels from the page image are transferred. As shown in FIG. 26C, a first step involves computing local displacements $\Delta x_i$ and $\Delta y_i$ for each cell g in a rectilinear grid superimposed over the grid of pixels in the page image. The rectilinear grid 2620 generally has cells of width and height g, where g is an even divisor of the width and height of a pixel. In other words, the local displacements are computed at a finer granularity than the pixel grid. Of course, in alternative implementations, the local displacements may be instead computed for pixels. In FIG. 26C, a pixel 2622 is shown with a darker bounding square than the rectilinear grid of cells 2620. Displacements for a cell $i_{x,y}$ 2624 are computed in the example shown in FIG. 26C. Cell 2624 has coordinates $(x_i, y_i)$ with respect to the cell grid 2620 and has coordinates (x',y') with respect to the grid of cells within the area of pixel 2622. The inclination angle $\alpha_{x_i,y_i}$ for cell 2624 may be directly computed using the model 2626 or, alternatively, may be assigned the inclination angle of the pixel 2622 within which it resides. An intermediate value $\Delta y'$ for $\Delta y_i$ is computed as $g \tan \alpha_{x_i,y_i}$ 2628. Finally, the displacement $\Delta x_i$ is computed by a function k( ) supplied with the argument $x_i = gx+x'$ 2630 and the displacement $\Delta y_i$ is obtained by the value returned by the function k( ) times the intermediate value $\Delta y'$ computed from the inclination angle 2632. The computations shown in FIG. 26C are repeated for each cell in the rectilinear grid of cells 2620 to produce an offset map, with each cell i in the rectilinear grid of cells associated with two offsets: $\Delta x_i$ and $\Delta y_i$.

Figure 26D:
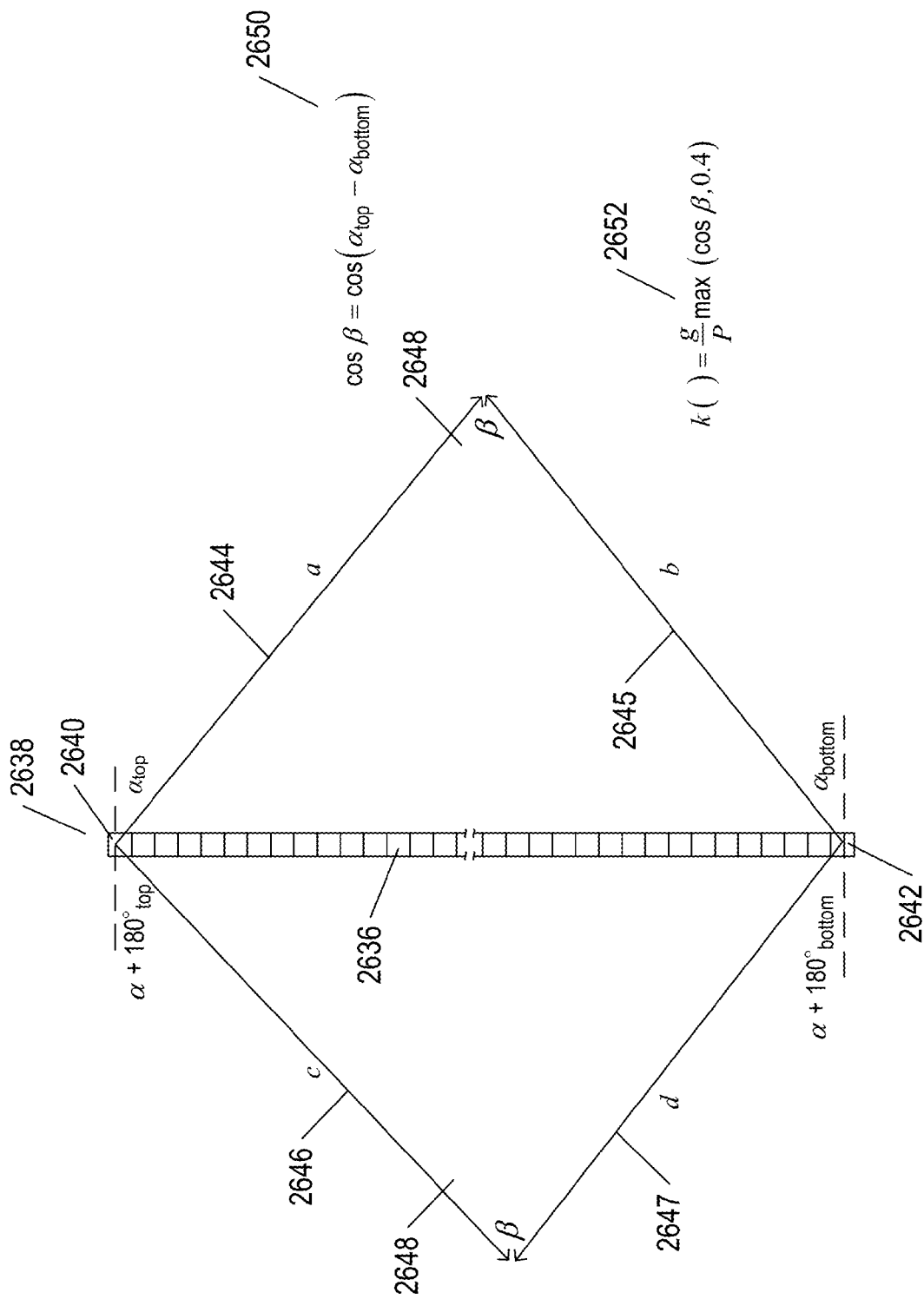
FIG. 26D illustrates straightening of text-line curves within a page image to produce rectilinear text lines using the inclination-angle map that associates an inclination angle with each pixel in the page image.

FIG. 26D illustrates one implementation of the function k( ) used to generate the cell displacements as described with reference to FIG. 26C. As shown in FIG. 26D, the function k computes the value k( ) for cell i 2636. This cell resides within a column of cells 2638 spanning the image of a page. The top cell 2640 and the bottom cell 2642 of the column are used by the function k( ) to compute the value returned by the function k( ). The inclination angles computed for these top and bottom cells are used to construct converging vectors a and b 2644-2645 or converging vectors 2646 and 2647 that create a triangle on the right side or left side of the column of cells, respectively, with an angle β 2648. The cosine of this angle is computed, for either the right-side triangle or left-side triangle, by expression 2650. Note that, in the illustrated example, $\alpha_{top}$ is a negative angle and $\alpha_{bottom}$ is a positive angle. The right-side triangle is appropriate for the left page of an open book and the left-side triangle is appropriate for the right page of an open book. The function k( ) then returns the fraction of the cell width g divided by the pixel width P times the maximum of the cosine of the angle β and 0.4 (2652 in FIG. 26D). The value returned by the function k( ) reflects a compression of symbols in curved text lines that is most pronounced in the most curved portions of the text lines closest to the page edges. Thus, the displacements $\Delta x_i$ and $\Delta y_i$ computed in FIG. 26C take into account both the curvature of the text lines as well as the compression of the text lines due to the curvature. The function returns 1/g when the vectors do not converge.

Figure 26E:
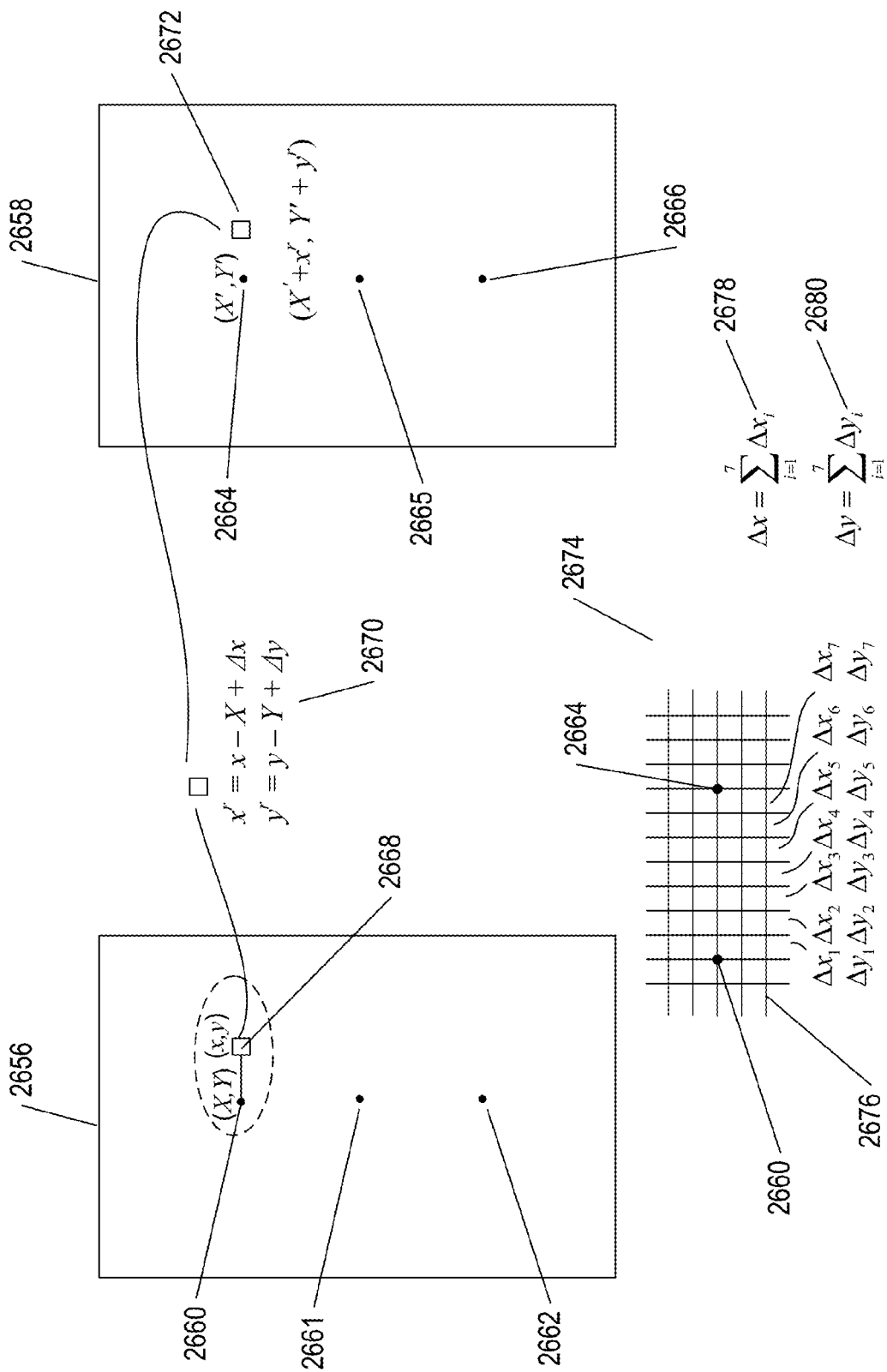
FIG. 26E illustrates straightening of text-line curves within a page image to produce rectilinear text lines using the inclination-angle map that associates an inclination angle with each pixel in the page image.

FIG. 26E illustrates how the computed displacements are used to transfer a pixel in an original location within the page image into a generally different location within the corrected image. Rectangle 2656 represents the page image and rectangle 2658 represents the corrected image. One or more anchor points 2660-2662 are selected in the page image 2656 and corresponding anchor points 2664-2666 are selected in the corrected image 2658. Anchor points are points for which corrected-image coordinates can be computed. As one example, a central point within the page image near a particular character or symbol in the original image may be selected as an anchor point, since a corresponding point in the corrected image can be easily located. In the example shown in FIG. 26E, anchor point 2660 has coordinates X,Y and the corresponding anchor point 2664 has corrected-image coordinates (X',Y'). Consider a pixel 2668 with coordinates (x,y) to the right of anchor point 2660. Relative coordinates $x^r$ and $y^r$ can be computed for pixel 2668 according to expressions 2670. These are the relative coordinates of the pixel with respect to the anchor point in the corrected image. Because of curvature-induced compression, the pixel needs to be moved further to the right. Then, pixel 2668 is positioned 2672 in the corrected image relative to the anchor point 2664 in the corrected image at coordinates $(X'+x^r, Y'+y_r)$. In expressions 2670, the relative position of the pixel with respect to the anchor point in the corrected image $(x^r, y^r)$ is computed as the relative position of the pixel with respect to the anchor point in the page image 2656, (x-X, y-Y) plus a displacement $(\Delta x, \Delta y)$. In the lower portions of FIG. 26E 2674, computation of these displacements is illustrated. The two anchor points 2660 and 2664 are shown within the higher granularity cell grid 2676 discussed above with reference to FIG. 26C. The displacement $\Delta x$ 2678 is computed as the sum of the local displacements associated with each of the cells between anchor point 2660 and anchor point 2664 and the displacement $\Delta y$ 2680 is similarly computed. For pixels to the left of the anchor point, $\Delta x$ is subtracted, rather than added, in the formula for $x^r$.

Figure 26F:
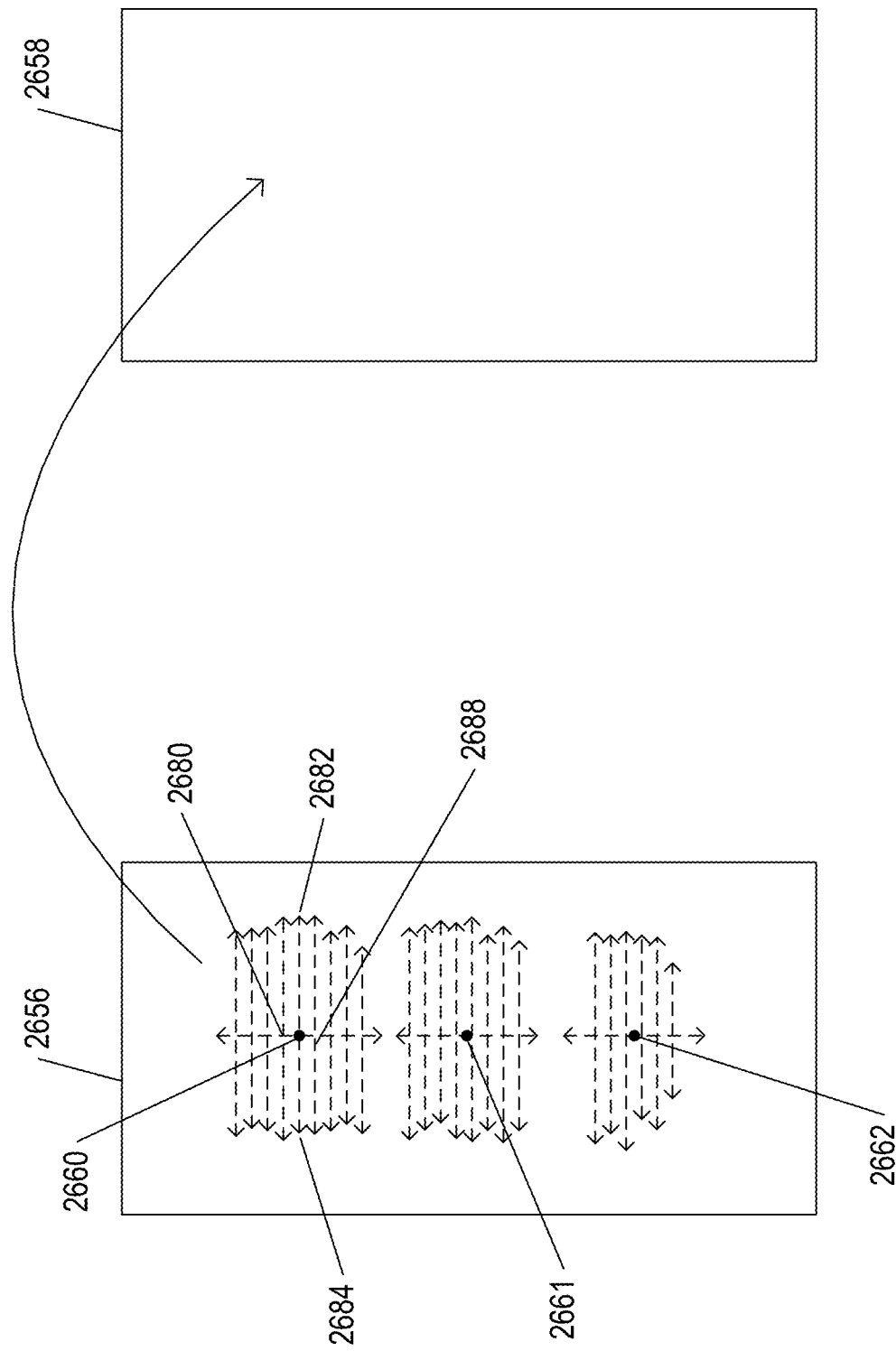
FIG. 26F illustrates straightening of text-line curves within a page image to produce rectilinear text lines using the inclination-angle map that associates an inclination angle with each pixel in the page image.

FIG. 26F illustrates the overall pixel-transfer process. From each anchor point 2660-2662 in the page image, pixels are transferred from the right-pointing 2682 and left-pointing 2684 horizontal pixel vectors emanating from the anchor point to the corrected image 2658 using the method discussed above with reference to FIG. 26E. Then, the next pixels above 2680 and below 2688 at the anchor point are transferred to the corrected image and the horizontal line of pixels including these next two pixels are then transferred according to the method discussed above with reference to FIG. 26E. This approach is used for all of the anchor points 2660-2662 until all of the pixels have been transferred. Alternatively, a single anchor point may be used and the transfer of pixels from the page image to the corrected image may be made based on vectors from the single anchor point to each of the pixels in the page image, with displacements computed along the position vectors of the pixels, taking into account the path length rough cells of the cell grid. In general, the offset map, whether actually generated or considered conceptually, contains sufficient information for transferring pixels from the page image to the corrected image so that, as a result of the transfer, the perspective-induced distortions of the text lines in the page image are corrected in the corrected image, with the symbols and characters in the corrected page image falling within a normal rectilinear-matrix-like organization, with straight, non-curved text lines.

Figure 26G:
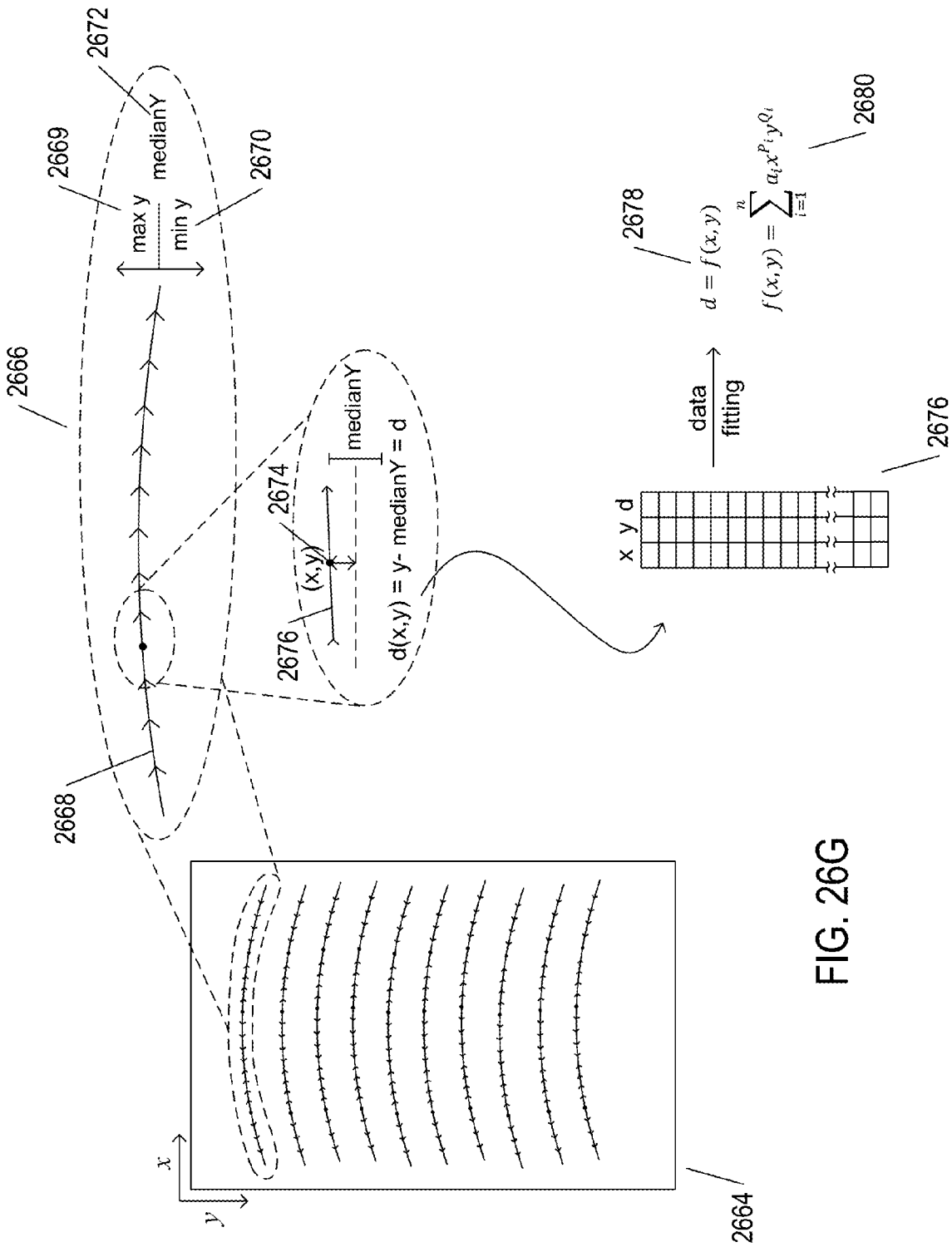
FIG. 26G illustrates an alternative method for straightening the text lines within a page sub-image.

FIG. 26G illustrates an alternative method for straightening the text lines within a page sub-image. FIG. 26G uses the same illustration conventions used in FIG. 19A, discussed above. In the alternative method, a different type of data is extracted from the contour lines representing text lines within the page sub-image. In FIG. 26G, the contour lines generated from seed pixels for a page sub-image are shown in page image 2664. As shown in inset 2666, for a given contour line 2668, a maximum y value 2669 and a minimum y value 2670 for the contour line are computed, from which a median or average y value, median Y, 2672 is computed as the sum of the minimum y value and a difference between the maximum y value and minimum y value divided by 2. A displacement d(x,y) for the centroid 2674 for each link 2676 can then be computed as the difference between they value for the midpoint of the link and the computed median-y value for the contour line containing the link. A data table 2676 is populated with the (x,y) coordinates of the midpoint and the computed displacement of each link. Data fitting is then be applied, as previously applied for the extracted data discussed above with FIG. 19A, to generate a function f(x,y) that returns a computed displacement for each point (x,y) in the page sub-image 2678. Again, as with the previous data-fitting method, this function is a polynomial expression 2680.

Figure 27A:
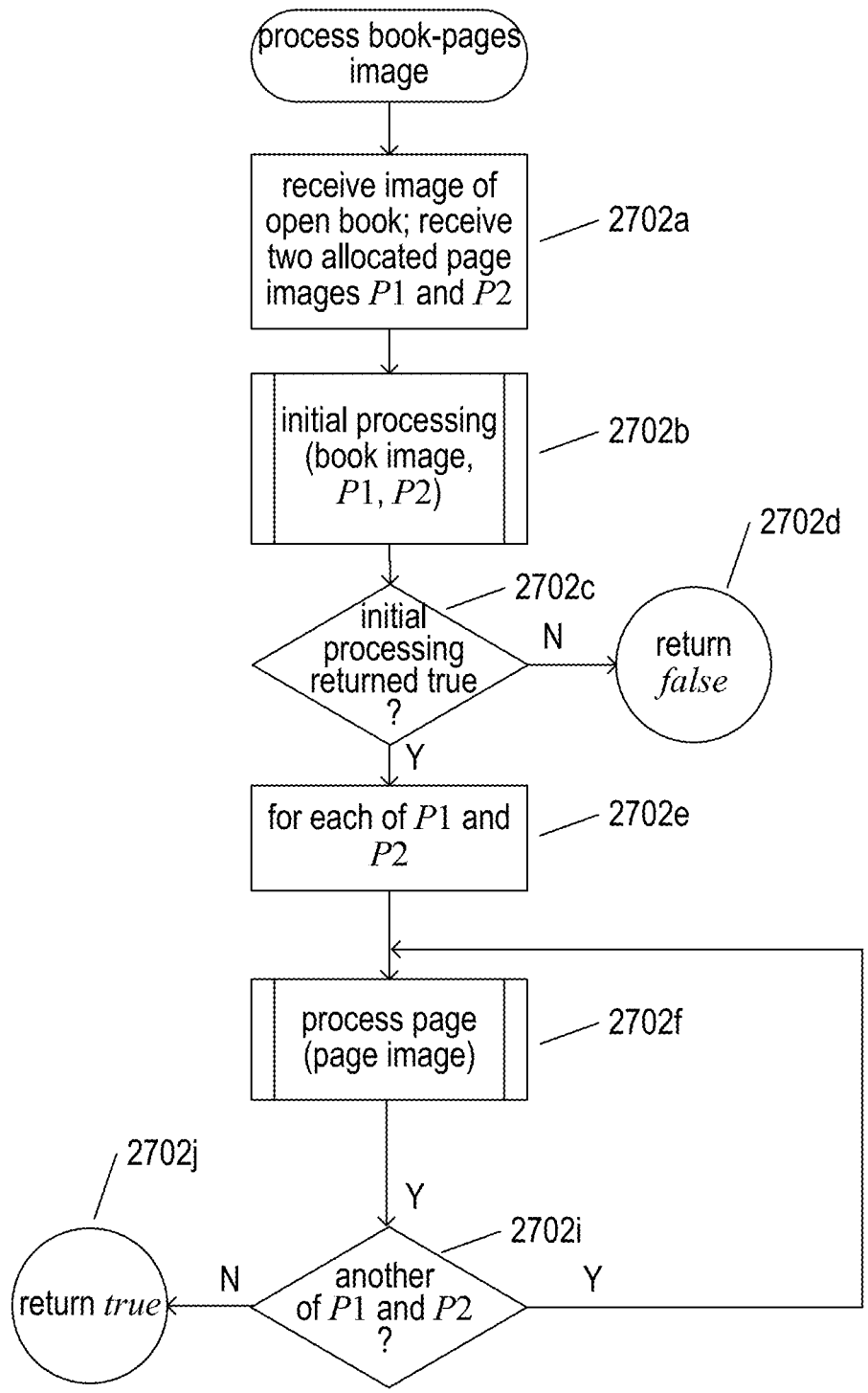
FIG. 27A provides control-flow diagrams that illustrate one implementation of the method for correcting perspective-induced curvature of text lines in images of text captured by mobile devices and other types of text-imaging equipment and appliances.
Figure 27B:
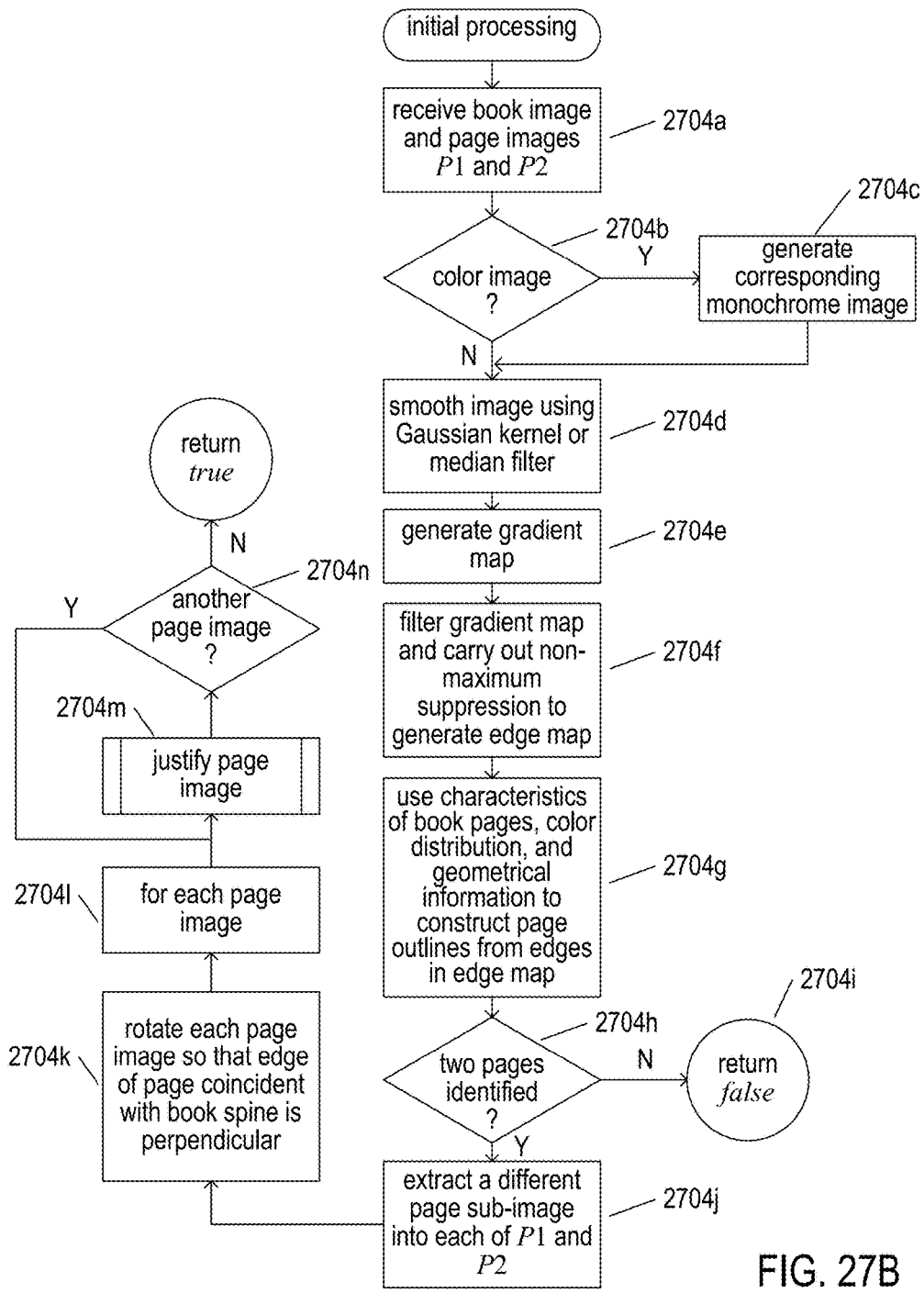
FIG. 27B provides control-flow diagrams that illustrate one implementation of the method for correcting perspective-induced curvature of text lines in images of text captured by mobile devices and other types of text-imaging equipment and appliances.
Figure 27C:
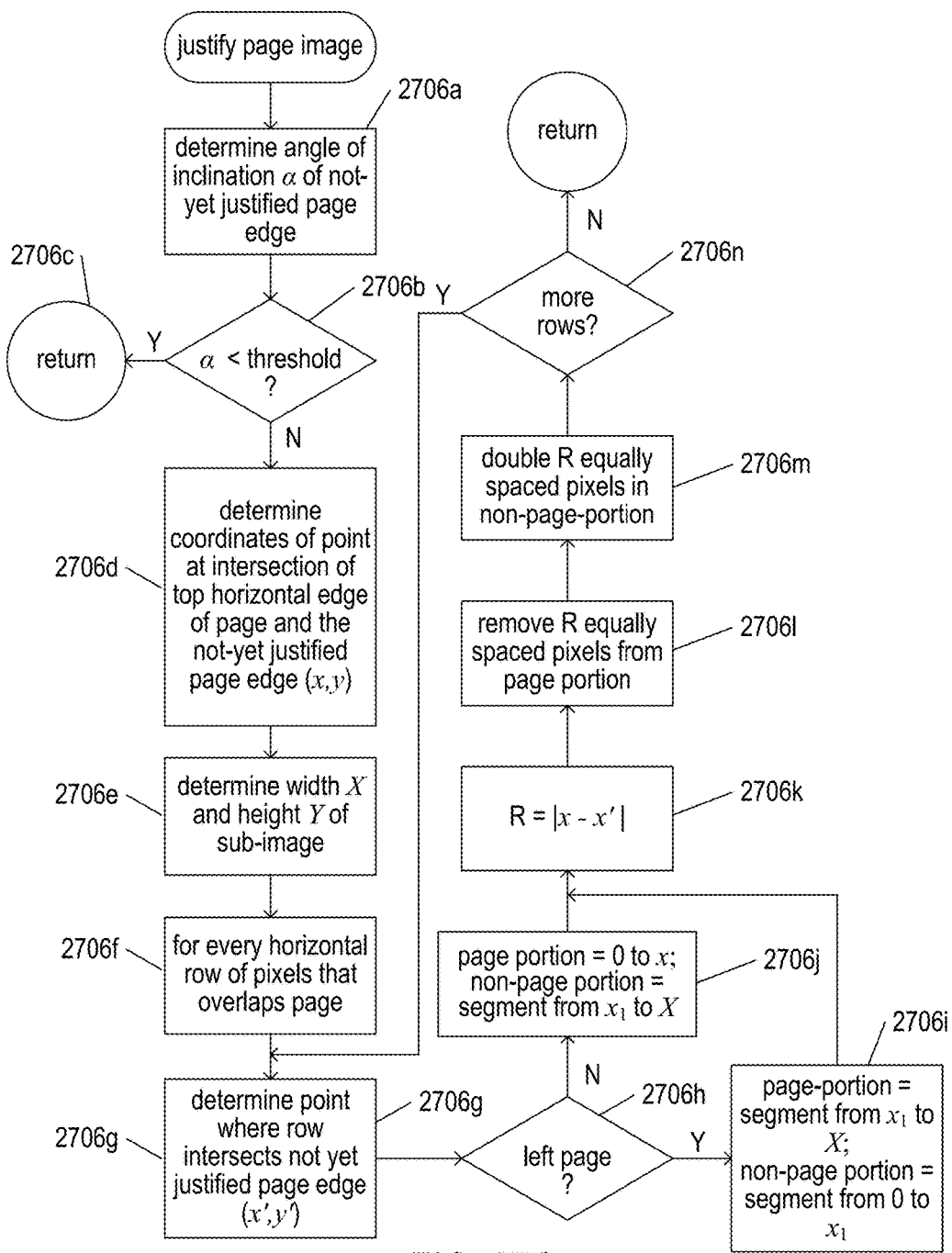
FIG. 27C provides control-flow diagrams that illustrate one implementation of the method for correcting perspective-induced curvature of text lines in images of text captured by mobile devices and other types of text-imaging equipment and appliances.
Figure 27D:
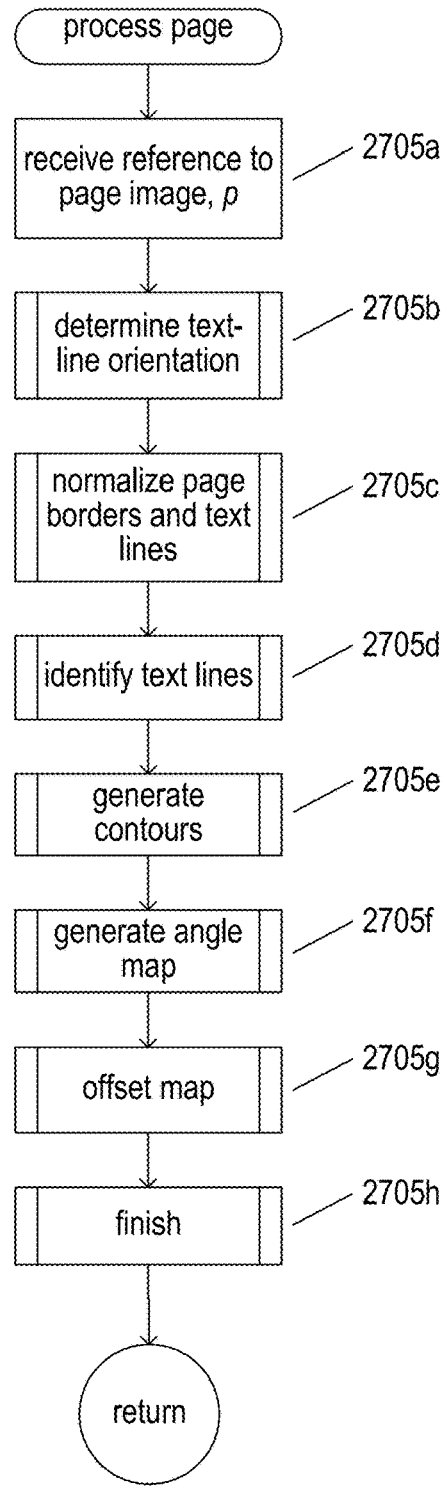
FIG. 27D provides control-flow diagrams that illustrate one implementation of the method for correcting perspective-induced curvature of text lines in images of text captured by mobile devices and other types of text-imaging equipment and appliances.
Figure 27E:
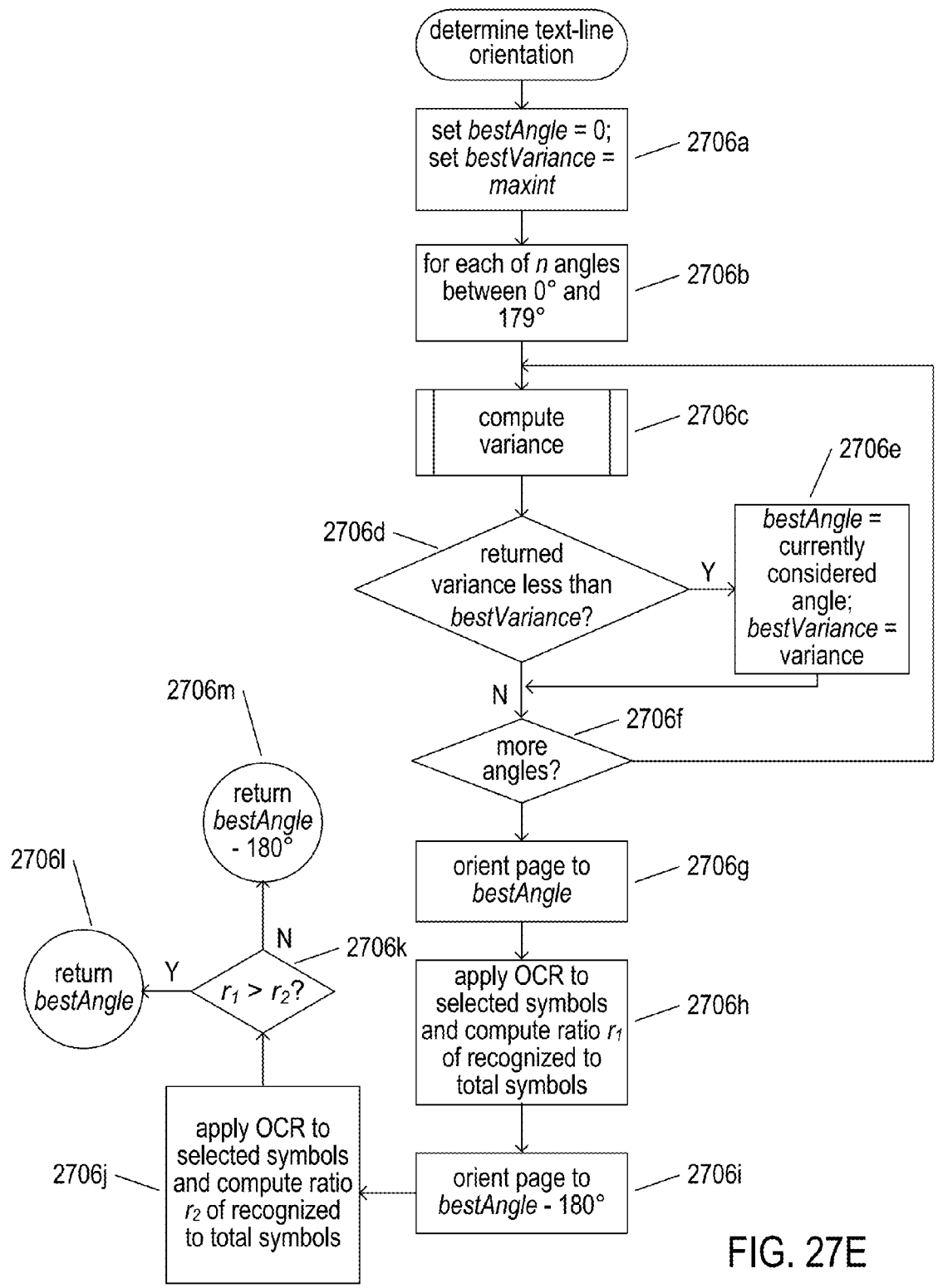
FIG. 27E provides control-flow diagrams that illustrate one implementation of the method for correcting perspec- FIG. 27F provides control-flow diagrams that illustrate one implementation of the method for correcting perspective-induced curvature of text lines in images of text captured by mobile devices and other types of text-imaging equipment and appliances.
Figure 27F:
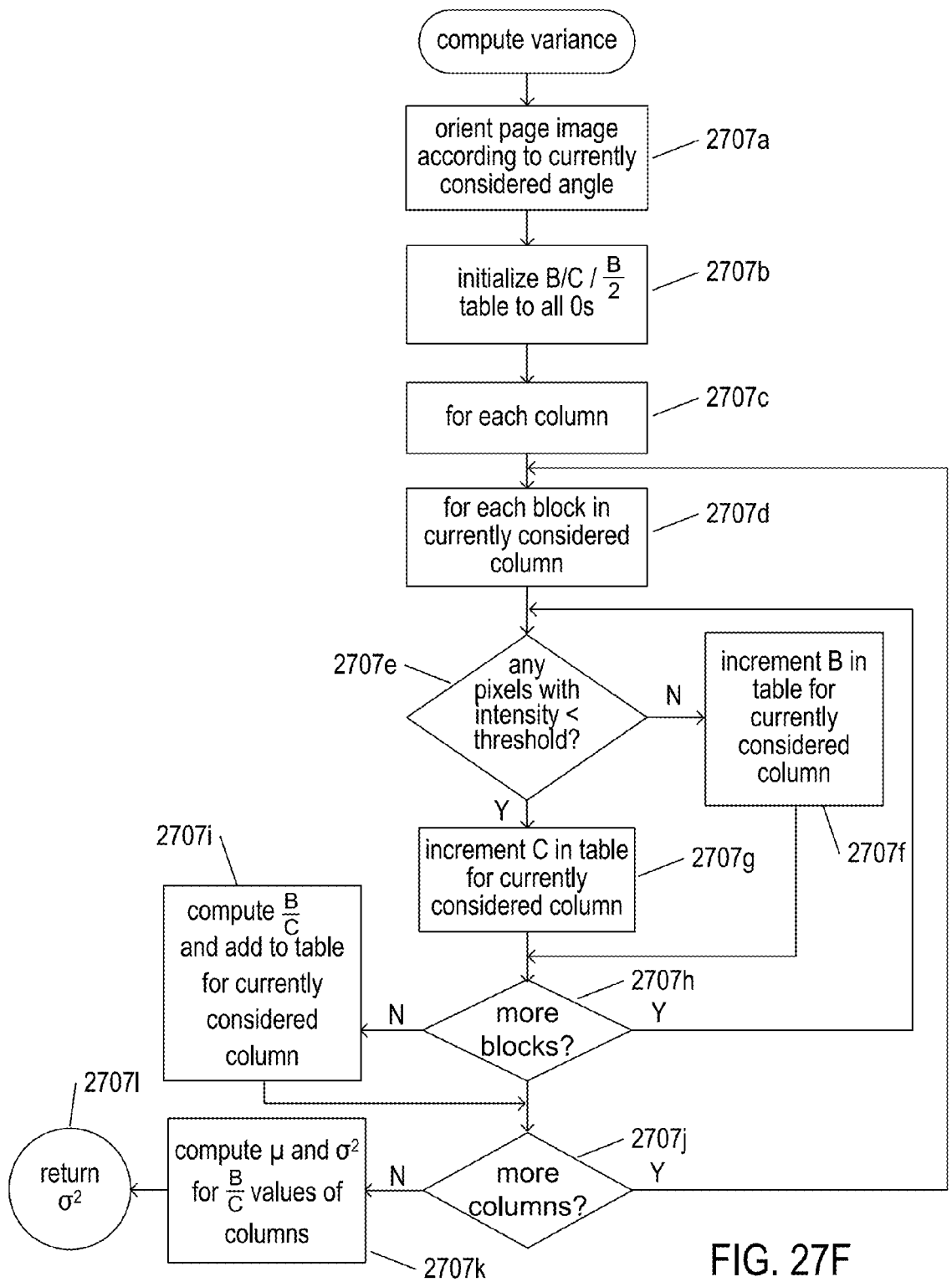
FIG. 27G provides control-flow diagrams that illustrate one implementation of the method for correcting perspective-induced curvature of text lines in images of text captured by mobile devices and other types of text-imaging equipment and appliances.
FIG. 27H provides control-flow diagrams that illustrate one implementation of the method for correcting perspective-induced curvature of text lines in images of text captured by mobile devices and other types of text-imaging equipment and appliances.
FIG. 27I provides control-flow diagrams that illustrate one implementation of the method for correcting perspective-induced curvature of text lines in images of text captured by mobile devices and other types of text-imaging equipment and appliances.
FIG. 27J provides control-flow diagrams that illustrate one implementation of the method for correcting perspective-induced curvature of text lines in images of text captured by mobile devices and other types of text-imaging equipment and appliances.
FIG. 27K provides control-flow diagrams that illustrate one implementation of the method for correcting perspective-induced curvature of text lines in images of text captured by mobile devices and other types of text-imaging equipment and appliances.
FIG. 27L provides control-flow diagrams that illustrate one implementation of the method for correcting perspective-induced curvature of text lines in images of text captured by mobile devices and other types of text-imaging equipment and appliances.
FIG. 27M provides control-flow diagrams that illustrate one implementation of the method for correcting perspective-induced curvature of text lines in images of text captured by mobile devices and other types of text-imaging equipment and appliances.
FIG. 27N provides control-flow diagrams that illustrate one implementation of the method for correcting perspective-induced curvature of text lines in images of text captured by mobile devices and other types of text-imaging equipment and appliances.
FIG. 27O provides control-flow diagrams that illustrate one implementation of the method for correcting perspective-induced curvature of text lines in images of text captured by mobile devices and other types of text-imaging equipment and appliances.
FIG. 27P provides control-flow diagrams that illustrate one implementation of the method for correcting perspective-induced curvature of text lines in images of text captured by mobile devices and other types of text-imaging equipment and appliances.
FIG. 27Q provides control-flow diagrams that illustrate one implementation of the method for correcting perspective-induced curvature of text lines in images of text captured by mobile devices and other types of text-imaging equipment and appliances.
FIG. 27R provides control-flow diagrams that illustrate one implementation of the method for correcting perspective-induced curvature of text lines in images of text captured by mobile devices and other types of text-imaging equipment and appliances.
FIG. 27S provides control-flow diagrams that illustrate one implementation of the method for correcting perspective-induced curvature of text lines in images of text captured by mobile devices and other types of text-imaging equipment and appliances.
FIG. 27T provides control-flow diagrams that illustrate one implementation of the method for correcting perspective-induced curvature of text lines in images of text captured by mobile devices and other types of text-imaging equipment and appliances.
FIG. 27U provides control-flow diagrams that illustrate one implementation of the method for correcting perspective-induced curvature of text lines in images of text captured by mobile devices and other types of text-imaging equipment and appliances.
Figure 27G:
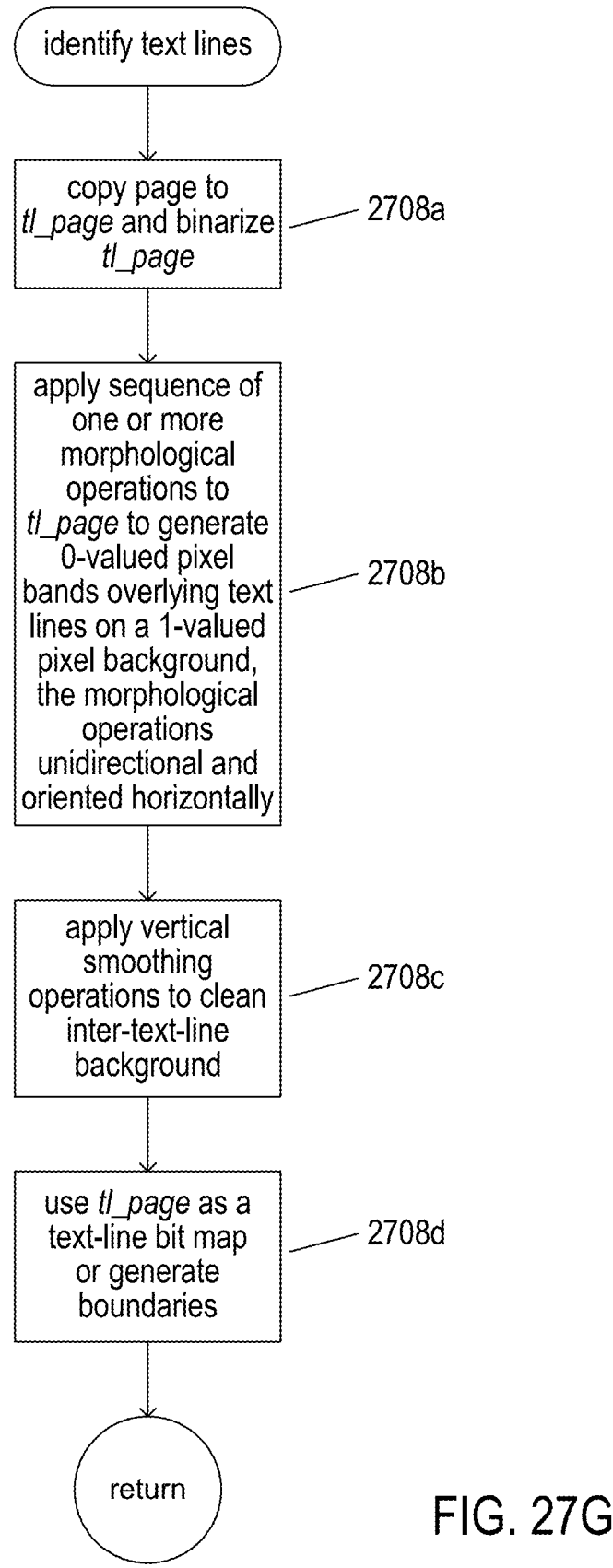
Figure 27H:
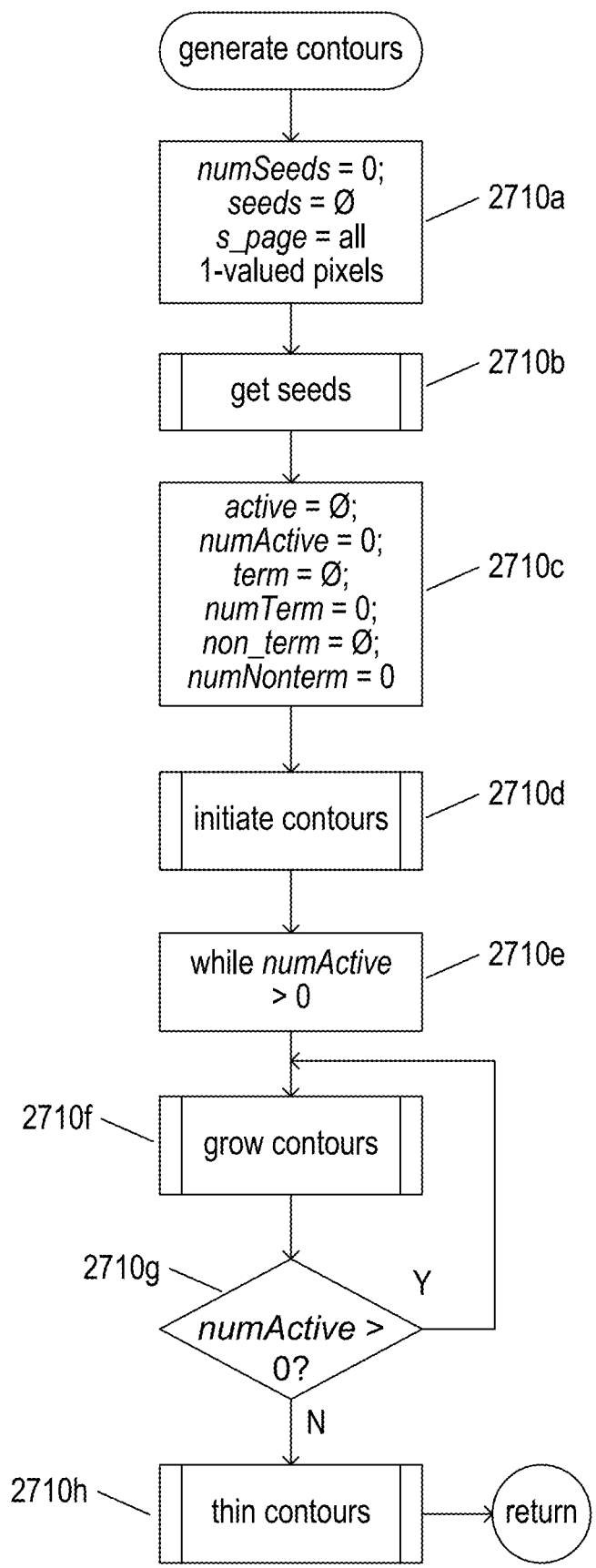
Figure 27I:
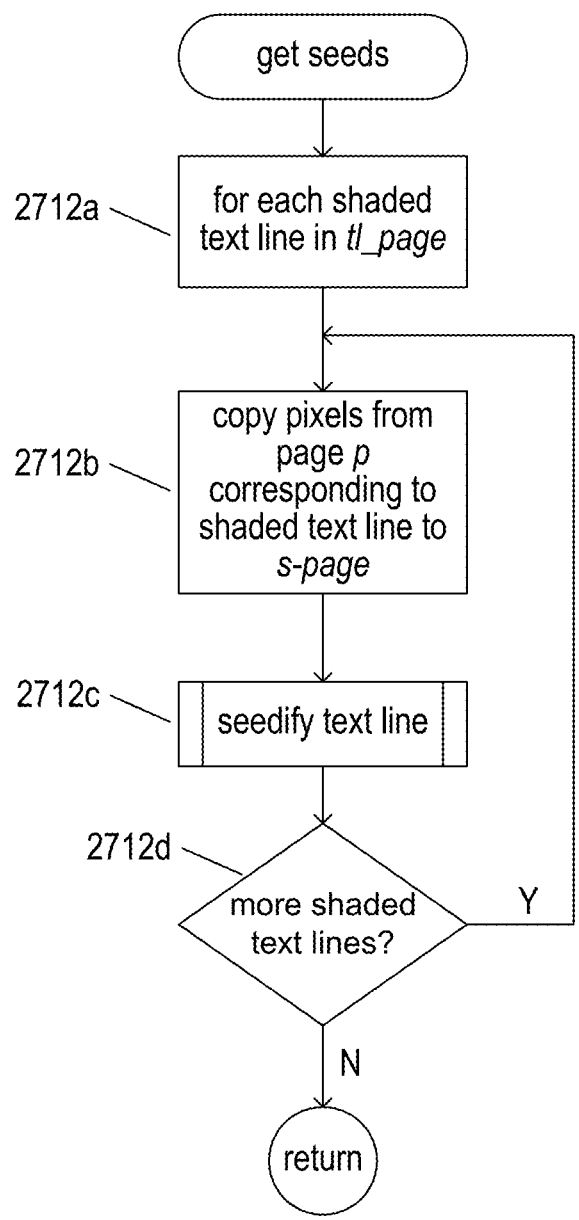
Figure 27J:
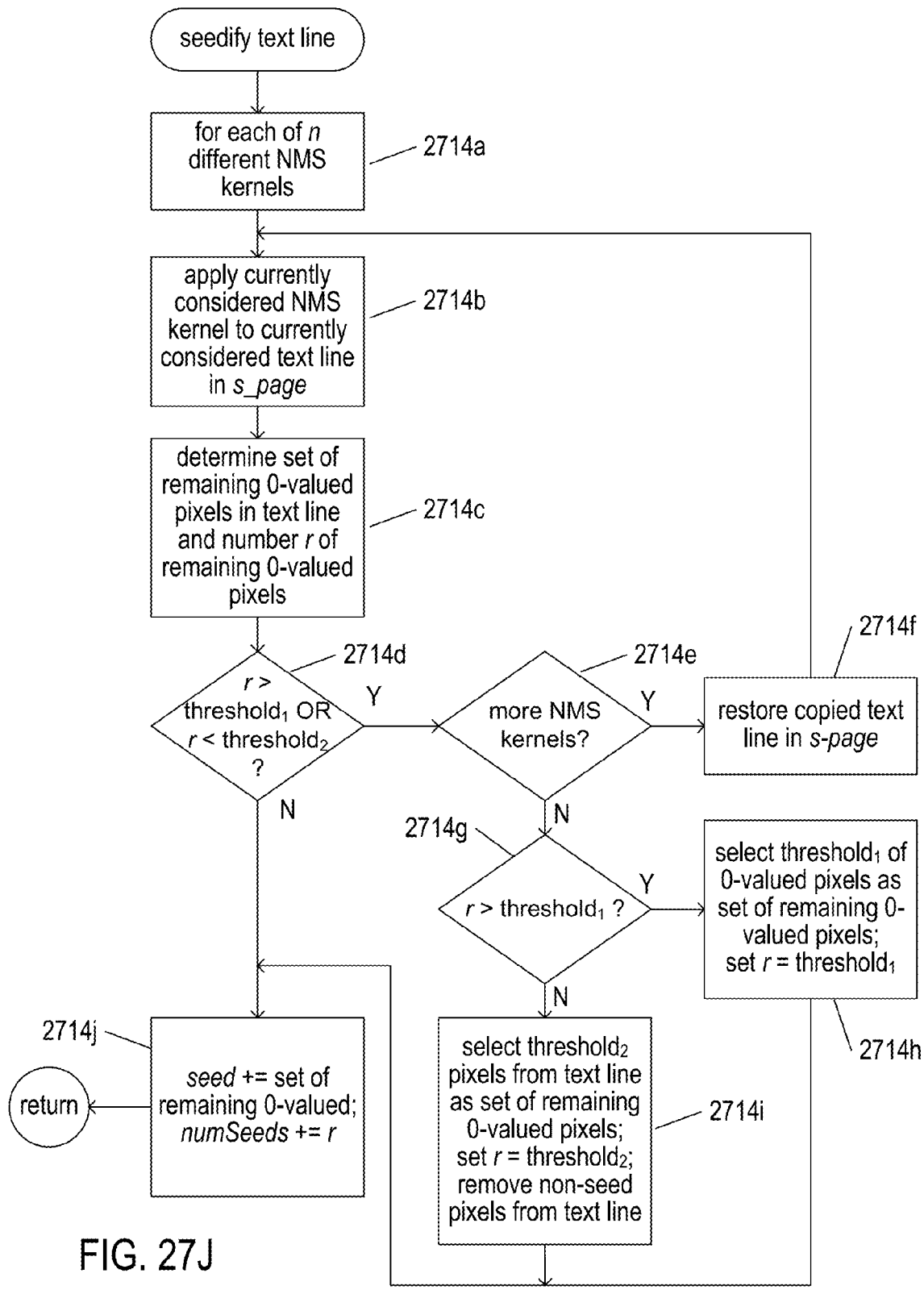
Figure 27K:
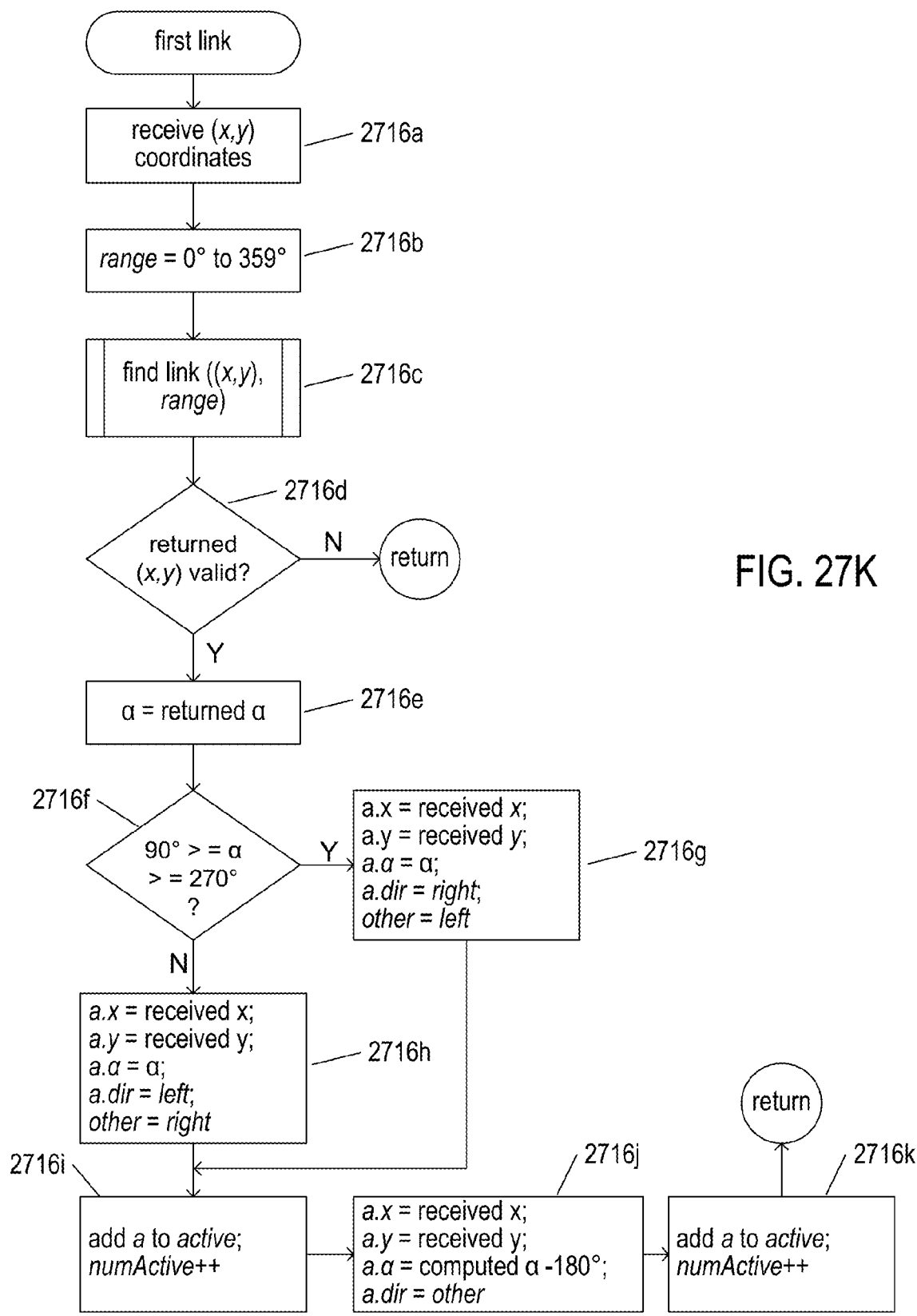
Figure 27L:
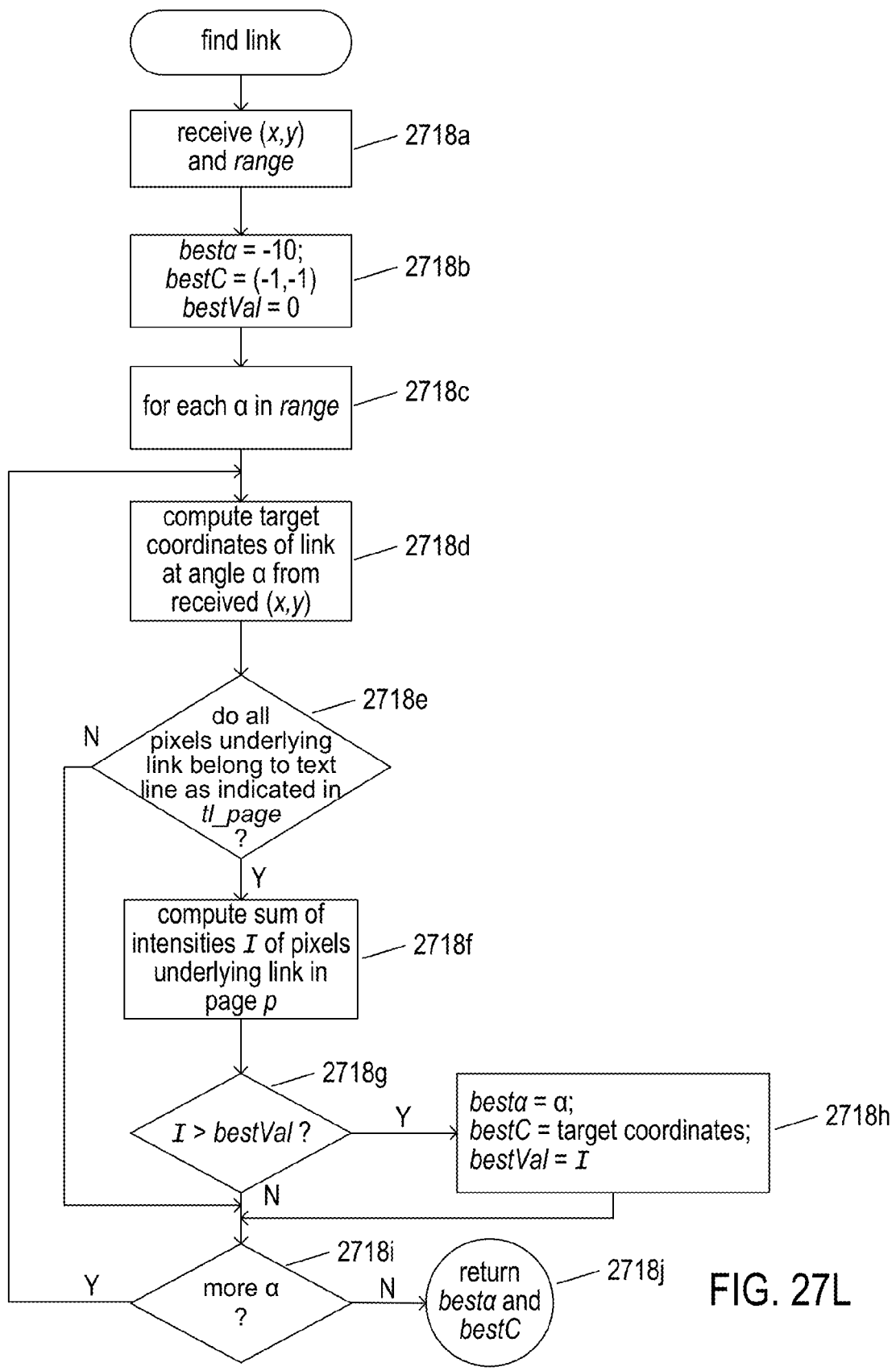
Figure 27M:
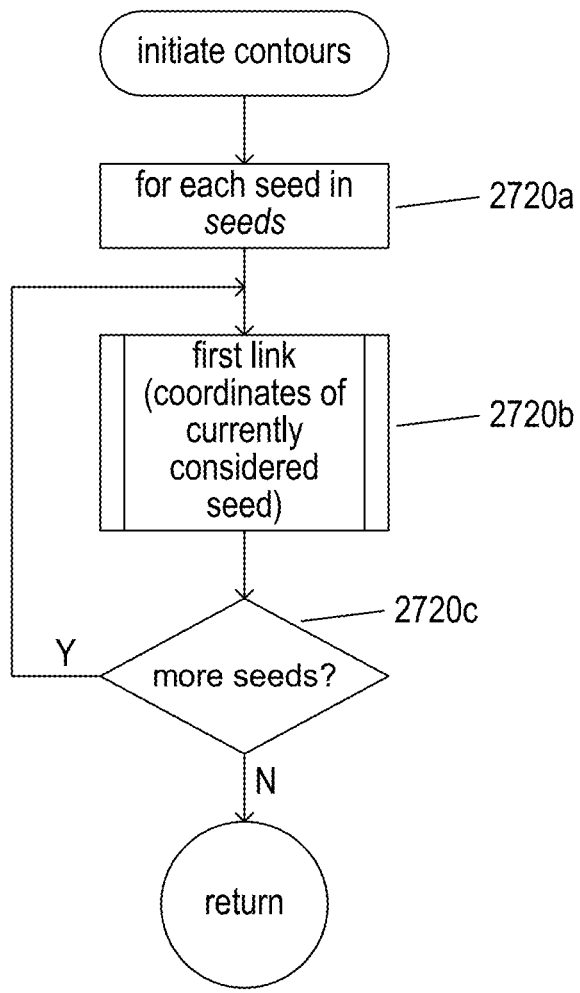
Figure 27N:
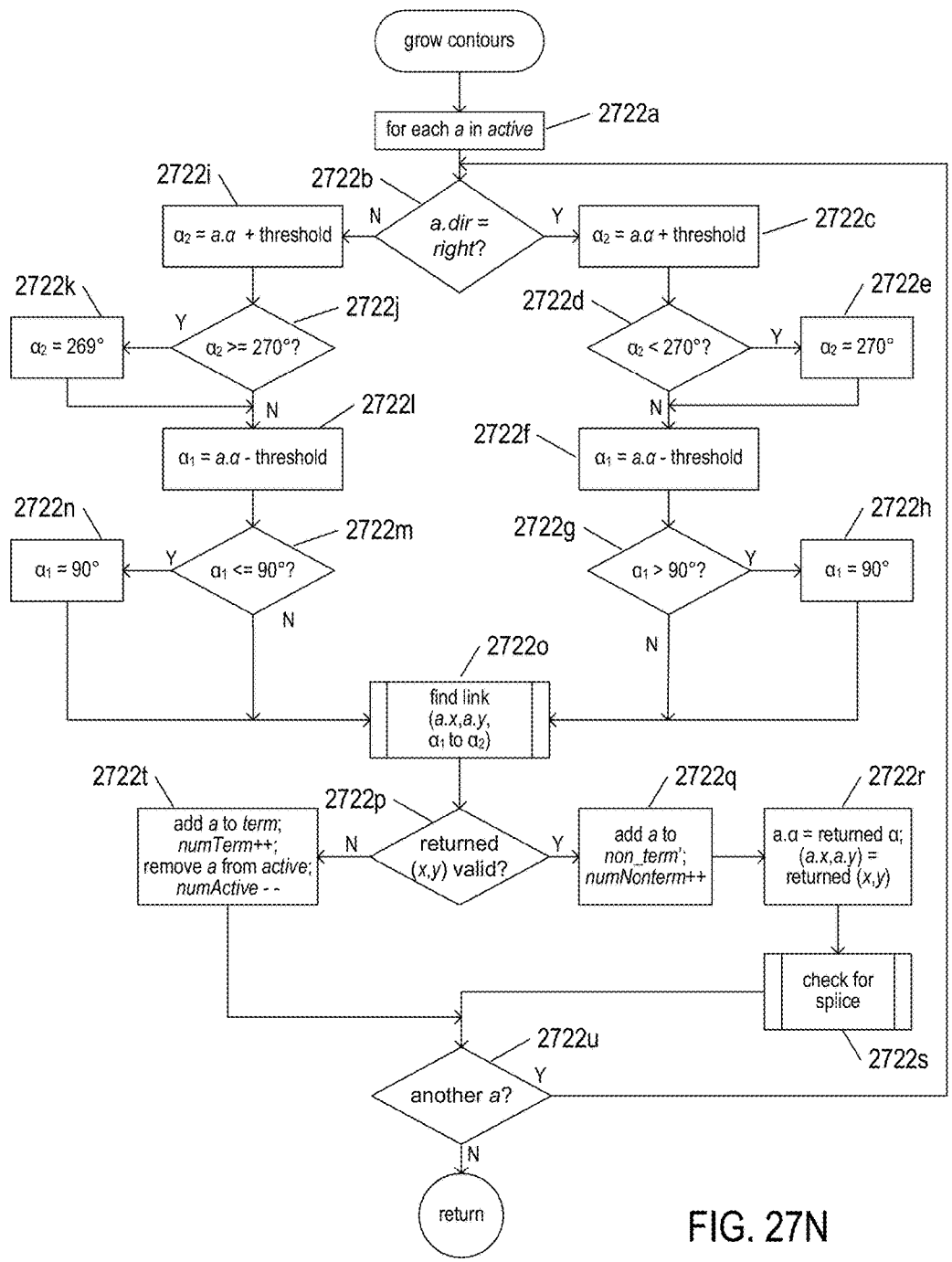
Figure 27O:
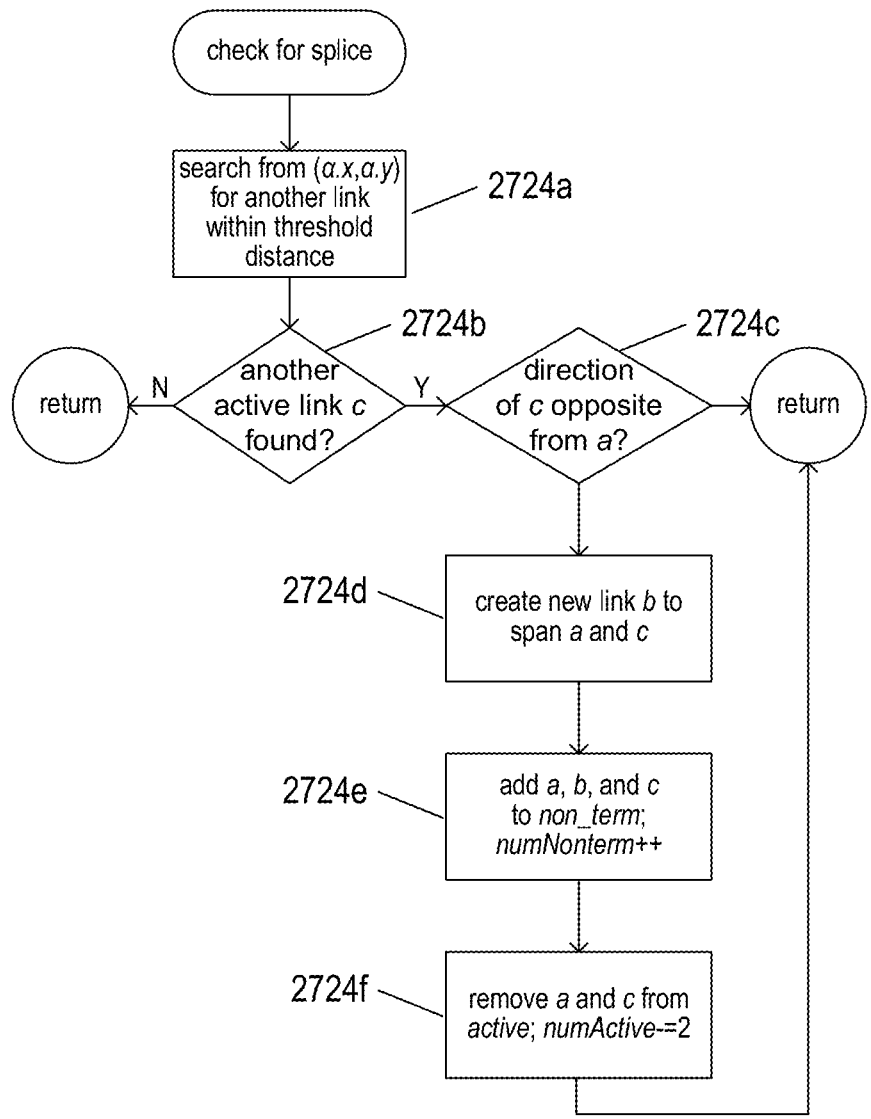
Figure 27P:
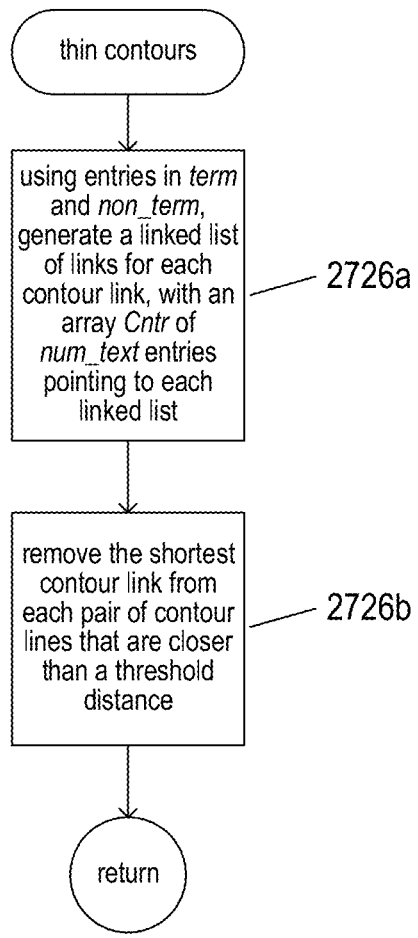
Figure 27Q:
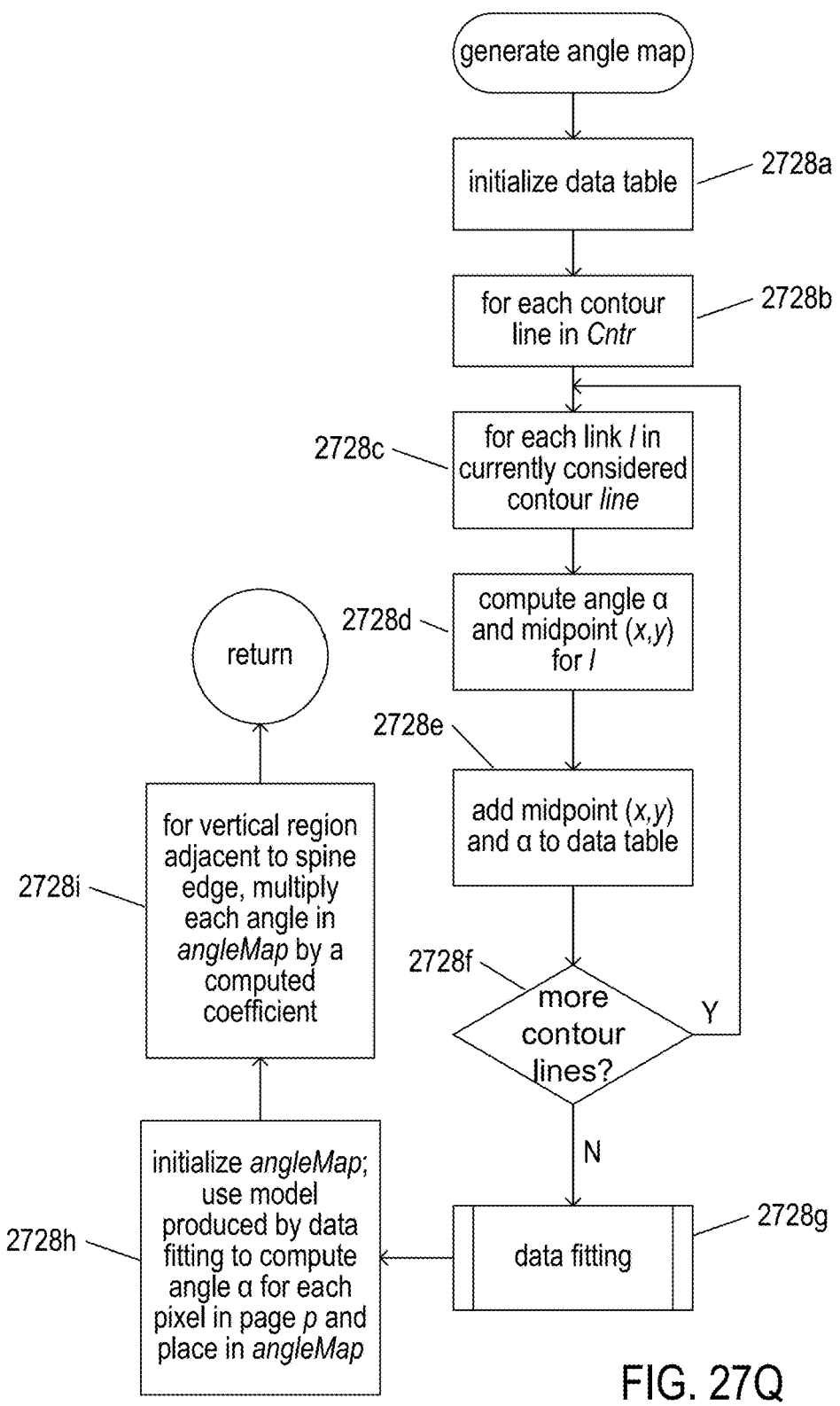
Figure 27R:
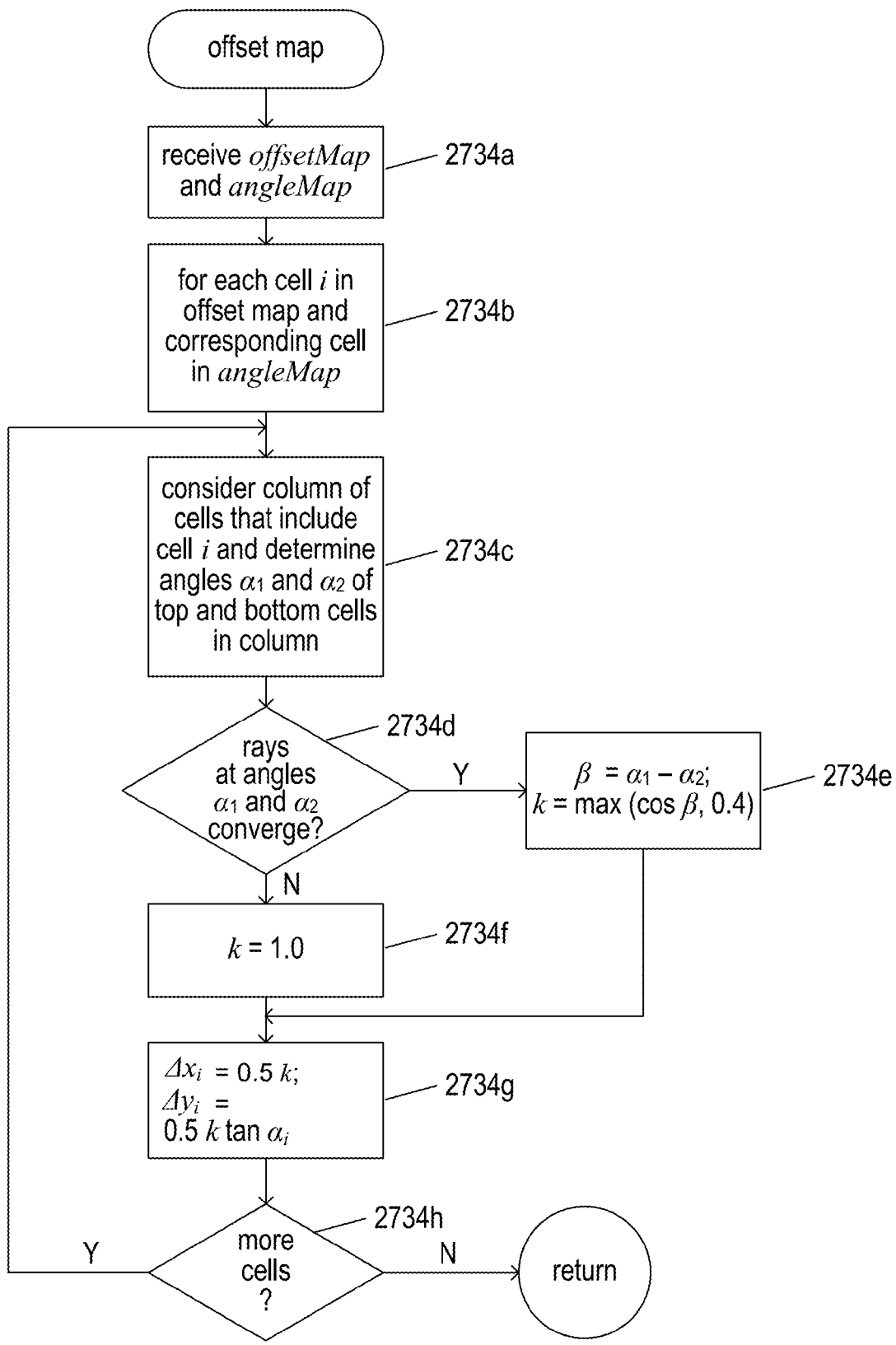
Figure 27S:
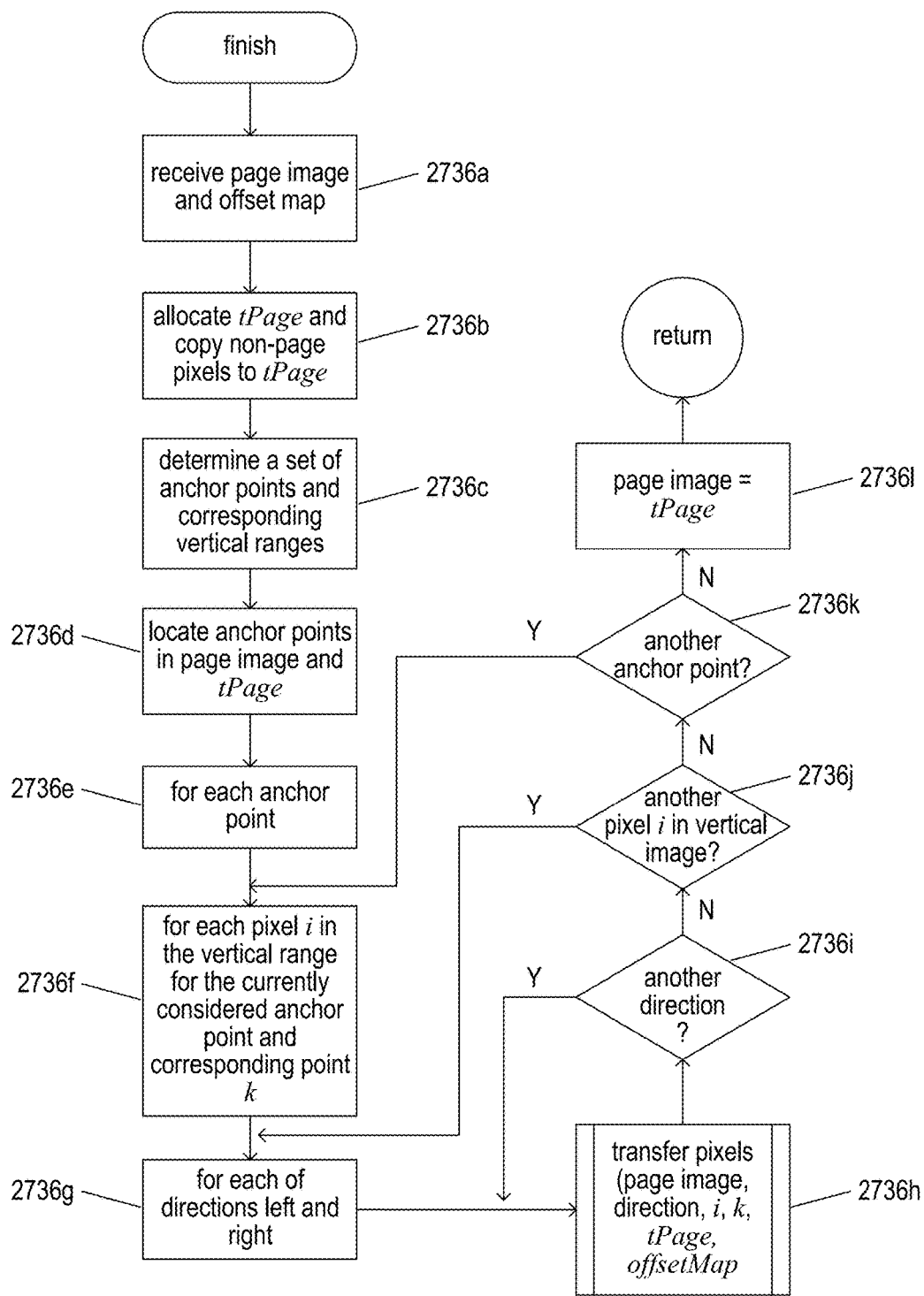
Figure 27T:
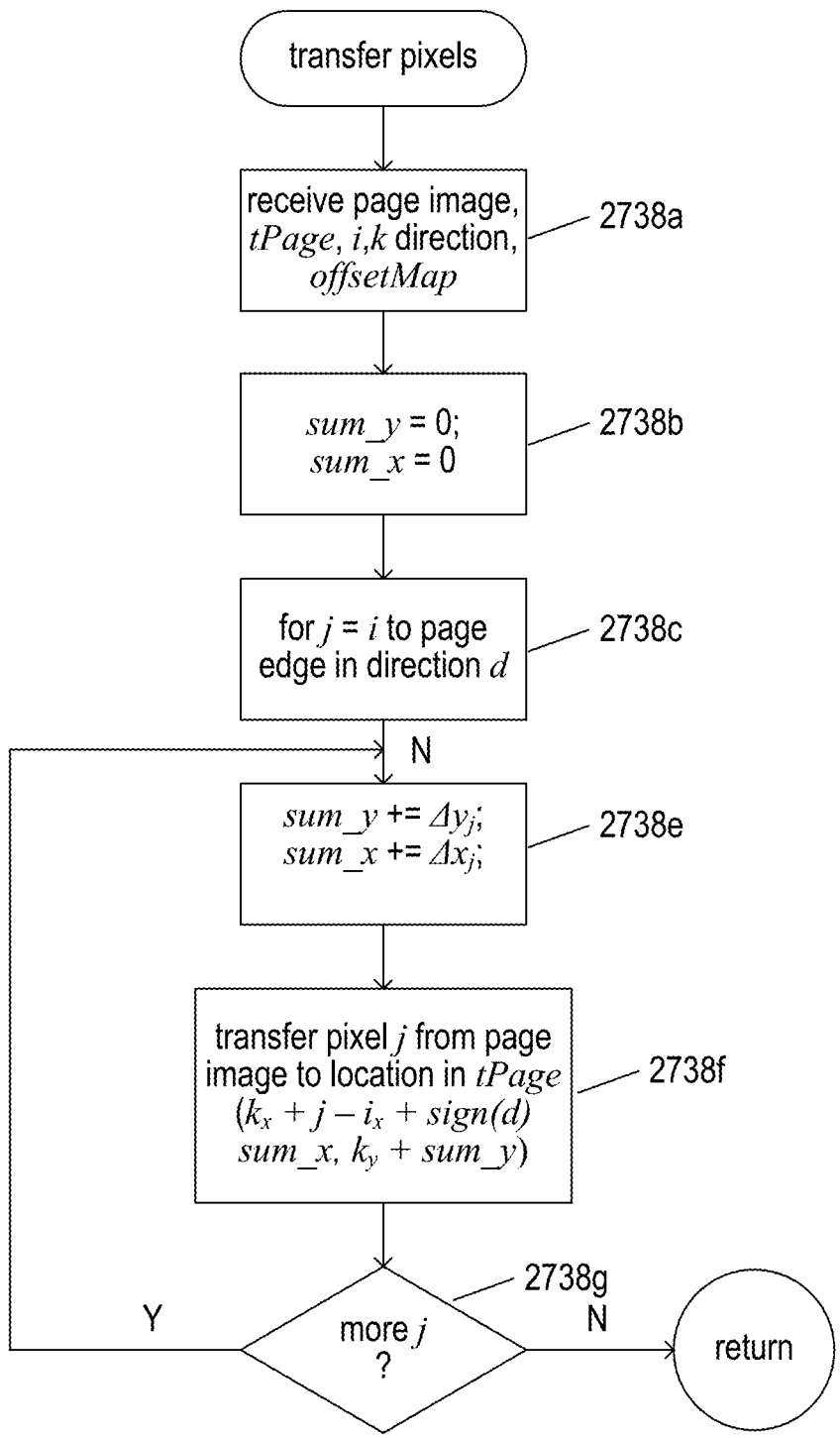
Figure 27U:
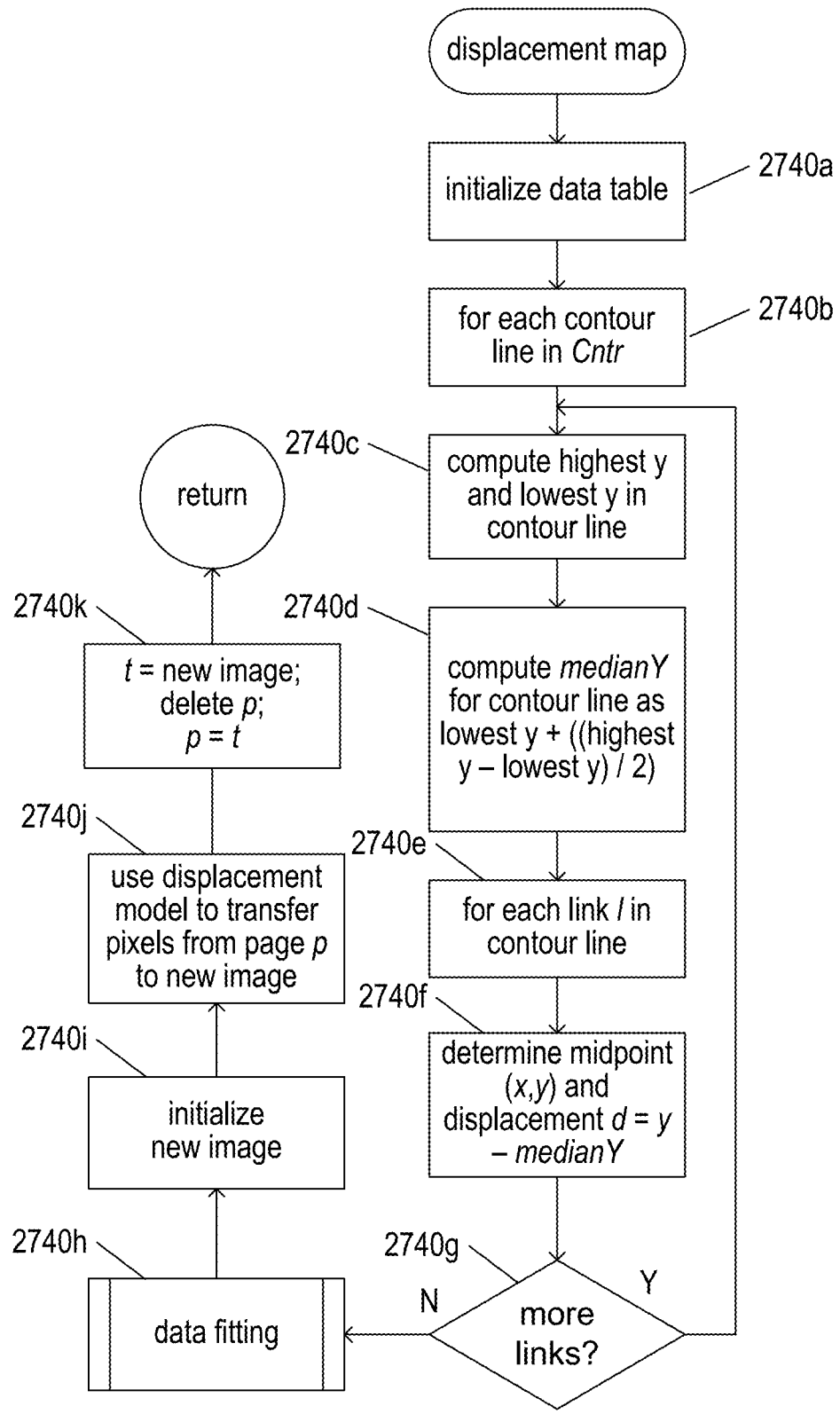

Control-flow-diagram Illustration of One Implementation of the Currently Disclosed Methods and Systems FIGS. 27A-U provide control-flow diagrams that illustrate one implementation of the method for correcting perspective-induced curvature of text lines in images of text captured by mobile devices and other types of text-imaging equipment and appliances. This method can be incorporated into mobile computing appliances, including smart phones, as well as other computing platforms in order to process text images in preparation for carrying out optical character recognition. It should be re-emphasized that the computer instructions that together comprise an implementation of the method in certain devices, appliances, and computational platforms are fully instantiated, physical components of the devices, appliances, and computational platforms in which they are included. Physically stored computer instructions represent the majority of machine controllers in the modern world, having supplanted older circuit-based and electromechanical control systems. Few modern electronic devices would be able to operate at any functional level without stored computer instructions executed on one or more microprocessors or processors. The currently disclosed methods, incorporated into various types of devices, appliances, and computational platforms, are intimately integrated with digital-imaging hardware and control components, physical memories, and many other internal components of the devices, appliances, and computational systems and could not be carried out manually or in any context other than the devices, appliances, and computational systems in which they are included.

FIG. 27A provides a control-flow diagram for one implementation of the overall method for processing images of book pages and other text images. In step 2702a, an image of an open book is received along with references to storage space for two page images P1 and P2. In step 2702b, a routine "initial processing" is called to carry out denoising, edge detection, page-border detection, and vertical alignment of the edges of the two page images generated from the received image of an open book, as discussed above with reference to FIGS. 14A-15B. Should initial processing fail, as determined in step 2702c, a false value is returned in step 2702d. Otherwise, in the for-loop of steps 2702e-2702i, each of the two page images P1 and P2 generated by the initial processing routine are processed by a call to the routine "process page," in step 2702f.

FIG. 27B provides a control-flow diagram for the routine "initial processing," called in step 2702b of FIG. 27A. In step 2704a, the routine receives the book image and references to allocated memory for page images P1 and P2. When the received image is a color image, as determined in step 2704b, the color image is transformed into a monochrome image, in step 2704c, by the method discussed above with reference to FIG. 6. In step 2704d, the image is smoothed using a Gaussian kernel or median filter, discussed above with reference to FIGS. 10-12. In step 2704e, a gradient map is generated from the smoothed image, as discussed above with reference to FIGS. 14A-C. The gradient map is filtered using a non-maximum suppression technique, discussed above with reference to FIG. 14B, as well as filtering identified edges based on length and other geometrical considerations, to produce an edge map, in step 2704f. In step 2704g, additional characteristics of book pages, the color distribution of the image, and other geometrical information are used to construct page outlines from the edges in the edge map generated in step 2704f. When two pages are not identified in the image, as determined in step 2704h, then a value false is returned in step 2704i. Otherwise, in step 2704j, each of the page sub-images identified in step 2704g are transferred to page images P1 and P2 and the images are rotated so that the spine-adjacent edge of each page is coincident with the vertical axis of the page image, in step 2704k. Then, in the for-loop of steps 2704l-2704n, the routine "justify page image" is called, in step 2704m, to process each of the two page images P1 and P2

FIG. 27C provides a control-flow diagram for the routine "justify page image," called in step 2704m of FIG. 27B. This routine carries out the procedure discussed above with reference to FIG. 15B. In step 2706a, the routine determines the angle of inclination α of the non-spine edge of the page. When α is less than a threshold angle, as determined in step 2706b, no further processing is needed and the routine terminates, in step 2706c. Otherwise, in step 2706d, the routine determines the point of intersection between the edge of the page parallel to, but not adjacent to, the spine and the top edge of the page (point 1522 in FIG. 15B). In step 2706e, the routine determines the width and height of the page image in pixels. In the for-loop of steps 2706f-2706n, each horizontal row of pixels within the portion of the page image representing the page is processed. In step 2706g, the point where the page edge parallel, but not adjacent, to the spine intersects the pixel row is determined (1524 in FIG. 15B). Then, in step 2706i or 2706j, the lengths of the three segments of the horizontal row discussed with reference to FIG. 15B are determined. In step 2706k, the number of pixels to remove from the page region is determined. Then, in step 2706l and 2706m, certain of the pixels in the non-page portion in the horizontal row of pixels are doubled and certain of the pixels in the page portion of the horizontal row of pixels are removed, as illustrated in FIG. 15B.

FIG. 27D provides a control-flow diagram for the routine "process page," called in step 2702f of FIG. 27A. In step 2705*a*, the routine "process page" receives a reference to a page image, p. In step 2705*b*, the routine "process page" calls the function "determine text-line orientation" to determine the proper rotational orientation for the page, as discussed above with reference to FIGS. 16A-D. In step 2705*c*, the routine "process page" calls the routine "normalize page borders and text lines" to reorient the text within the page image according to the determined rotation angle produced by the function "determine text-line orientation." This may involve a rotation of the contents of the page image within the borders of the page and may involve some cropping, page-boundary adjustment, and other adjustments to produce a normalized page image with approximately horizontal text lines. In step 2705*d*, the routine "process page" calls the routine "identify text lines" to produce the shaded bands (1804 in FIG. 18A) in a binarized copy of the page image to indicate the shape and area of each text line within the page image or, equivalently, generate a description of the boundaries of each text-containing region. In step 2705*e*, the routine "process page" calls the routine "generate contours" to generate contour lines (1810 in FIG. 18A) for each text-containing band or region within the page image. In step 2705*f*, the routine "process page" calls the routine "generate angle map" to generate a mathematical model for the inclination angles within the page image as discussed above with reference to FIGS. 19A-C. In steps 2705*g*-2705*i*, the routine "process page" calls the routines "offset map" and "finish" in order to transform the page image to a page image with straight, horizontal text lines.

FIGS. 27E-F provide control-flow diagrams that illustrate one implementation of the routine "determine text-line orientation," called in step 2705*b* of FIG. 27D. This implementation is generally discussed, above, with reference to FIGS. 16A-D. In step 2706*a*, the variable bestAngle is set to "0" and the local variable bestVariance is set to some large integer value. Then, in the for-loop of steps 2706*b*-2706*f*, each of n angles is considered for the angle representing the proper orientation of the page, as discussed above with reference to FIGS. 16A-D. In step 2706*c*, the variance for the page image oriented at the currently considered orientation angle is computed. When the computed variance is less than the value stored in the local variable bestVariance, as determined in step 2706*d*, then, in step 2706*e*, the local variable bestAngle is set to the currently considered orientation angle and the local variable bestVariance is set to the variance computed in step 2706*c*. In step 2706*g*, the page image is oriented to the best orientation angle obtained in the for-loop of steps 2706*b*-2706*f*. In step 2706*h*, an OCR method is applied to a few selected symbols from text lines within a page image and a ratio $r_1$ is computed as the ratio of the number of recognized symbols to total symbols to which the OCR method is applied. In step 2706*i*, the page is rotated by 180° and, in step 2706*j*, the OCR method is again applied to the selected symbols to compute a second ratio $r_2$ of recognized symbols to total symbols. When $r_1$ is greater than $r_2$, as determined in step 2706*k*, the angle stored in the local variable bestAngle is returned in step 2706*l*. Otherwise, an angle equal to the angle stored in the local variable bestAngle minus 180° is returned in step 2706*m*. Note that, in all of the control-flow diagrams, it is assumed that modulo arithmetic is used on angles so that only positive angles within the range 0° to 359° are obtained by arithmetic operations, such as the subtraction of one angle from another. In addition, when parameters are not explicitly passed, it is assumed that a called routine executes in the scope of the calling routine, and can thus access variables declared in, or within the scope of, the calling routine.

FIG. 27F provides a control-flow diagram for the routine "compute variance," called in step 2706*c* of FIG. 27E. In step 2707*a*, the page image is oriented according to the angle currently considered in the for-loop of steps 2706*b*-2706*f* of FIG. 27E. In step 2707*b*, a data table, such as data table 1616 in FIG. 16B, is initialized. In the nested for-loop of steps 2707*c*-2707*j*, the data table is filled by considering each block of each column in determining whether the block contains character pixels or instead contains only background pixels. Blocks containing only background pixels are counted as background blocks and the remaining blocks are counted as character-containing blocks, as discussed above with reference to FIG. 16B. When all the blocks of a column have been considered, the b/c ratio for the column is computed in step 2707*i*. Once all of the data for the two first rows of the data table has been generated, in the nested for-loop of steps 2707*c*-2707*h*, the mean and variance for the computed ratios of background blocks to character-containing blocks for each column are computed in step 2707*k*. The variance is returned in step 2707*l*.

FIG. 27G provides a control-flow diagram for the routine "identify text lines," called in step 2705*d* in FIG. 27D. In step 2708*a*, the routine "identify text lines" copies the page image p to the page tl_page and binarizes page tl_page. In step 2708*b*, the routine "identify text lines" applies a sequence of one or more morphological operations to the page tl_page to generate the shaded bands corresponding to text lines, as discussed above with reference to FIG. 16A. In step 2708*c*, the routine "identify text lines" applies a vertical smoothing operation, as discussed above with reference to FIG. 16. Finally, in step 2708*d*, page tl_page is used as a text-line bitmap, in certain implementations, or, alternatively, in other implementations, boundaries are generated for the text-line regions based on the contents of page tl_page. As a text-line bitmap, any given pixel in page-image p can be determined, from page tl_page, as being a text-line pixel or a background pixel.

FIG. 27H provides a control-flow diagram for the routine "generate contours," called in step 2705*e* of FIG. 27D. In step 2710*a*, the local variable numSeeds is set to "0," the set variable seeds is set to the null set, and page s_page is set to all 1-valued pixels. In step 2710*b*, the routine "get seeds" is called to generate seed pixels for each text line. In step 2710*c*, the local set variables active, term, and non_term are set to the null set and the local variables numActive, numTerm, and numNon_term are set to "0." In step 2710*d*, the routine "initiate contours" is called to initiate contour-line generation from each seed. In the for-loop of steps 2710*e*-2710*g*, the routine "grow contours" is called iteratively until there are no more active contour-line-segment ends to extend. Then, in step 2710*h*, the routine "thin contours" is called to thin and additionally process the contour lines generated by contour-line-segment extension in the for-loop of steps 2710*e*-2710*g*.

FIG. 27I provides a control-flow diagram for the routine "get seeds," called in step 2710*b* of FIG. 27H. In the for-loop of steps 2712*a*-2712*d*, each text-line area indicated in page tl_page is considered. For each considered text-line area, pixels are copied from the page image p to the page s_page. The pixel values are thresholded so that character pixels have the value "0" and non-character pixels have the value "1." Then, in step 2712*c*, the routine "seedify text line" is called to generate a number of seed pixels for the currently considered text line.

FIG. 27J provides a control-flow diagram for the routine "seedify text line," called in step 2712*c* of FIG. 27I. In the for-loop of steps 2714*a*-2714*f*, each of n different NMS kernels is applied to the page s_page until either all of the NMS kernels have been exhausted or application of an NMS kernel generates a desired number of seed pixels for the text line. In step 2714b, the currently considered NMS kernel is applied to the text line currently considered in the for-loop of steps 2712a-2712d in FIG. 27I. In step 2714c, the set of 0-valued pixels remaining in the text line is determined and the cardinality r of the set of 0-valued pixels remaining in the text line is determined. When r is greater than a first threshold or less than a second threshold, as determined in step 2714d, and when there are more NMS kernels to consider, as determined in step 2714e, the text line copied to page s_page is restored, in step 2714f, from the page tl_page and another iteration of the for-loop of steps 2714a-2714f ensues. When there are no more NMS kernels to apply, as determined in step 2714e, then, when r is greater than the first threshold, as determined in step 2714g, a first threshold number of 0-valued pixels is selected from the remaining 0-value pixels as seed pixels for the text line in step 2714h. Otherwise, a second threshold number of 0-valued pixels is selected from the set of remaining 0-valued pixels as seed pixels for the text line in step 2714i. The set of 0-valued pixels obtained in the for-loop of steps 2714a-2714f is added to the set seeds, in step 2714j.

FIG. 27K provides a control-flow diagram for the routine "first link." This routine generates a first link for a seed pixel. In step 2716a, the routine "first link" receives the (x,y) coordinates for a seed pixel. In step 2716b, the routine "first link" sets a local variable range to an angular range of 0° to 359°. In step 2716c, the routine "first link" calls the routine "find link" to generate an initial link for the seed pixel. When the routine "find link" fails to return valid (x,y) coordinates for the endpoint of a next link, as determined in step 2716d, the routine "first link" returns. By returning, the routine "first link" essentially eliminates the received seed from further processing. Otherwise, in step 2716e, the local variable α is set to the angle for the initial link returned by the routine "find link." When the returned angle indicates that the link is a rightward-pointing link, as determined in step 2716f, active endpoints for a rightward-pointing link are entered into the set active in steps 2716g and 2716i-2716k. Otherwise, active endpoints for a leftward-pointing link are entered into the set active in steps 2716h and 2716i-2716k. In the illustrations, an active endpoint is represented as a record-like entry in the set active that includes the x,y coordinates for the endpoint, the inclination angle for the link having this endpoint, and a direction.

FIG. 27L provides a control-flow diagram for the routine "find link," called in step 2716c of FIG. 27K. The routine "find link" attempts to identify a next link, from a pixel with input coordinates (x,y) received in step 2718a, within a range of inclination angles provided by the input argument range, received in step 2718a. In step 2718b, the routine "find link" sets local variables bestα to −10, bestC to (−1, −1), and bestVal to 0. Local variable bestα contains the angle of inclination of the best candidate link so far evaluated by the routine "find link," local variable bestC contains the coordinates of the endpoint of the best candidate link so far evaluated by the routine "find link," and local variable bestVal contains the average intensity of the best candidate link so far evaluated by the routine "find link." In the for-loop of steps 2718c-2718i, each candidate link with an inclination angle within range is evaluated. The for-loop of steps 2718c-2718i considers a set of candidate links with inclination angles evenly spaced within range. The evaluation includes computing the endpoint coordinates for the candidate link in step 2718d, determining that all pixies underlying the link belong to a single text line, as determined from the text-line bit map tl_page in step 2718e, and computing the average intensity I of the pixels underlying the candidate link in page image p. When the computed average intensity I is greater than the value stored in local variable bestVal, the currently considered candidate link is the best candidate link so far evaluated, and therefore, in step 2718h, the values stored in the local variables bestα, bestC, and bestVal are updated to describe the currently considered candidate link. When the for-loop of steps 2718c-2718i terminates, the values stored in bestα and bestC are returned. Note that, in the case no candidate link satisfies the requirements for a next link, the returned values are the invalid values with which the local variables are initialized, in step 2718b.

FIG. 27M provides a control-flow diagram for the routine "initiate contours," called in step 2710d of Figured 27H. In the for-loop of steps 2720a-2720c, the routine "first link," described above with reference to FIG. 27K, is called to add an initial link to each seed pixel in the set variable seeds.

FIG. 27N provides a control-flow diagram for the routine "grow contours," called in step 2710f of FIG. 27H. The routine "grow contours" considers each active endpoint α in the set active, in the for-loop of steps 2722a-2722u, and attempts to add a next link to each active endpoint. When the direction of the currently considered active endpoint α is right, as determined in step 2722b, a range of inclination angles for candidate links for adding to active endpoint α is determined in steps 2722c-2722h. The range is computed, in the current implementation, to ensure that the active endpoint α is continued in a rightward direction. In alternative implementations, the range of inclination angles may be computed according to alternative criteria. When the direction of the currently considered active endpoint α is left, as determined in step 2722b, a range of inclination angles for candidate links for adding to active endpoint α is determined in steps 2722i-2722m, in similar fashion. In step 2722o, the routine "find link," described above with reference to FIG. 27L, is called to determine a best link with which to extend currently considered active endpoint α. When the routine "find link" returns valid parameters for a next link, as determined in step 2722p, a link corresponding to the currently considered active endpoint α is added to the set non_term, in step 2722q, and currently considered active endpoint α in the set active is updated, in step 2722r, to reflect the endpoint of the new link. In step 2722s, the routine "check for splice" is called to join the new link to a terminal link of another contour-line segment, when the endpoint of that terminal link is within a threshold distance of the endpoint of the new link. When the routine "find link" fails to return valid parameters for a next link, as determined in step 2722p, the currently considered active endpoint α is terminated, in step 2722t, by adding currently considered active endpoint α to the set term and removing currently considered active endpoint α from the sect active.

FIG. 27O provides a control-flow diagram for the routine "check for splice," called in step 2722s of FIG. 27N. This routine may not be included in many implementations, because, in multi-column text pages, joining contours may lead to contours that span multiple columns. However, in certain implementations, contour splicing may be used, as described with respect to FIG. 27O. In step 2724a, the routine "check for splice" searches for a terminal link within a threshold distance of the currently considered active endpoint α of the for-loop of steps 2722a-2722u in step FIG. 27N. When an active link having a direction opposite from the currently considered active endpoint α is found, as determined in steps 2724b-2724c, the currently considered active endpoint α is joined to the found active link in steps 2724d-2724f. The illustrated implementation assumes that an additional joining link c is needed. However, in a case such as that shown in FIG. 18C, the link represented by the currently considered active endpoint α and the found link may be joined directly by rotating one or both links, without the need for a joining link c.

FIG. 27P provides a control-flow diagram for the routine "thin contours," called in step 2710h of FIG. 27H. The routine "thin contours" transforms, in step 2726a, the links in the sets term and non_term into linked lists of links, each linked list comprising a contour line and representing, and contained within, a text line within page image p. In the described implementation, an array Cntr of references to these linked lists is allocated, with the number of references stored in a variable num_text. This transformation is straightforwardly obtained by considering each terminal link with a left direction in the set term and extending the link with links in the set non_term, and then extending the final link with a terminal link with a right direction in the set term. In alternative implementations, arrays, rather than linked lists, arrays of link-representing entries may be used to store sequences of links representing text lines. In step 2726b, pairs of linked-list-represented contour lines that approach one another to a distance less than a threshold distance are identified, and the shortest of the two contour lines is removed from array Cntr and deallocated. In general, a single contour line for each text line in page image p is desired. In alternative implementations, additional processing may be undertaken. For example, contour-line segments not previously joined may be joined, by spline fits or other techniques, to generate full contour lines from contour-line segments. Additionally, smoothing operations may be performed on the contour lines so that they represent smooth, continuous curves without abrupt kinks or discontinuities.

FIG. 27Q provides a control-flow diagram for the routine "generate angle map." This routine implements the curvature-model-generation logic discussed above with reference to FIGS. 19A-C. In step 2728a, the data table (1912 in FIG. 19A) is allocated and initialized. In the for-loop of steps 2728b-2728e, the inclination angles and midpoints for the contour links of the contours referenced from the array Cntr are computed and stored in the data table. In step 2728g, a data-fitting method is applied to the data in the data table to generate a polynomial expression that estimates the tangent of the inclination angle for each point in the page image p. In step 2728h, an angle map is prepared by computing the tangent of the inclination angle for each point in the page image p. Then, in step 2728i, inclination angles are adjusted for certain regions, as discussed above with reference to FIG. 25.

FIG. 27R provides a control-flow diagram for the routine "offset map," called in step 2705g of FIG. 27D. In step 2734a, the routine receives a reference to an empty offset map and the angle map produced by the routine "generate angle map." As discussed above with reference to FIG. 26C, the offset map may have a finer-grain rectilinear grid than the pixel grid of the page image. In the for-loop of steps 2734b-2734h, offsets are computed for each cell i in the offset map. This computation follows the method discussed above with reference to FIGS. 26C and 26D. In steps 2734c-2734f, the coefficient k is computed for the currently considered cell i as discussed above with reference to FIG. 26D. In step 2734g, the local displacements $\Delta x_i$ and $\Delta y_i$ for cell i are computed by the method discussed above with reference to FIG. 26C.

FIG. 27S provides a control-flow diagram for the routine "finish," called in step 2705h of FIG. 27D. This routine carries out the pixel-transfer method discussed in FIGS. 26E-F to create a corrected image from the page image and the offset map prepared by the routine "offsetMap." In step 2736a, the page image and offset map are received. In step 2736b, an empty page tPage is allocated and the non-page pixels in the page image are copied to tPage. In step 2736c, a set of anchor points is determined and their locations in the page image and the page tPage, which will contain the corrected page image, are determined in step 2736d, as discussed above with reference to FIG. 26E. In the triply nested for-loops of steps 2736e-2736k, pixels are transferred from the page image to the corrected image as described with reference to FIG. 26F. Each point in a vertical range, or vertical neighborhood, about each anchor point is expanded to the right and to the left to transfer pixels from the page image to the corrected page image. Each pixel is transferred by a call to the routine "transfer pixels," in step 2736h.

FIG. 27T provides a control-flow diagram for the routine "transfer pixels," called in step 2736h of FIG. 27S. In step 2738a, the routine receives references to the page image and the corrected image tPage, the coordinates for a pixel i in the page image, coordinates for a corresponding pixel k in the corrected image, a direction in which expansion around an anchor point or point in a vertical neighborhood of the anchor point is expanded for pixel transfer, and the offset map. Local variables sum_y and sum_x are set to 0 in step 2738b. Then, in the for-loop of steps 2738c-2738g, each pixel j in the horizontal line of pixels starting from pixel i and continuing to the page edge in direction d is transferred from the page image to the corrected image tPage. In step 2738e, the local displacement for pixel j is computed by adding the local displacements to the local variables sum_y and sum_x and then, in step 2738f, the position of the pixel in the corrected image is computed and the intensity value for the pixel is transferred from the page image to the corrected image.

FIG. 27U provides a control-flow diagram for the routine "displacement map." This routine represents the alternative approach to page-image-text-line straightening, discussed above with reference to FIG. 26G, and replaces steps 2705f-2705h in FIG. 27D. In steps 2740a-2740h, a displacement map similar to the above discussed angle map is computed by data extraction from the contour lines and data fitting, similar to the steps 2728a-2728h in FIG. 27Q. However, the transfer of pixels from page image p to a new page image to generate a straightened page image, in steps 2740i-2740k, is much simpler than the pixel-transferring methods discussed above with reference to FIGS. 26A-F. The displacements in the displacement map are used to directly compute a new position in the straightened page image for every pixel in page image p. Of course, additional processing may be undertaken to reorient the straightened page image and fill in gaps or remove overhangs at the borders of the page.

Although the present invention has been described in terms of particular embodiments, it is not intended that the invention be limited to these embodiments. Modifications within the spirit of the invention will be apparent to those skilled in the art. For example, any of many different design and implementation parameters, including modular organization, programming language, hardware platform, control structures, data structures, and other such design and implementation parameters, may be varied to provide a variety of different implementations of the disclosed methods and systems. As discussed above, there are alternative methods that can be used for many, if not all, of the various processing steps involved in text-line-curvature correction. In addition, the many different threshold values, kernel widths, image-map granularities, and other parameters may have different values in different implantations.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. An image-processing system that acquires an image containing text with curved text lines and generates a corresponding corrected image in which the text lines are straightened and have a rectilinear organization, the image-processing system comprising:
   one or more processors, one or more memories; and
   computer instructions stored in one or more physical data-storage devices that, when executed by one or more of the one or more processors, control the image-processing system to
   receive the text-containing image as an input,
   identify a page sub-image within the text-containing image,
   correct a vertical perspective of the page sub-image,
   generate contour lines to represent text lines of the page sub-image,
   generate a text-line-curvature model for the page sub-image in view of the contour lines, wherein the text-line-curvature model includes an inclination-angle map that associates each pixel in the page sub-image with an inclination angle of a respective contour line corresponding to a respective pixel, and
   straighten the text lines within the received text-containing image using the text-line-curvature model.

2. The image-processing system of claim 1 wherein the image-processing system identifies a page sub-image within the text-containing image by:
   identifying intensity edges within the text-containing image; and
   using the identified intensity edges along with known geometrical constraints associated with text-containing pages to identify the sub-images corresponding to one or more text-containing pages in the text-containing image.

3. The image-processing system of claim 1 wherein the image-processing system corrects the vertical perspective of the page sub-image by:
   rotating the page sub-image so that the spine edge of the page adjacent to the spine of a book has a vertical orientation;
   when the non-spine-adjacent edge is contained in the page sub-image,
   adjusting the page sub-image so that the non-spine-adjacent edge also has a vertical orientation; and
   when the non-spine-adjacent edge is not contained in the page sub-image,
   correcting the vertical perspective of the page sub-image by another method.

4. The image-processing system of claim 1 wherein the image-processing system generates contour lines to represent text lines of the page sub-image by:
   generating indications of the areas in the page sub-image corresponding to text lines; and
   constructing contour lines within the indicated areas in the page sub-image corresponding to text lines.

5. The image-processing system of claim 4 wherein the image-processing system generates indications of the areas in the page sub-image corresponding to text lines by:
   copying the page sub-image to a new image; binarizing the new image to produce a binary image; and
   applying one or more morphological operators to the binary image to generate bands of pixels corresponding to text lines with a first binary value on a background of the remaining pixels with a second binary value.

6. The image-processing system of claim 5 further including:
   applying one or more vertical smoothing operators to the binary image following application of the one or more morphological operators.

7. The image-processing system of claim 4 wherein constructing contour lines within the indicated areas in the page sub-image corresponding to text lines further comprises:
   for each indicated text-line area,
   applying one or more non-maximum-suppression operator to the pixels of the text-line area to generate a set of seed pixels for each text line;
   generating first links for the seed pixels, the head and tail of each link considered active endpoints; and
   extending the active endpoints by adding additional links to the active endpoints.

8. The image-processing system of claim 7 wherein a next link is added to an active endpoint by:
   considering a set of candidate links for the active endpoint within a range of angles with respect to the link including the active endpoint;
   selecting the next link as the candidate link overlying a set of pixels with the greatest average intensity; and
   replacing the active endpoint with the endpoint of the new link.

9. The image-processing system of claim 1 wherein the image-processing system generates a text-line-curvature model for the page sub-image by:
   generating an inclination angle for each link of each contour line;
   initializing values of a set of coefficients for the text-line-curvature model, wherein the text-line-curvature model is a polynomial text-line-curvature model; and
   using a data-fitting method to determine coefficients for the polynomial text-line-curvature model from the inclination angles associated with the links.

10. The image-processing system of claim 9 wherein the polynomial text-line-curvature model returns a tangent of an inclination angle when called with arguments representing the location of a pixel within the page sub-image.

11. The image-processing system of claim 9 wherein the image-processing system straightens the text lines within the received text-containing image using the polynomial text-line-curvature model by:
   generating local displacements, using the polynomial text-line-curvature model, for pixels in the page sub-image from the polynomial text-line-curvature model, and
   transferring pixels from the page sub-image to a corrected page-sub-image using pixel displacements generated from the local displacements, wherein the corrected page sub-image comprises straitened text lines and text characters and symbols having a rectilinear arrangement.

12. The image-processing system of claim 11 wherein the image-processing system generates local displacements, using the polynomial text-line-curvature model, for pixels in the page sub-image from the polynomial text-line-curvature model by:
generating an inclination-angle map that includes an inclination angle for each pixel of the page sub-image produced by input of a position of the pixel within the page sub-image to the polynomial text-line-curvature model;
modifying the inclination angles in a vertical region of the angle map by multiplication by a coefficient that adjusts the inclination angles for increased curvature and compression in corresponding vertical region of the page sub-image; and
generating an offset map that includes a local displacement for each offset-map cell in the page sub-image.

13. The image-processing system of claim 12 wherein the image-processing system generates a local displacement for a cell in the offset map by:
determining a value for a vertical displacement as a compression coefficient multiplied by a cell width times the tangent of the inclination angle obtained from the polynomial text-line-curvature model;
setting a value for a horizontal displacement to the compression coefficient; and
associating the vertical displacement and the horizontal displacement with the cell.

14. The image-processing system of claim 13 wherein the compression coefficient for a cell is computed as a fraction equal to a cell width divided by a pixel width times one of the cosine of the difference between inclination angles for cells at the top and bottom of a vertical cell column spanning the page image and coincident with the cell and 0.4.

15. The image-processing system of claim 11 wherein the image-processing system transfers pixels from the page sub-image to a corrected page sub-image using pixel displacements generated from the local displacements by:
identifying pairs of corresponding anchor points in the page sub-image and the corrected page sub image;
transferring the intensity value of pixels corresponding to the anchor points in the page sub-image to pixels corresponding to pixels corresponding to the anchor points in the corrected page sub-image; and
for each non-anchor-point pixel in the page sub-image, summing the local displacements coincident with a vector from the non-anchor-point pixel to a nearby anchor point to produce a pixel displacement, and
transferring the intensity value of the non-anchor-point pixel to a pixel displaced from a corresponding anchor point in the corrected page sub-image by the pixel displacement.

16. An image-processing system that acquires an image containing text with curved text lines and generates a corresponding corrected image in which the text lines are straightened and have a rectilinear organization, the image-processing system comprising:
one or more processors, one or more memories; and
computer instructions stored in one or more physical data-storage devices that, when executed by one or more of the one or more processors, control the image-processing system to
receive the text-containing image as an input,
identify a page sub-image within the text-containing image,
correct a vertical perspective of the page sub-image,
generate contour lines to represent text lines of the page sub-image,
generate a displacement map for the page sub-image in view of the contour lines, wherein:
the displacement map associates each pixel in the page sub-image with a displacement of a respective pixel from a median height of a corresponding contour line, and
the image-processing system generates the displacement map by:
generating a displacement for each link of each contour line;
initializing values of a set of coefficients for the displacement map, wherein the displacement map is a polynomial displacement model; and
using a data-fitting method to determine coefficients for the polynomial displacement model from the displacements associated with the links, and
straighten the text lines within the received text-containing image using the displacement map.

17. The image-processing system of claim 16 wherein the image-processing system straightens the text lines within the received text-containing image using the polynomial displacement model by:
transferring pixels from the page sub-image to a corrected page-sub-image using the pixel displacements generated by the polynomial displacement model.

18. A method that receives a text-containing image and generates a corresponding corrected image in which the text lines are straightened and have a rectilinear organization, the method comprising:
receiving the text-containing image as an input,
identifying a page sub-image within the text-containing image,
correcting a vertical perspective of the page sub-image,
generating contour lines to represent text lines of the page sub-image,
generating a text-line-curvature model for the page sub-image in view of the contour lines, wherein the text-line-curvature model includes an inclination-angle map that associates each pixel in the page sub-image with an inclination angle of a respective contour line corresponding to a respective pixel, and
straightening the text lines within the received text-containing image using the text-line-curvature model.

19. The method of claim 18 wherein generating a text-line-curvature model for the page sub-image further comprises:
generating an inclination angle for each link of each contour line;
initializing values of a set of coefficients for the text-line-curvature model, wherein the text-line-curvature model is a polynomial text-line-curvature model; and
using a data-fitting method to determine coefficients for the polynomial text-line-curvature model from the inclination angles associated with the links.

20. A method that receives a text-containing image and generates a corresponding corrected image in which the text lines are straightened and have a rectilinear organization, the method comprising:
receiving the text-containing image as an input,
identifying a page sub-image within the text-containing image,
correcting a vertical perspective of the page sub-image, generating contour lines to represent text lines of the page sub-image, generating a displacement map for the page sub-image in view of the contour lines, wherein:

the displacement map that associates each pixel in the page sub-image with a displacement of a respective pixel from a median height of a corresponding contour line; and the generating of the displacement map further comprises:

generating a displacement for each link of each contour line;

initializing values of a set of coefficients for the displacement map, wherein the displacement map is a polynomial displacement model; and using a data-fitting method to determine coefficients for the polynomial displacement model from the displacements associated with the links, and straightening the text lines within the received text-containing image using the displacement map.

21. A non-transitory computer-readable medium having recorded thereon instructions, that when executed by one or more computer processors for image-processing system, perform operations comprising:

receiving a text-containing image as an input, identifying a page sub-image within the text-containing image, correcting a vertical perspective of the page sub-image, generating contour lines to represent text lines of the page sub-image, generating a text-line-curvature model for the page sub-image in view of the contour lines, wherein the text-line-curvature model includes an inclination-angle map that associates each pixel in the page sub-image with an inclination angle of a respective contour line corresponding to a respective pixel, and straightening the text lines within the received text-containing image using the text-line-curvature model.

* * * * *